US006624866B2

(12) United States Patent
Matsumoto

(10) Patent No.: US 6,624,866 B2
(45) Date of Patent: Sep. 23, 2003

(54) ACTIVE MATRIX TYPE OF A LIQUID CRYSTAL DISPLAY APPARATUS WHICH CAN KEEP A DESIRABLE APERTURE RATIO, DRIVE A LIQUID CRYSTAL AT A LOW VOLTAGE, AND IMPROVE A RESPONSIVE SPEED AND FURTHER PROTECT A COLORATION FROM AN OBLIQUE FIELD

(75) Inventor: Kimikazu Matsumoto, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 262 days.

(21) Appl. No.: 09/860,633

(22) Filed: May 21, 2001

(65) Prior Publication Data

US 2001/0043304 A1 Nov. 22, 2001

(30) Foreign Application Priority Data

May 19, 2000 (JP) ........................................ 2000-147578

(51) Int. Cl.[7] ............................................. G02F 1/1343
(52) U.S. Cl. ........................ 349/141; 349/139; 349/143; 349/38; 349/39
(58) Field of Search .................................. 349/141, 139, 349/143, 38, 39

(56) References Cited

U.S. PATENT DOCUMENTS 6,222,599 B1 * 4/2001 Yoshida et al. ............. 349/106
6,292,237 B1 * 9/2001 Hebiguchi ................... 349/39

FOREIGN PATENT DOCUMENTS

JP 9-269508 10/1997
JP 2000-39625 2/2000

* cited by examiner

Primary Examiner—James Dudek
Assistant Examiner—David Chung
(74) Attorney, Agent, or Firm—Young & Thompson

(57) ABSTRACT

An active matrix type of a liquid crystal display apparatus, includes a pair of substrates, a liquid crystal layer and a pixel electrode and a common electrode and a transparent auxiliary electrode. The liquid crystal layer is provided between the pair of substrates. The pixel electrode and the common electrode are provided on at least one side of the pair of substrates. The pixel electrode and the common electrode are provided at established intervals to be shaped like teeth of a comb to generate an electric field substantially parallel to the pair of substrates in the liquid crystal layer. The transparent auxiliary electrode is provided through an insulating film above the common electrode. The same voltage as that of the common electrode is applied to the transparent auxiliary electrode such that the electric field applied to the liquid crystal layer is strengthened.

20 Claims, 56 Drawing Sheets

ACTIVE MATRIX TYPE OF A LIQUID CRYSTAL DISPLAY APPARATUS WHICH CAN KEEP A DESIRABLE APERTURE RATIO, DRIVE A LIQUID CRYSTAL AT A LOW VOLTAGE, AND IMPROVE A RESPONSIVE SPEED AND FURTHER PROTECT A COLORATION FROM AN OBLIQUE FIELD

BACKGROUND OF THE INVENTION

1. Field of the Invention

The present invention relates to an in-plane switching type of an active matrix type of a liquid crystal display apparatus for executing a display by rotating a liquid crystal molecule through an electric field generated parallel to a surface of a substrate.

2. Description of the Related Art

In a display panel of an in-plane switching (IPS) type of a liquid crystal display apparatus, its feature lies in a mechanism that can attain a wide field angle by putting liquid crystals at a predetermined interval between a pair of transparent substrates, and applying an effectively parallel electric field to the substrates and then rotating molecules of the liquid crystals in a direction horizontal to the inner surface of the substrate. The electric field parallel to the substrate is generated by placing a pixel electrode and a common electrode on one of the pair of transparent substrates for putting the liquid crystals between them, at a predetermined interval in a form of comb. On the other hand, in the comb electrode, the liquid crystals are raised in a direction vertical to the surface of the substrate. Thus, if the comb electrode is constituted by a transparent electrode such as ITO and the like, this constitution results in a problem of a drop in contrast and the like. So, it is necessary that the comb electrode is constituted by using an opaque electrode.

In the IPS type liquid crystal display apparatus, the technique for protecting the drop in brightness and the deterioration in contrast and field angle property is disclosed in, for example, Japanese Laid Open Patent Application (JP-A-Heisei, 9-269508).

Here, the configuration of the display cell in the conventional IPS liquid crystal display apparatus is described with reference to the drawings. FIG. 1 shows a first plan view (a side of a TFT substrate) according to the conventional display cell. A display cell 201 shown in FIG. 1 has an amorphous silicon 1, a pixel electrode 2, a gate electrode 3, a common electrode 4, a data line 5, a source electrode 6 and a drain electrode 7. Orientation films 11 are printed on the thus-created TFT substrate and respective color filters, each containing a color layer for coloration of equi-process, by using a method such as offset-print and the like. In the thus-created orientation film of the TFT substrate and the color filter substrate, the molecules of the orientation films are aligned in a predetermined direction by using a rubbing method (rubbing direction 19). Then, the cell gap material is put between the two substrates so that a predetermined interval is established between them, and they are combined in this way. Then, the liquid crystal is filled in the gap.

On the liquid crystal panel created as mentioned above, the full color display from a black display to a white display can be carried out by laminating the polarization plates, in which transmission axes are orthogonal to each other in a liquid crystal orientation direction defined by using the rubbing method, and freely applying a potential difference between the pixel electrode 2 and the common electrode 4.

The configuration of the display cell 201 will be described below. FIG. 2 is a section view taken on the line A–A' of the cell 201. In FIG. 2, the upper structure located on an upper portion of a liquid crystal layer in which a liquid crystal 20 is placed is provided with a polarization plate 17, a conductive layer 16, a second transparent substrate 14, a black matrix 12, a color layer (color filter) 13, a smoothing film 15 and an orientation film 11. An edge (not shown) of the black matrix 12 is placed on the common electrode 4.

In FIG. 2, the lower structure located on the lower portion of the liquid crystal layer is provided with an orientation film 11, a passivation film 22, a data line 5, a pixel electrode 2, a layer-to-layer insulation film (gate insulation film) 10, a common electrode 4, a first transparent substrate 9 and a polarization plate 18.

Also, a mutual interval between the common electrode 4 and the pixel electrode 2 to generate an electric field in an effectively lateral direction to the substrate is set at about 10 $\mu$m.

The polarization plates 17, 18 are set at a thickness of about 0.2 mm. The conductive layer 16 is set at a thickness of about 500 Å. The first and second transparent substrates 9, 14 are set at a thickness of about 0.7 mm. The black matrix 12 is set at a thickness of about 1 $\mu$m. The color layer 13 is set at a thickness of about 1 $\mu$m. The smoothing layer 15 is set at a thickness of about 1 $\mu$m. The orientation film 11 is set at a thickness of about 500 Å. The data line 5 and the pixel electrode 2 are set at a thickness of about 2000 Å. The layer-to-layer insulation film (gate insulation film) 10 is set at a thickness of about 5000 Å. The passivation film 22 is set at a thickness of about 3000 Å. The common electrode 4 is set at a thickness of about 5000 Å.

FIG. 3 shows a second plan view according to the conventional display cell. A display cell 202 shown in FIG. 2 is provided with an amorphous silicon 1, a pixel electrode 2, a gate electrode 3, a common electrode 4, a data line 5, a source electrode 6 and a drain electrode 7.

FIG. 4 shows a section of the cell 202. FIG. 4 shows a second section according to the conventional display cell. In FIG. 4, the upper structure located on an upper portion of a liquid crystal layer in which a liquid crystal 20 is placed is provided with a polarization plate 17, a conductive layer 16, a second transparent substrate 14, a black matrix 12, a color layer 13, a smoothing film 15 and an orientation film 11.

In FIG. 4, the lower structure located on the lower portion of the liquid crystal layer is provided with an orientation film 11, a passivation film 22, a data line 5, a pixel electrode 2, a layer-to-layer insulation film (gate insulation film) 10, a common electrode 4, a first transparent substrate 9 and a polarization plate 18.

The display cell 202 shown in FIGS. 3, 4 differ from the cell 201 shown in FIGS. 1, 2 in the shapes of the edges of the pixel electrode 2 and the common electrode 4. The other configurations are same. Due to the difference between the shapes, there is no region where the liquid crystal is inversely rotated in the vicinity of the edge in the display cell 202. Thus, it is possible to improve the display performance and the reliability.

FIG. 5 is a view showing a first drive performance of the IPS liquid crystal display apparatus. As shown in FIG. 5, the IPS liquid crystal display apparatus is designed such that when an interval between the comb electrodes (an interval between the pixel electrode 2 and the common electrode 4) is made narrow, the liquid crystal can be driven at a low voltage. However, on the other hand, the narrower interval between the electrodes increases the areas of the common electrode and the pixel electrode which are opaque. Thus, this results in a problem that a brightness is reduced because of a drop in an aperture ratio.

FIG. 6 is a view showing a second drive performance of the IPS liquid crystal display apparatus. As shown in FIG. 6, a responsive speed is made shorter if a cell gap is made narrower (the interval between the color filter substrate and the substrate with TFT: the thickness of the liquid crystal layer). However, on the other hand, there is a problem that if the cell gap is made narrower, a predetermined brightness can not be obtained unless a voltage to drive the liquid crystal is made higher.

FIG. 7 is a view showing the drive concept in the vicinity of the comb electrode in the IPS liquid crystal display apparatus. As shown in FIG. 7, the liquid crystals 20 are oriented along the electric field generated by the actions of the pixel electrode 2 and the common electrode 4 (in a direction vertical to an equi-potential surface 61). Also, the orientation directions of the liquid crystals are different on a right half and a left half on the pixel electrode 2, with a center of an electrode width as an axis. Thus, a discrimination is induced (a discrimination occurrence position 62). Hence, a light shield function is required for the discrimination occurrence position 62.

Japanese Laid Open Patent Application (JP-A-2000-39625) discloses a liquid crystal display apparatus for making light transparent ratio high and preventing inconsistencies in display from occurring.

In the IPS liquid crystal display apparatus, the drop in a viscosity of liquid crystal material and the narrow cell gap must be essentially attained in order to make the responsive speed faster. The improvement of the responsive speed using this method has the problem involving the increase in the drive voltage, as shown in FIG. 6. Thus, it is necessary to make the interval between the comb electrodes narrower, in order to set this drive voltage, for example, to be equal to or less than 5 V and also obtain a desirable strength of an electric field. However, if the interval between the comb electrodes is made narrower, since the pixel electrode and the common electrode are opaque, the aperture ratio is dropped, and the brightness is reduced. Hence, it is virtually impossible to make the interval between the comb electrodes narrower, and thereby obtain the desirable strength of the electric field.

SUMMARY OF THE INVENTION

The present invention is accomplished in view of the above mentioned problems. Therefore, an object of the present invention is to provide an active matrix type of a liquid crystal display apparatus which can keep a desirable aperture ratio, drive a liquid crystal at a low voltage, and improve a responsive speed and further protect a coloration from an oblique field.

In order to achieve an aspect of the present invention, an active matrix type of a liquid crystal display apparatus, includes: a pair of substrates; a liquid crystal layer provided between the pair of substrates; a pixel electrode and a common electrode provided on at least one side of the pair of substrates, wherein the pixel electrode and the common electrode are provided at established intervals to be shaped like teeth of a comb to generate an electric field substantially parallel to the pair of substrates in the liquid crystal layer; and a transparent auxiliary electrode provided through an insulating film above the common electrode, wherein a same voltage as that of the common electrode is applied to the transparent auxiliary electrode such that the electric field applied to the liquid crystal layer is strengthened.

In order to achieve another aspect of the present invention, an active matrix type of a liquid crystal display apparatus, includes: a pair of substrates; a liquid crystal layer provided between the pair of substrates; a pixel electrode and a common electrode provided on at least one side of the pair of substrates, wherein the pixel electrode and the common electrode are provided at established intervals to be shaped like teeth of a comb to generate an electric field substantially parallel to the pair of substrates in the liquid crystal layer; a first transparent auxiliary electrode provided above the pixel electrode; and a second transparent auxiliary electrode provided above the common electrode through a contact hole electrically connected to the first transparent auxiliary electrode, and wherein the first transparent auxiliary electrode is formed on a same layer as that on which the second transparent auxiliary electrode is formed.

In order to achieve still another aspect of the present invention, an active matrix type of a liquid crystal display apparatus, includes: a pair of substrates; a liquid crystal layer provided between the pair of substrates; a pixel electrode and a common electrode provided on at least one side of the pair of substrates, wherein the pixel electrode and the common electrode are provided at established intervals to be shaped like teeth of a comb to generate an electric field substantially parallel to the pair of substrates in the liquid crystal layer; a first transparent auxiliary electrode provided above the pixel electrode; and a second transparent auxiliary electrode provided above the common electrode through a contact hole electrically connected to the first transparent auxiliary electrode, and wherein the first transparent auxiliary electrode is formed on a first layer and the second transparent auxiliary electrode is formed through an insulating film on a second layer different from the first layer.

In order to achieve yet still another aspect of the present invention, an active matrix type of a liquid crystal display apparatus, includes: a pair of substrates; a liquid crystal layer provided between the pair of substrates; a pixel electrode and a common electrode provided on at least one side of the pair of substrates, wherein the pixel electrode and the common electrode are provided at established intervals to be shaped like teeth of a comb to generate an electric field substantially parallel to the pair of substrates in the liquid crystal layer; and a transparent auxiliary electrode provided through an insulating film above a single one of the pixel electrode and the common electrode, wherein the transparent auxiliary electrode is electrically connected to the single one through a contact hole.

In this case, the liquid crystal display apparatus includes a plurality of the contact holes per a display pixel of the liquid crystal display apparatus.

Also in this case, the liquid crystal display apparatus includes a plurality of the contact holes per a display pixel of the liquid crystal display apparatus.

Further in this case, the liquid crystal display apparatus includes a plurality of the contact holes per a display pixel of the liquid crystal display apparatus.

In this case, the pixel electrode and the common electrode and the transparent auxiliary electrode are shaped like teeth of the comb to generate the electric field, and wherein each of the pixel electrode and the common electrode and the transparent auxiliary electrode is shaped like a straight line.

Also in this case, the pixel electrode and the common electrode and the transparent auxiliary electrode are shaped like teeth of the comb to generate the electric field, and wherein each of the pixel electrode and the common electrode and the transparent auxiliary electrode is shaped like a straight line.

Further in this case, the pixel electrode and the common electrode and the transparent auxiliary electrode are shaped like teeth of the comb to generate the electric field, and wherein each of the pixel electrode and the common electrode and the transparent auxiliary electrode is shaped like a straight line.

In this case, the pixel electrode and the common electrode and the transparent auxiliary electrode are shaped like teeth of the comb to generate the electric field, and wherein each of the pixel electrode and the common electrode and the transparent auxiliary electrode is shaped like a straight line.

Also in this case, the pixel electrode and the common electrode and the transparent auxiliary electrode are shaped like teeth of the comb to generate the electric field, and wherein at least one of the pixel electrode and the common electrode and the transparent auxiliary electrode is shaped like bent.

Further in this case, the pixel electrode and the common electrode and the transparent auxiliary electrode are shaped like teeth of the comb to generate the electric field, and wherein at least one of the pixel electrode and the common electrode and the transparent auxiliary electrode is shaped like bent.

In this case, the at least one of the pixel electrode and the common electrode and the transparent auxiliary electrode is created in a form of a triangular notch.

Also in this case, the pixel electrode and the common electrode and the transparent auxiliary electrode are shaped like teeth of the comb to generate the electric field, and wherein a width of the transparent auxiliary electrode is wider than those of the pixel electrode and the common electrode such that a space between the teeth of the comb is lessened.

Further in this case, the pixel electrode and the common electrode and the transparent auxiliary electrode are shaped like teeth of the comb to generate the electric field, and wherein a width of the transparent auxiliary electrode is wider than those of the pixel electrode and the common electrode such that a space between the teeth of the comb is lessened.

In this case, the pixel electrode and the common electrode and the transparent auxiliary electrode are shaped like teeth of the comb to generate the electric field, and wherein a width of the transparent auxiliary electrode is wider than those of the pixel electrode and the common electrode such that a space between the teeth of the comb is lessened.

Also in this case, the pixel electrode and the common electrode and the transparent auxiliary electrode are shaped like teeth of the comb to generate the electric field, and wherein a width of the transparent auxiliary electrode is wider than those of the pixel electrode and the common electrode such that a space between the teeth of the comb is lessened.

Further in this case, a center line of a width of the transparent auxiliary electrode is a same as that of one of the pixel electrode and the common electrode.

In this case, a material of the transparent auxiliary electrode is an ITO.

BRIEF DESCRIPTION OF THE DRAWINGS

FIG. 56A is a view showing one step of manufacturing of a contact hole according to the present invention;

FIG. 56B is a view showing another step of manufacturing of a contact hole according to the present invention;

FIG. 56C is a view showing still another step of manufacturing of a contact hole according to the present invention;

FIG. 56D is a view showing still another step of manufacturing of a contact hole according to the present invention;

FIG. 56E is a view showing still another step of manufacturing of a contact hole according to the present invention;

FIG. 56F is a view showing still another step of manufacturing of a contact hole according to the present invention;

FIG. 56G is a view showing still another step of manufacturing of a contact hole according to the present invention;

FIG. 56H is a view showing still another step of manufacturing of a contact hole according to the present invention;

FIG. 56I is a view showing still another step of manufacturing of a contact hole according to the present invention;

FIG. 56J is a view showing still another step of manufacturing of a contact hole according to the present invention;

FIG. 56K is a view showing still another step of manufacturing of a contact hole according to the present is invention; and FIG. 56L is a view showing still another step of manufacturing of a contact hole according to the present invention.

DESCRIPTION OF THE PREFERRED EMBODIMENTS

Embodiments of the present invention will be described below together with various variation examples. Those variation examples are mainly based on the variation of the shape of an electrode.

Figure 1:
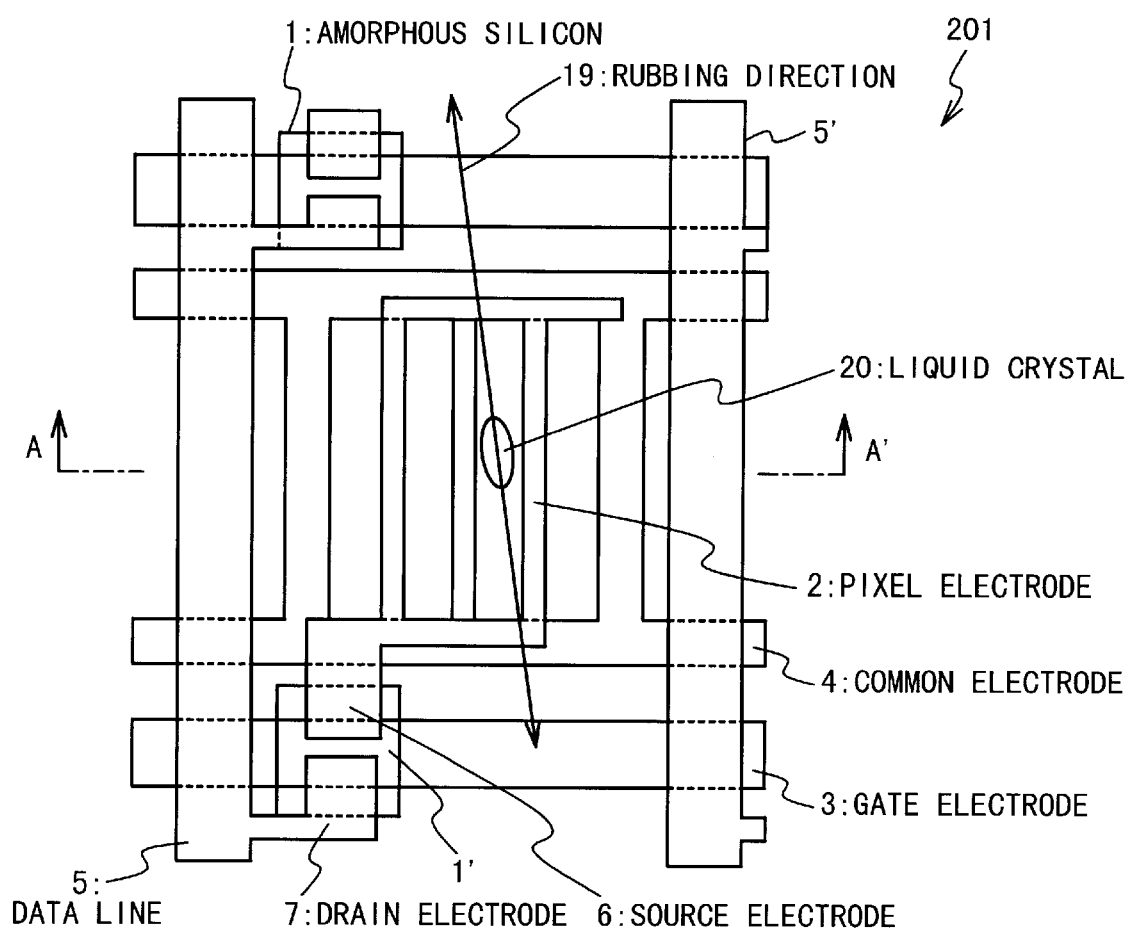
FIG. 1 is a first plan view according to a conventional display cell.
Figure 2:
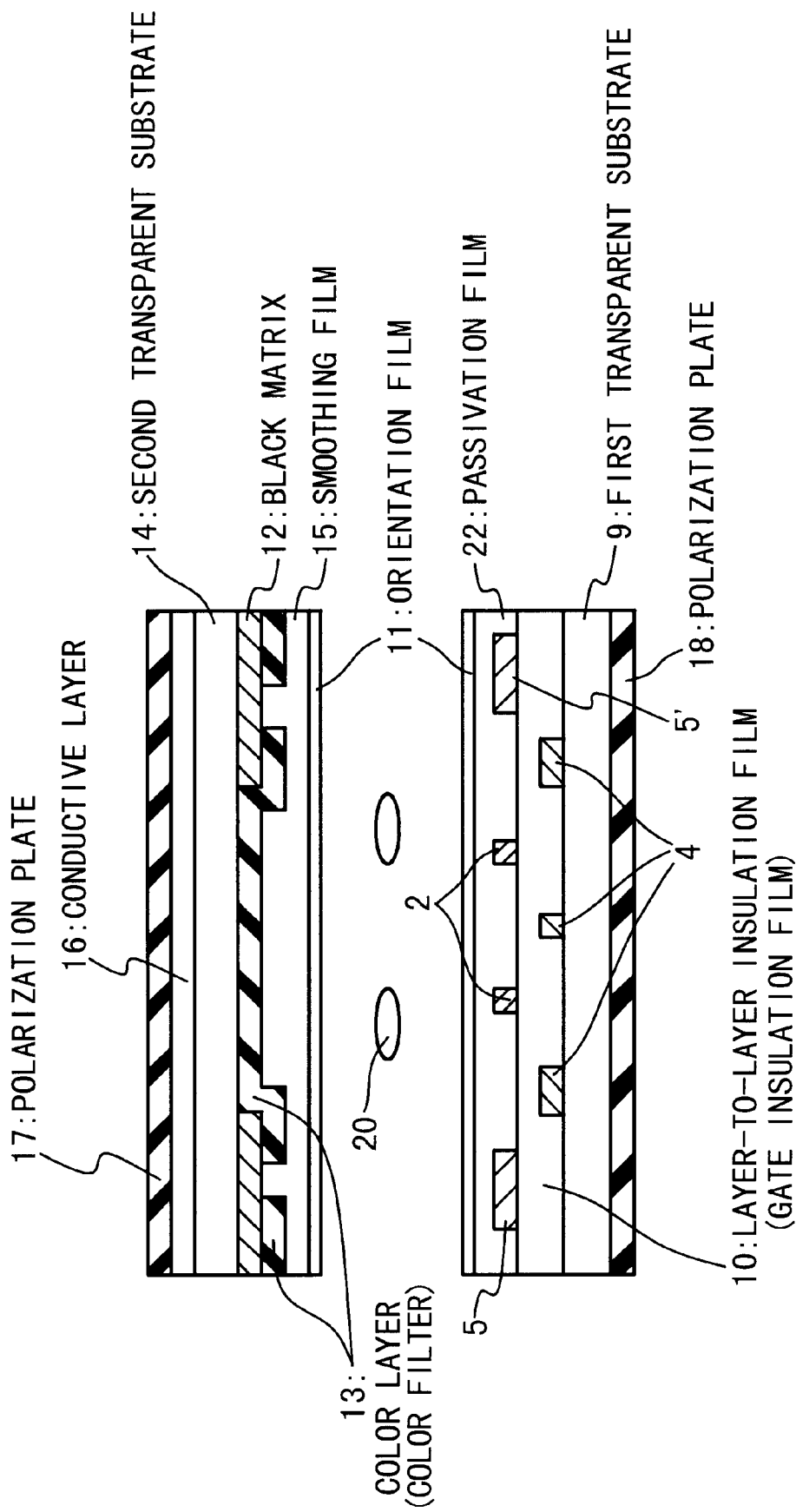
FIG. 2 is a first section view according to the conventional display cell.
Figure 3:
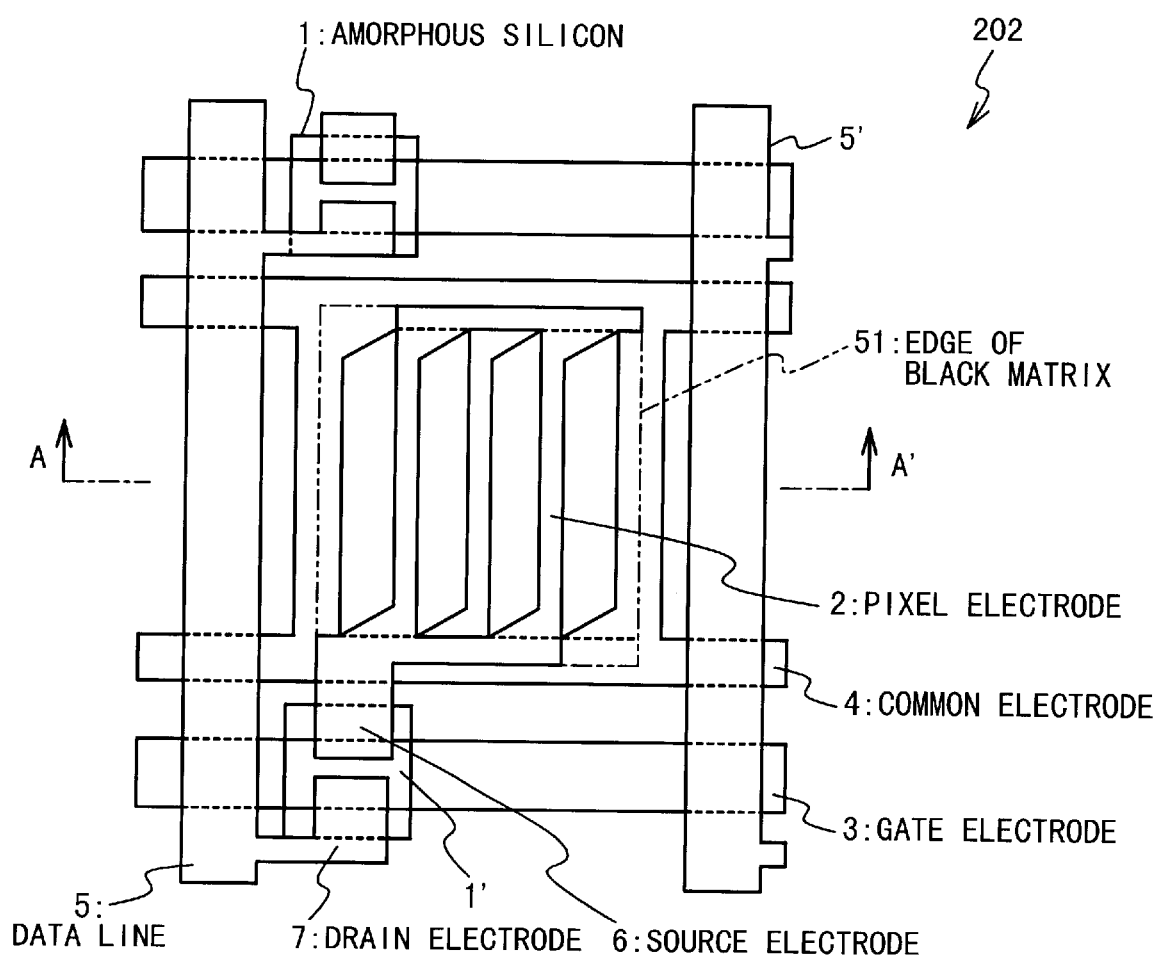
FIG. 3 is a second plan view according to the conventional display cell.
Figure 4:
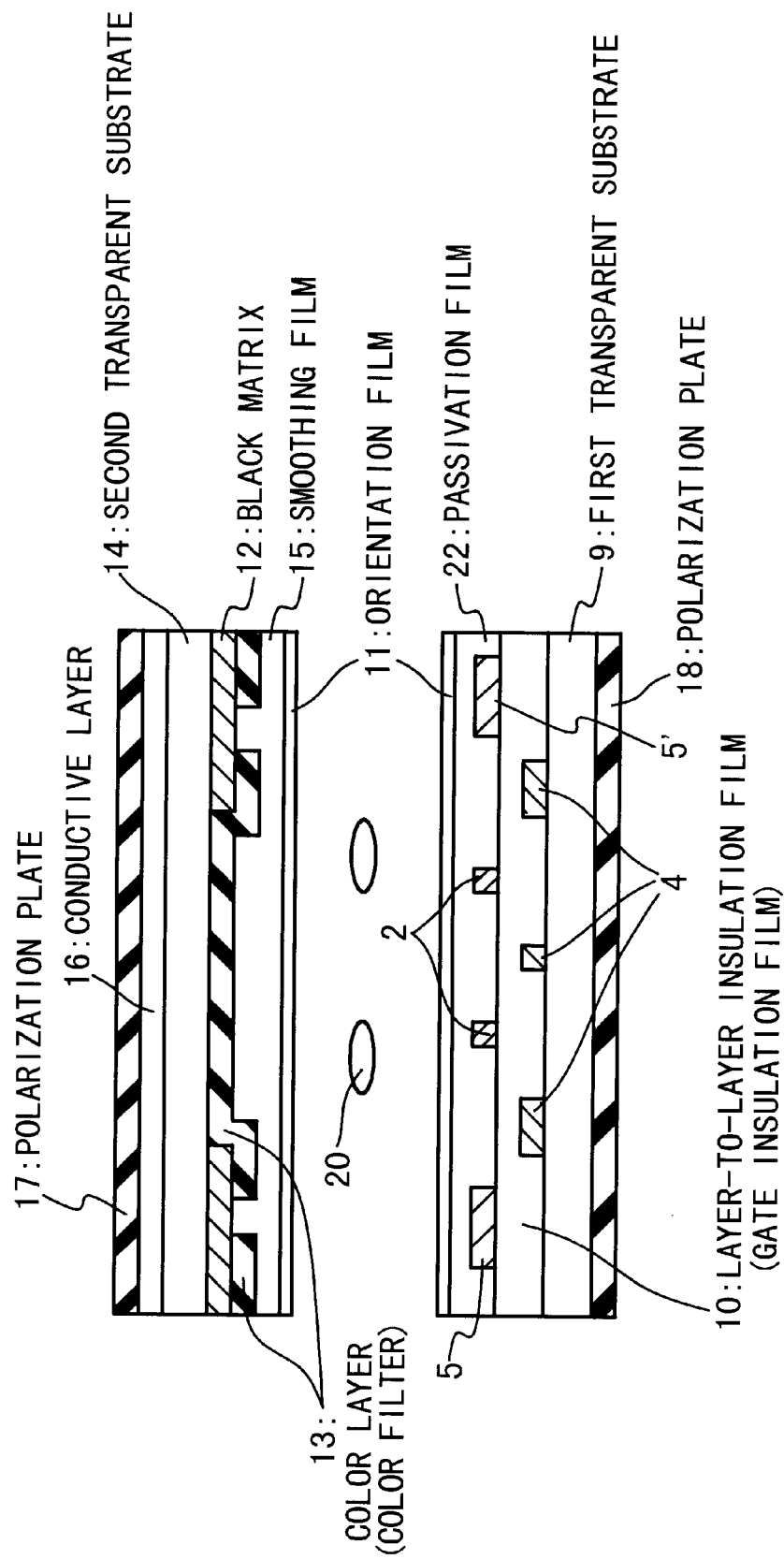
FIG. 4 is a second section view according to the conventional display cell.
Figure 5:
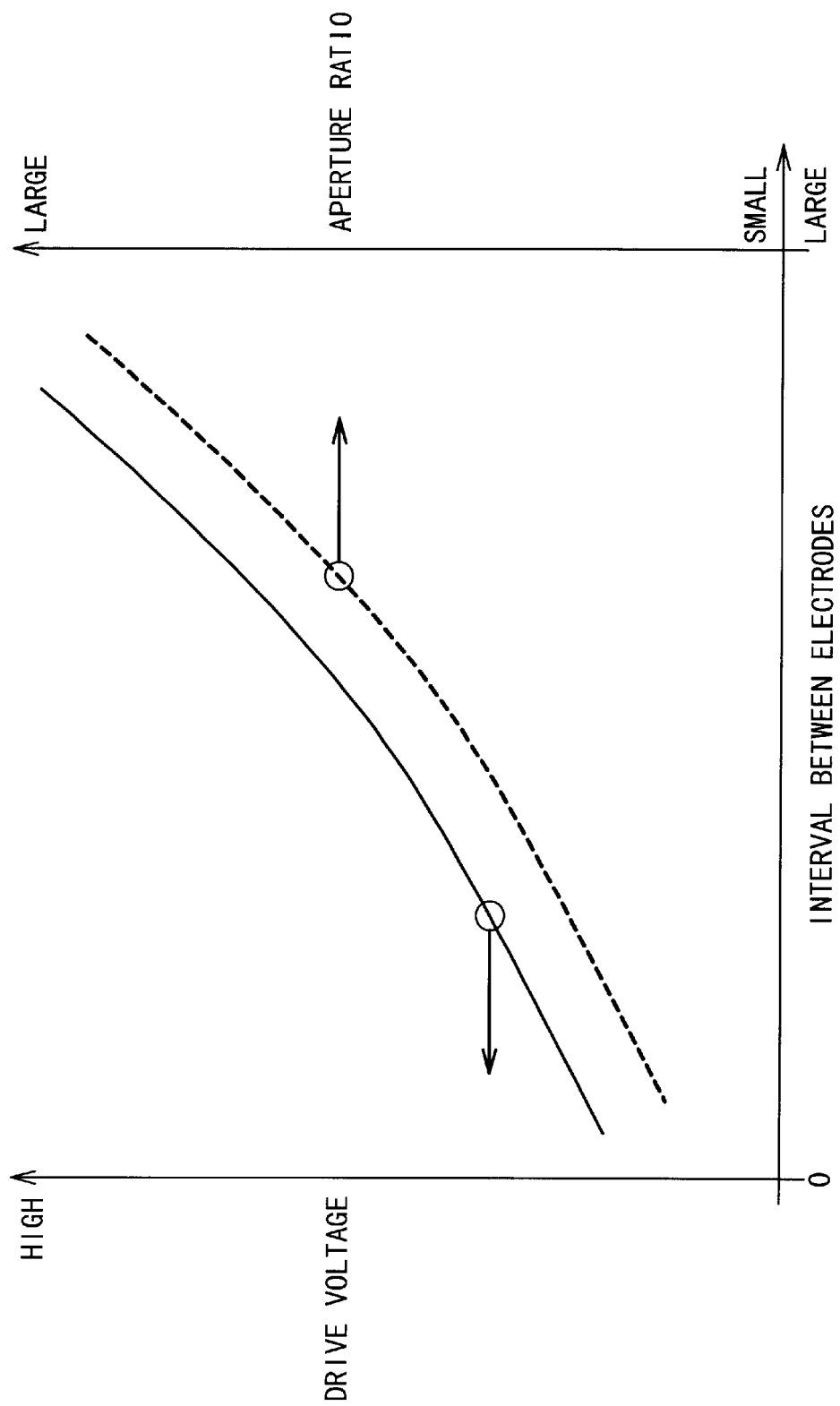
FIG. 5 is a view showing a first drive performance of an IPS liquid crystal display apparatus.
Figure 6:
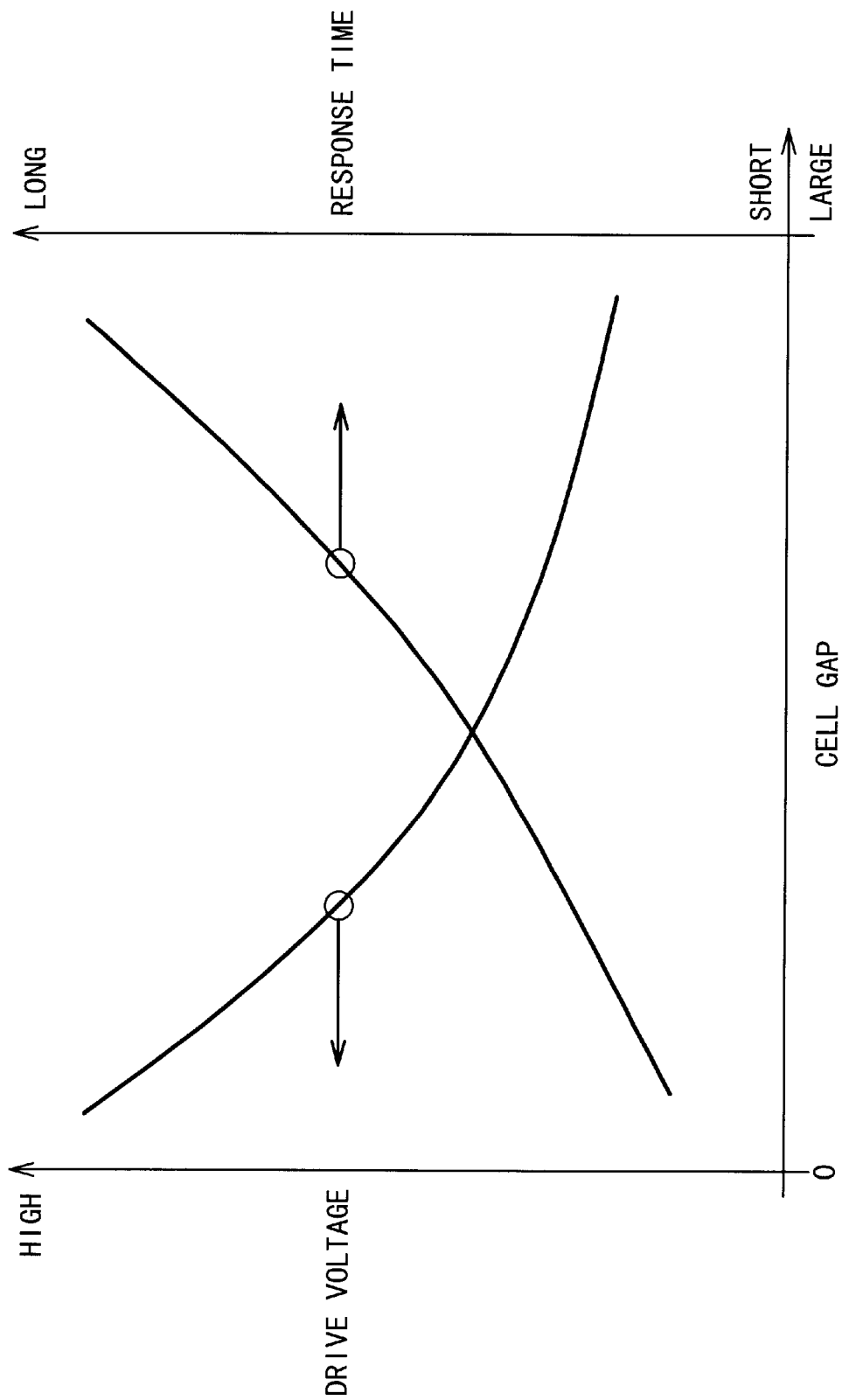
FIG. 6 is a view showing a second drive performance of an IPS liquid crystal display apparatus
Figure 7:
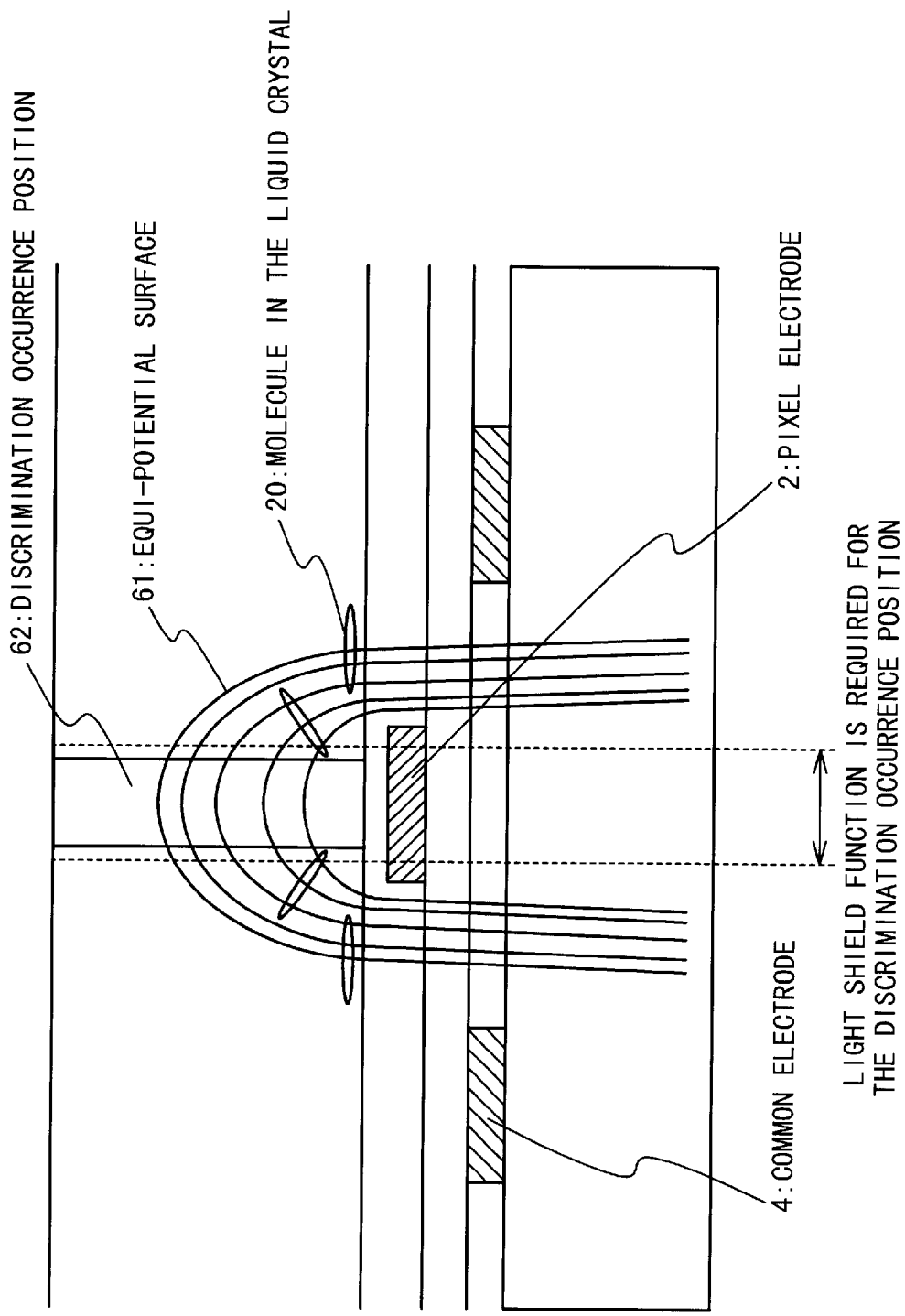
FIG. 7 is a view showing a drive concept of an IPS liquid crystal display apparatus.
Figure 8:
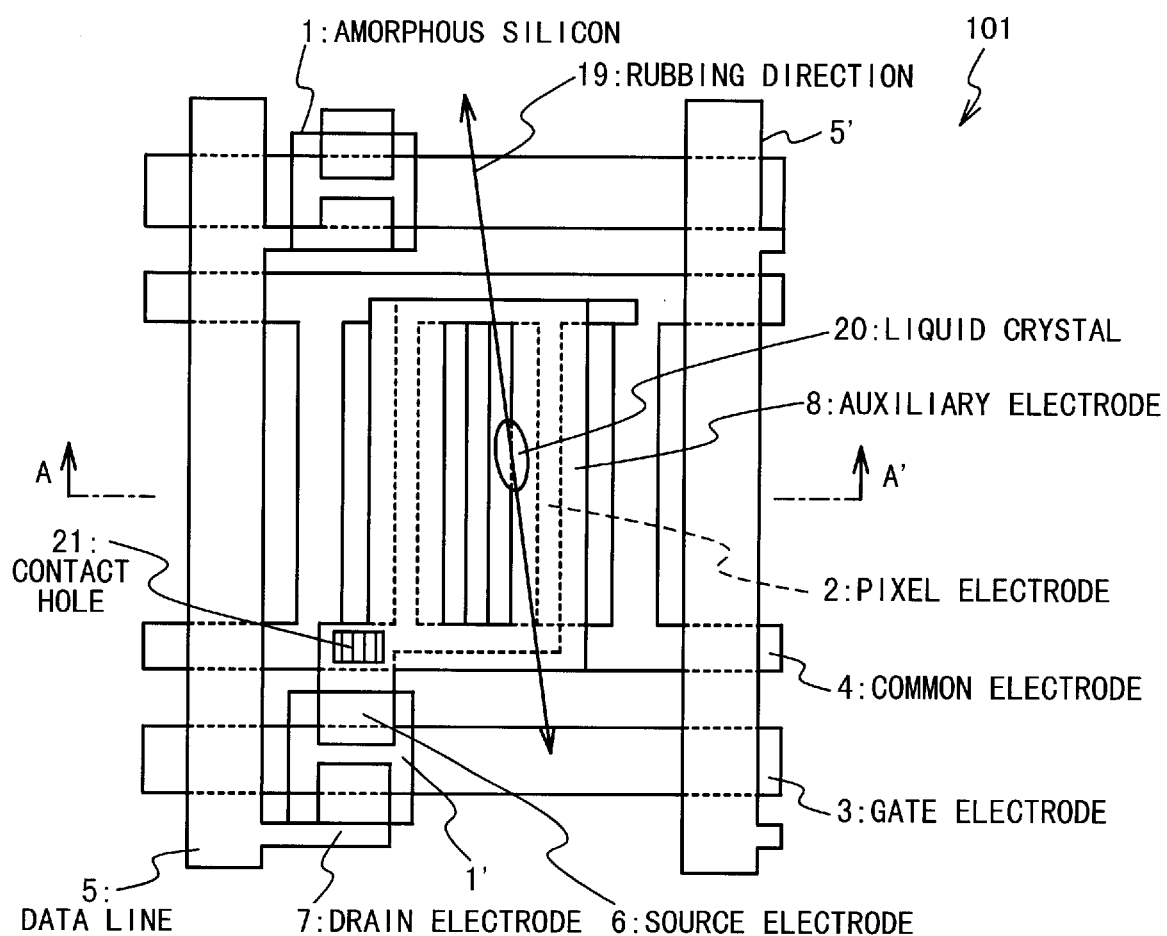
FIG. 8 is a first plan view according to a display cell of the present invention.

A first embodiment of a display cell according to the present invention will be described below with reference to FIGS. 8, 9. FIG. 8 shows a first plan view (a side of a TFT substrate). A cell 101 shown in FIG. 8 has an amorphous silicon 1, a pixel electrode 2, a gate electrode 3, a common electrode 4, a data line 5, a source electrode 6, a drain electrode 7 and a contact hole 21. A liquid crystals 20 of the cell 101 shown in FIG. 8 are initially oriented in a rubbing direction 19 (at an angle deviated by 15 degrees with respect to a longitudinal direction of a comb electrode).

Figure 9:
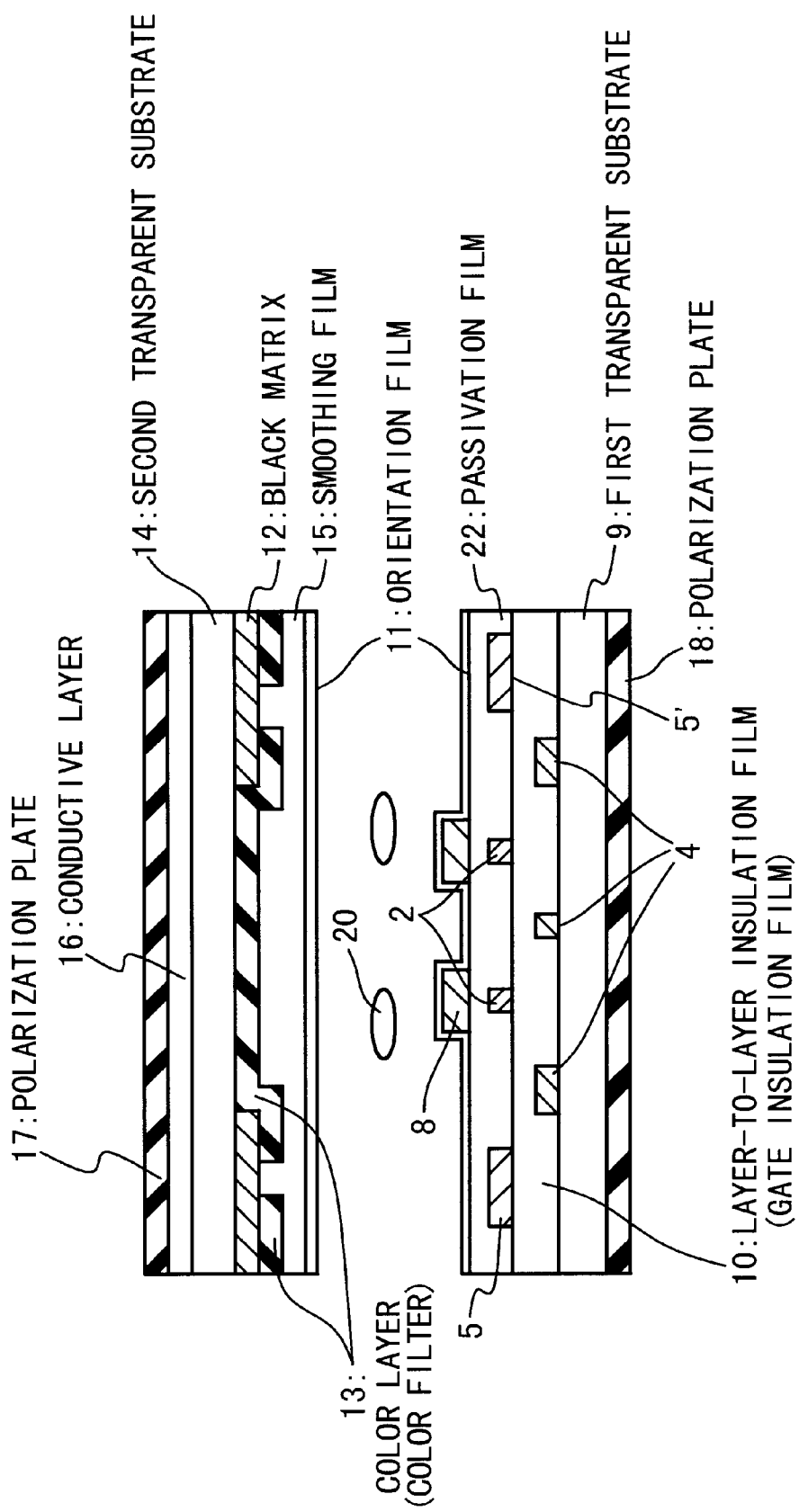
FIG. 9 is a first section view according to the display cell of the present invention.

FIG. 9 shows a section taken on the line A–A' of the display cell 101 of the present invention. FIG. 9 is a first section view according to the display cell of the present invention. In FIG. 9, the upper structure located on an upper portion of a liquid crystal layer composed of the liquid crystals 20 is provided with a polarization plate 17, a conductive layer 16, a second transparent substrate 14, a black matrix 12, a color layer 13, a smoothing film 15 and an orientation film 11. The lower structure located on the lower portion of the liquid crystal layer is provided with an orientation film 11, an auxiliary electrode 8, a passivation film 22, a pixel electrode 2, a data line 5, a layer-to-layer insulation film (gate insulation film) 10, a common electrode 4, a first transparent substrate 9 and a polarization plate 18.

An interval between the pixel electrode 2 and the common electrode 4 is set at about 10 µm. An interval between the auxiliary electrode 8 and the pixel electrode 2 and an interval between the auxiliary electrode 8 and the common electrode 4 are set at about 5 to 8 µm.

The polarization plates 17, 18 are set at a thickness of about 0.2 mm. The conductive layer 16 is set at a thickness of about 500 Å. The first and second transparent substrates 9, 14 are set at a thickness of about 0.7 mm. The black matrix 12 is set at a thickness of about 1 µm. The smoothing layer 15 is set at a thickness of about 1 µm. The passivation film 22 is set at a thickness of about 3000 Å. The orientation film 11 is set at a thickness of about 500 Å. The data line 5 and the pixel electrode 2 are set at a thickness of about 2000 Å. The common electrode 4 is set at a thickness of about 2000 Å. The auxiliary electrode 8 is set at a thickness of about 1000 Å.

The pixel electrode 2 and the common electrode 4 are the opaque electrodes made of chrome and the like. The auxiliary electrode 8 is the transparent electrode made of ITO and the like. The auxiliary electrode 8 is connected through the contact hole 21 (FIG. 8) to the pixel electrode 2. Thus, a potential, which is substantially equal to that of the pixel electrode 2, is applied to the auxiliary electrode 8. The action equivalent to an expansion of the pixel electrode 2 is generated in the auxiliary electrode 8. Hence, it is possible to obtain the effect of increasing a strength of an electric field generated between the pixel electrode 2 and the common electrode 4.

The auxiliary electrode 8 is constituted by the opaque electrode, and it has no influence on an aperture ratio of the display cell 101. Thus, it can contribute to the improvement in the strength of the electric field while avoiding the drop in the aperture ratio of the display cell 101. That is, the liquid crystal display apparatus having this configuration can improve the responsive speed without increasing a drive voltage applied to the liquid crystal by forming a narrow cell gap, and also avoid the drop in the aperture ratio, and further obtain the high brightness and the high contrast.

Figure 10:
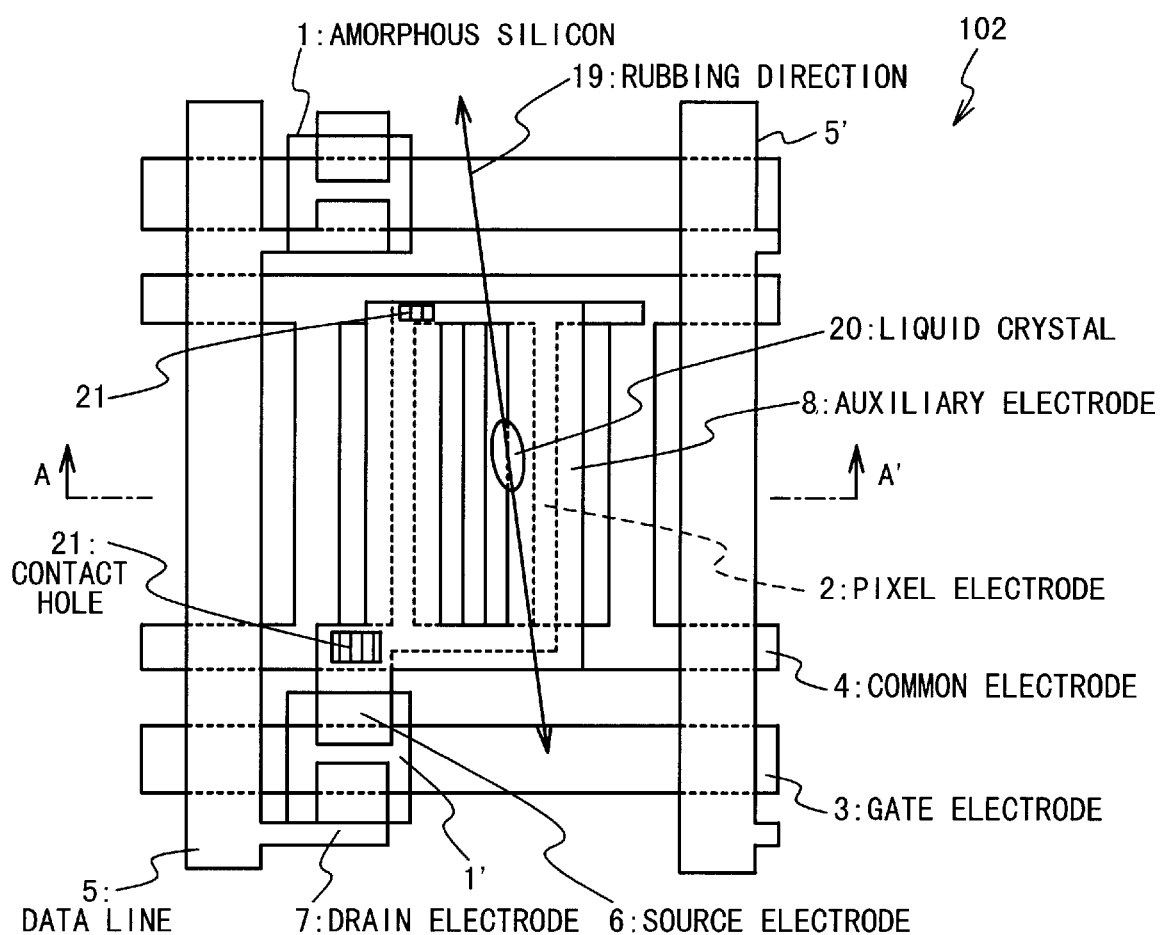
FIG. 10 is a second plan view according to the display cell of the present invention.

Here, a second embodiment of the display cell according to the present invention will be described below with reference to FIGS. 10, 11. FIG. 10 shows a second plane according to the display cell of the present invention. A cell 102 shown in FIG. 10 has the amorphous silicon 1, the pixel electrode 2, the gate electrode 3, the common electrode 4, the data line 5, the source electrode 6, the drain electrode 7 and contact holes 21, 21'. The liquid crystals 20 of the display cell 102 shown in FIG. 10 are initially oriented in the rubbing direction 19 (at the angle deviated by 15 degrees with respect to the longitudinal direction of the comb electrode).

Figure 11:
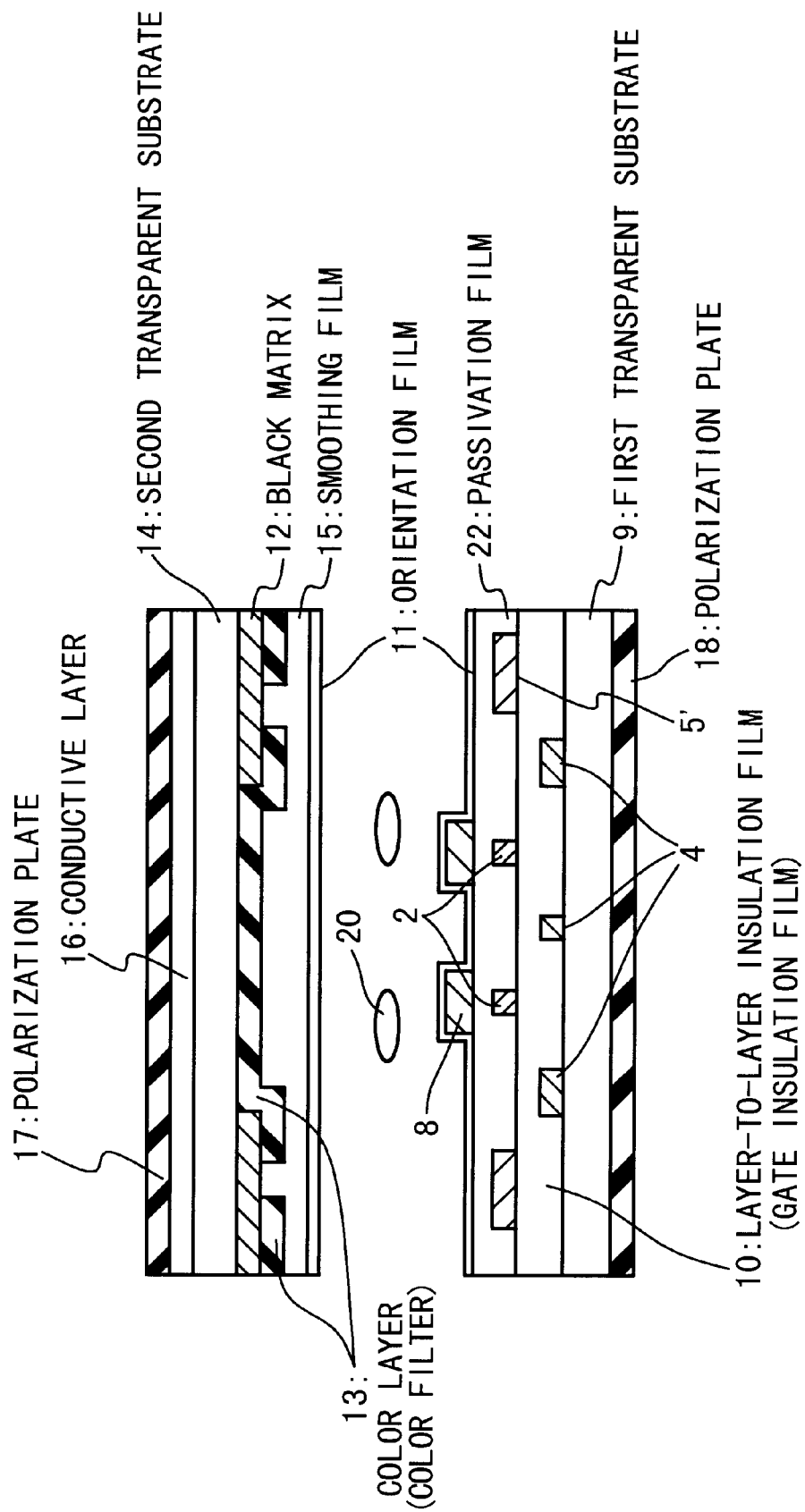
FIG. 11 is a second section view according to the display cell of the present invention.

FIG. 11 shows a section taken on the line A–A' of the display cell 102 of the present invention. FIG. 11 is a second section view (the side of the TFT substrate) according to the display cell of the present invention. In FIG. 11, the upper structure located on the upper portion of the liquid crystal layer composed of the liquid crystals 20 is provided with the polarization plate 17, the conductive layer 16, the second transparent substrate 14, the black matrix 12, the color layer 13, the smoothing film 15 and the orientation film 11. The lower structure located on the lower portion of the liquid crystal layer is provided with the orientation film 11, the auxiliary electrode 8, the passivation film 22, the pixel electrode 2, the data line 5, the layer-to-layer insulation film (gate insulation film) 10, the common electrode 4, the first transparent substrate 9 and the polarization plate 18.

The structure of the display cell 102 shown in FIGS. 10, 11 is basically equal to that of the display cell 101 shown in FIGS. 8, 9. The difference lies in the configuration in which the display cell 102 has the contact hole 21'. The display cell 102 has the two contact holes. Thus, a potential of the auxiliary electrode 8 can be set accurately and substantially constantly for any position.

Figure 12:
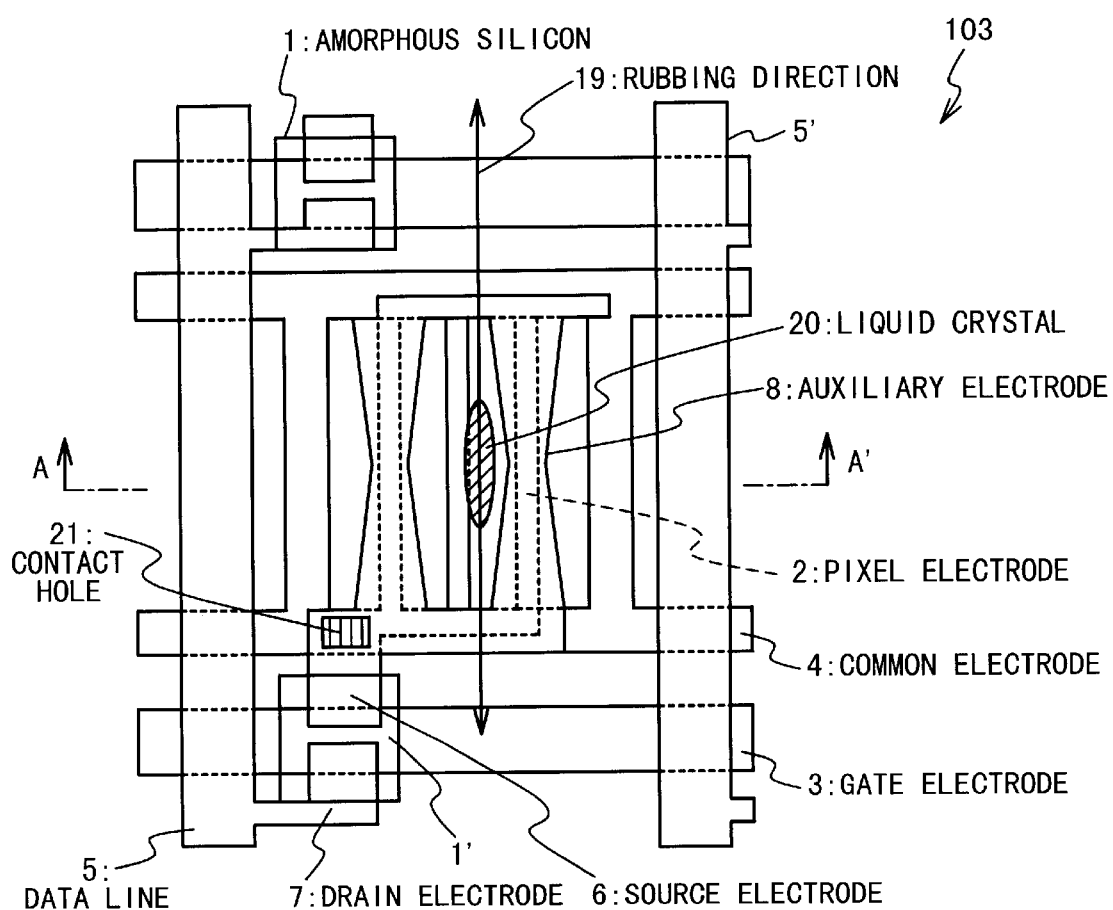
FIG. 12 is a third plan view according to the display cell of the present invention.

Here, a third embodiment of the display cell according to the present invention will be described below with reference to FIGS. 12, 13. FIG. 12 shows a third plan view according to the display cell of the present invention. A cell 103 shown in FIG. 12 has the amorphous silicon 1, the pixel electrode 2, the gate electrode 3, the common electrode 4, the data line 5, the source electrode 6, the drain electrode 7 and the contact hole 21. The liquid crystals 20 of the display cell 103 shown in FIG. 12 are initially oriented in the rubbing direction 19 (parallel to the longitudinal direction of the common electrode 4).

Figure 13:
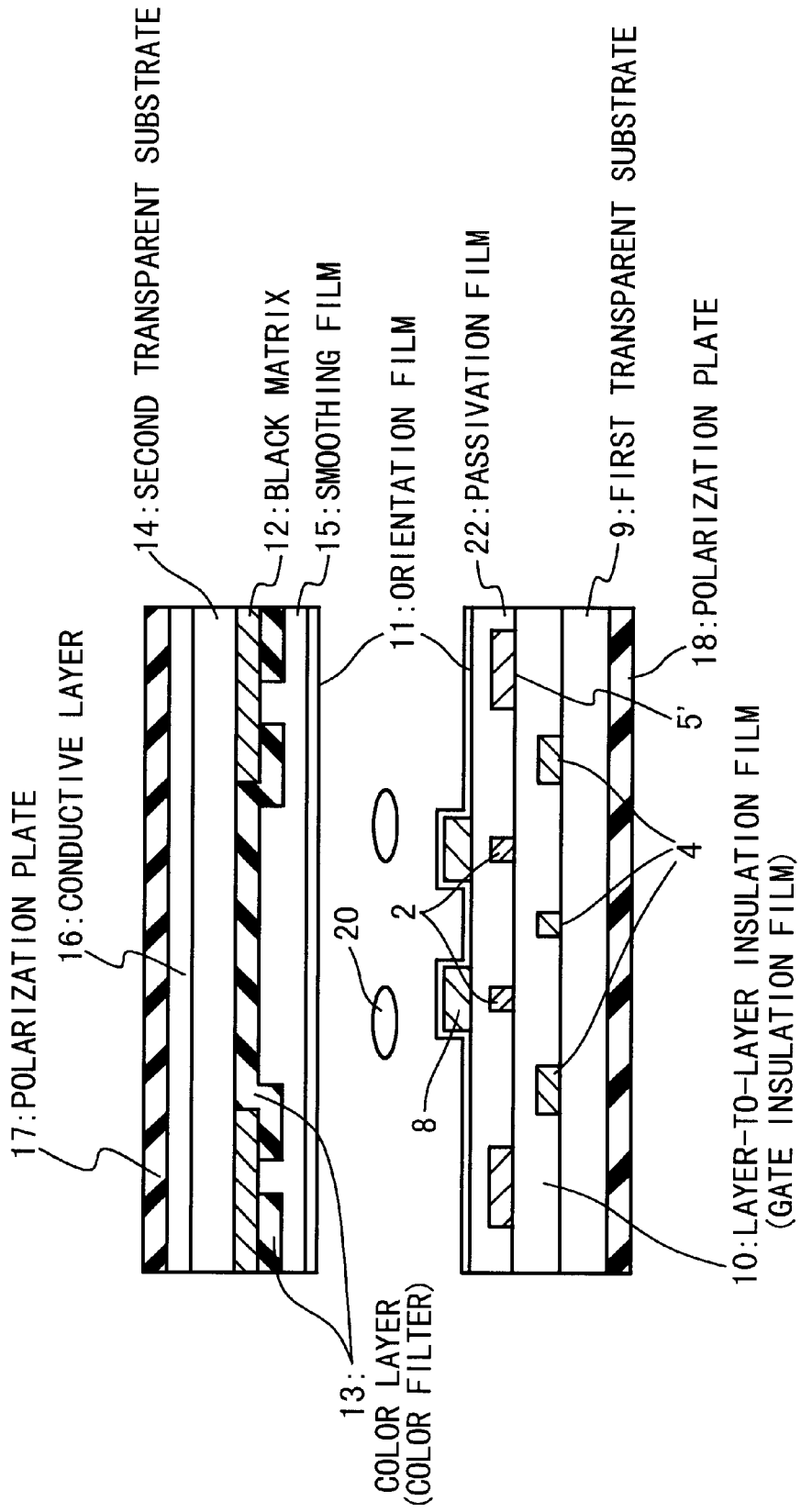
FIG. 13 is a third section view according to the display cell of the present invention.

FIG. 13 shows a section taken on the line A–A' of the display cell 103 of the present invention. FIG. 13 is a third section view (the side of the TFT substrate) according to the display cell of the present invention. In FIG. 13, the upper structure located on the upper portion of the liquid crystal layer composed of the liquid crystals 20 is provided with the polarization plate 17, the conductive layer 16, the second transparent substrate 14, the black matrix 12, the color layer 13, the smoothing film 15 and the orientation film 11. The lower structure located on the lower portion of the liquid crystal layer is provided with the orientation film 11, the auxiliary electrode 8, the passivation film 22, the pixel electrode 2, the data line 5, the layer-to-layer insulation film (gate insulation film) 10, the common electrode 4, the first transparent substrate 9 and the polarization plate 18.

The structure of the display cell 103 shown in FIGS. 12, 13 is basically equal to that of the display cell 101 shown in FIGS. 8, 9. The difference lies in the shape of the auxiliary electrode 8 and the initial orientation angle of the liquid crystal 20 (the rubbing direction 19: parallel to the longitudinal direction of the common electrode 4). In the auxiliary electrode 8 having the same potential as the pixel electrode 2 of the display cell 103, a constricted part is formed in the vicinity of the center of the electrode 8, and the common electrode 4 is straight in shape. Thus, in the display cell 103 of the comb electrode, the action of the constricted part leads to the coexistence of the region where the liquid crystal 20 is rotated in a right direction with the region where it is rotated in a left direction, within a column through which a light is passed. For this reason, in a white display, even if the electric field is applied between the pixel electrode 2 and the common electrode 4, the orientation directions of the liquid crystals are not oriented in one direction. Thus, it is possible to protect the coloration from the oblique field. Moreover, this has the merit of attaining the field angle wider than those of the display cells 101, 102.

Figure 14:
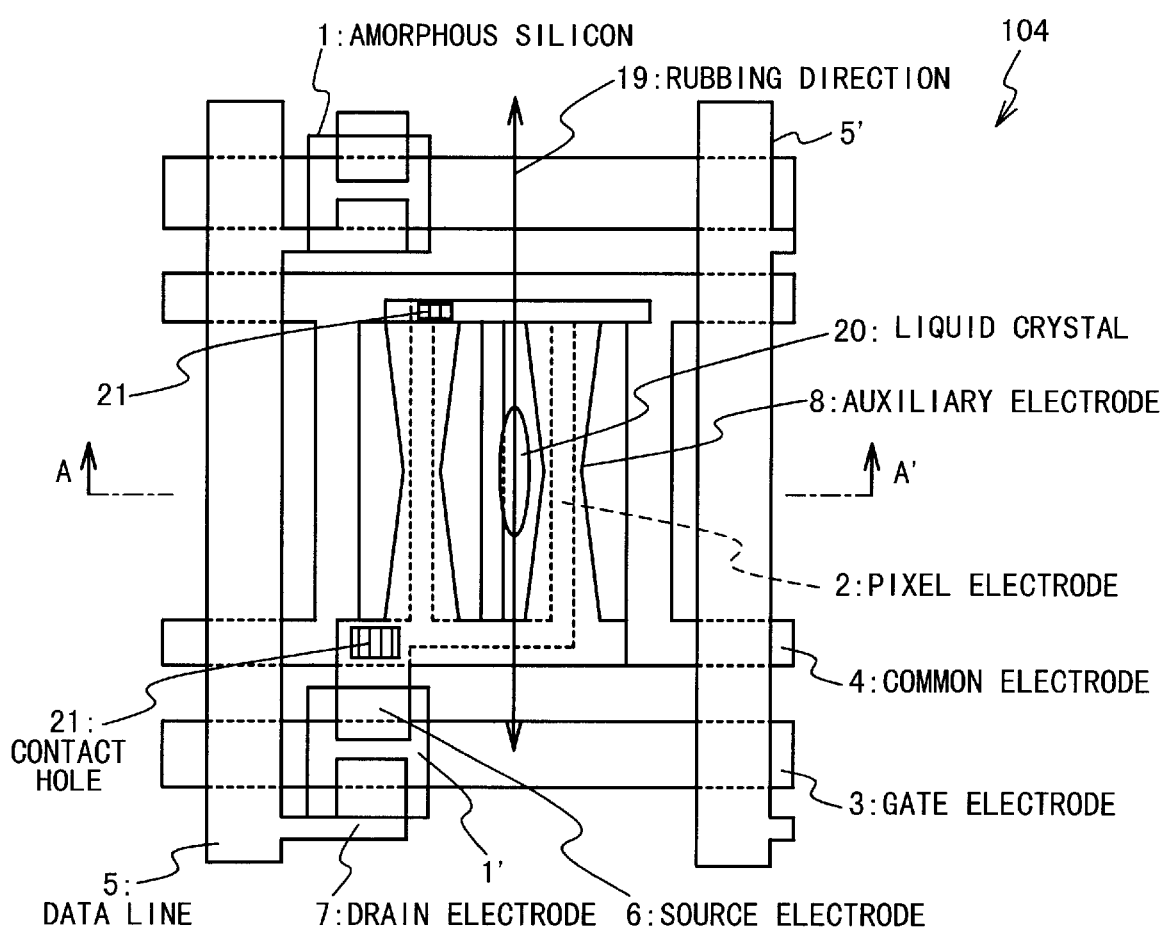
FIG. 14 is a fourth plan view according to the display cell of the present invention.

Here, a fourth embodiment of the display cell according to the present invention will be described below with reference to FIGS. 14, 15. FIG. 14 shows a fourth plane (the side of the TFT substrate) according to the display cell of the present invention. A cell 104 shown in FIG. 14 has the amorphous silicon 1, the pixel electrode 2, the gate electrode 3, the common electrode 4, the data line 5, the source electrode 6, the drain electrode 7 and the contact holes 21, 21'. The auxiliary electrode 8 has a two-pole structure. The liquid crystals 20 of the display cell 104 shown in FIG. 14 are initially oriented in the rubbing direction 19 (parallel to the longitudinal direction of the common electrode 4).

Figure 15:
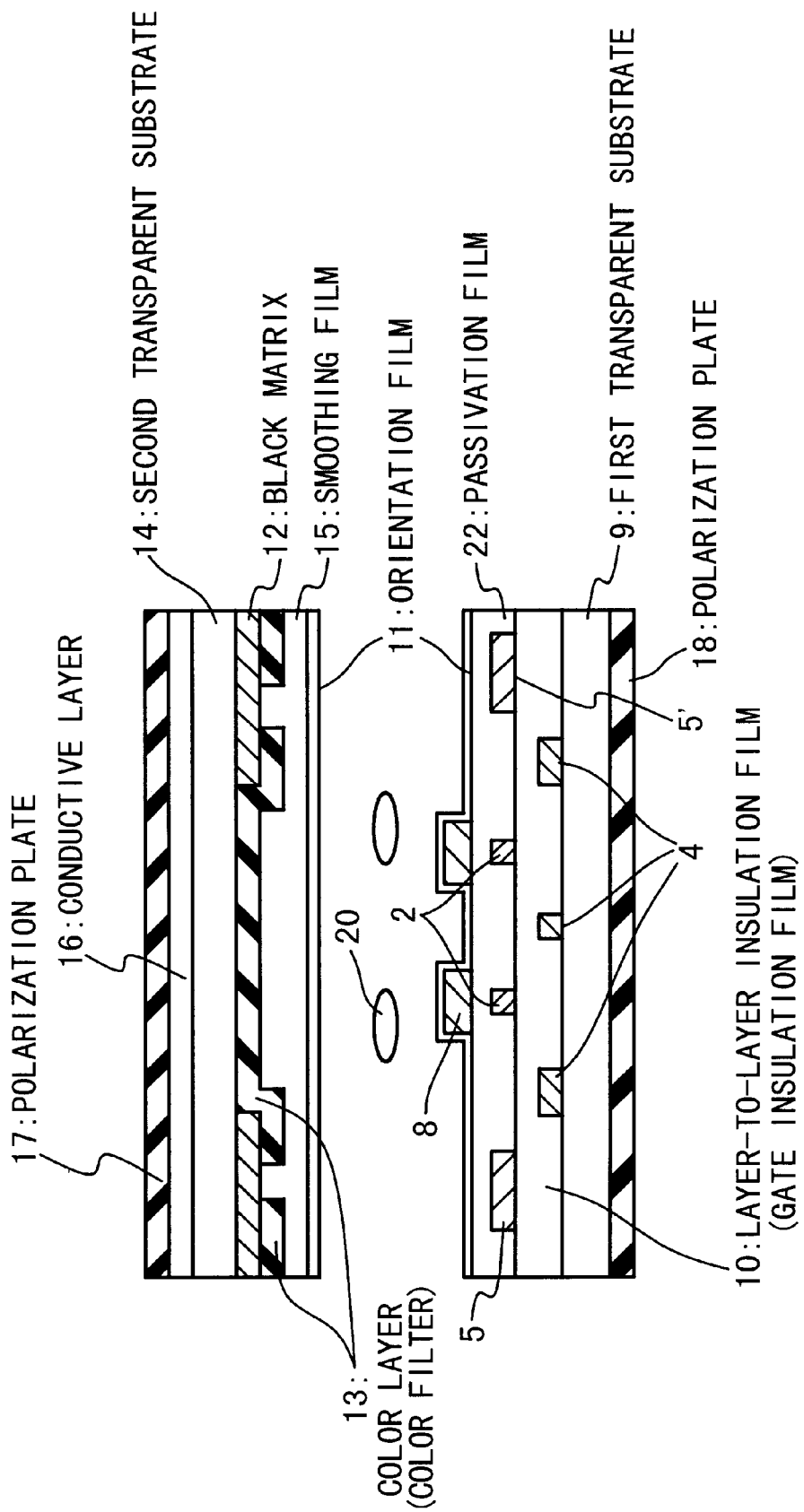
FIG. 15 is a fourth section view according to the display cell of the present invention.

FIG. 15 shows a section taken on the line A–A' of the display cell 104 of the present invention. FIG. 15 is a fourth section view according to the display cell of the present invention. In FIG. 15, the upper structure located on the upper portion of the liquid crystal layer composed of the liquid crystals 20 is provided with the polarization plate 17, the conductive layer 16, the second transparent substrate 14, the black matrix 12, the color layer 13, the smoothing film 15 and the orientation film 11. The lower structure located on the lower portion of the liquid crystal layer is provided with the orientation film 11, the auxiliary electrode 8, the passivation film 22, the pixel electrode 2, the data line 5, the layer-to-layer insulation film (gate insulation film) 10, the common electrode 4, the first transparent substrate 9 and the polarization plate 18.

The structure of the display cell 104 shown in FIGS. 14, 15 is basically equal to that of the display cell 103 shown in FIGS. 12, 13. The difference lies in the configuration in which the display cell 104 has the contact hole 21'. The display cell 104 has the two contact holes. Thus, the potential of the auxiliary electrode 8 can be set accurately and substantially constantly for any position. Also, it is possible to protect the coloration from the oblique field, as compared with the display cells 101, 102. Moreover, this has the merit of attaining the wide field angle.

Figure 16:
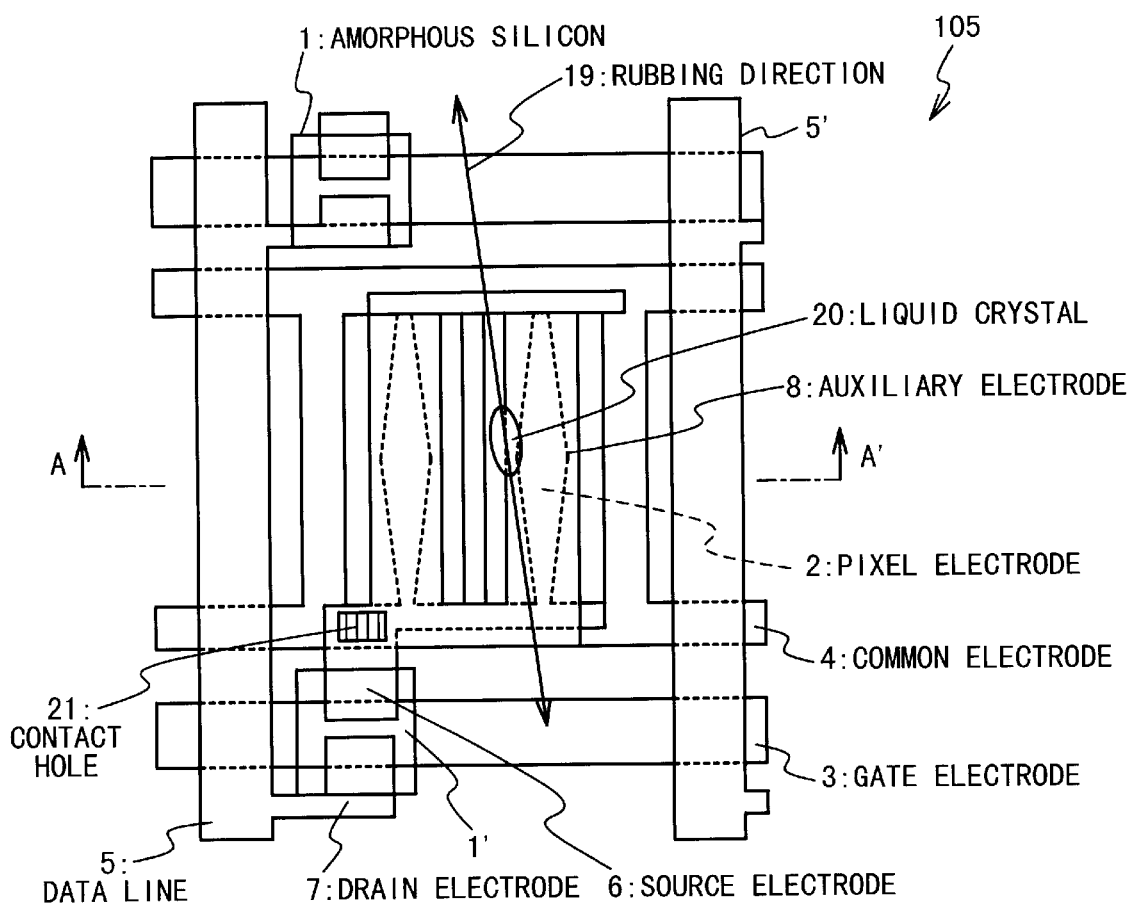
FIG. 16 is a fifth plan view according to the display cell of the present invention.

Here, a fifth embodiment of the display cell according to the present invention will be described below with reference to FIGS. 16, 17. FIG. 16 shows a fifth plan view (the side of the TFT substrate) according to the display cell of the present invention. A cell 105 shown in FIG. 16 has the amorphous silicon 1, the pixel electrode 2, the gate electrode 3, the common electrode 4, the data line 5, the source electrode 6, the drain electrode 7, the auxiliary electrode 8 and the contact hole 21. The liquid crystals 20 of the display cell 105 shown in FIG. 16 are initially oriented in the rubbing direction 19 (at the angle deviated by 15 degrees with respect to the longitudinal direction of the common electrode 4).

Figure 17:
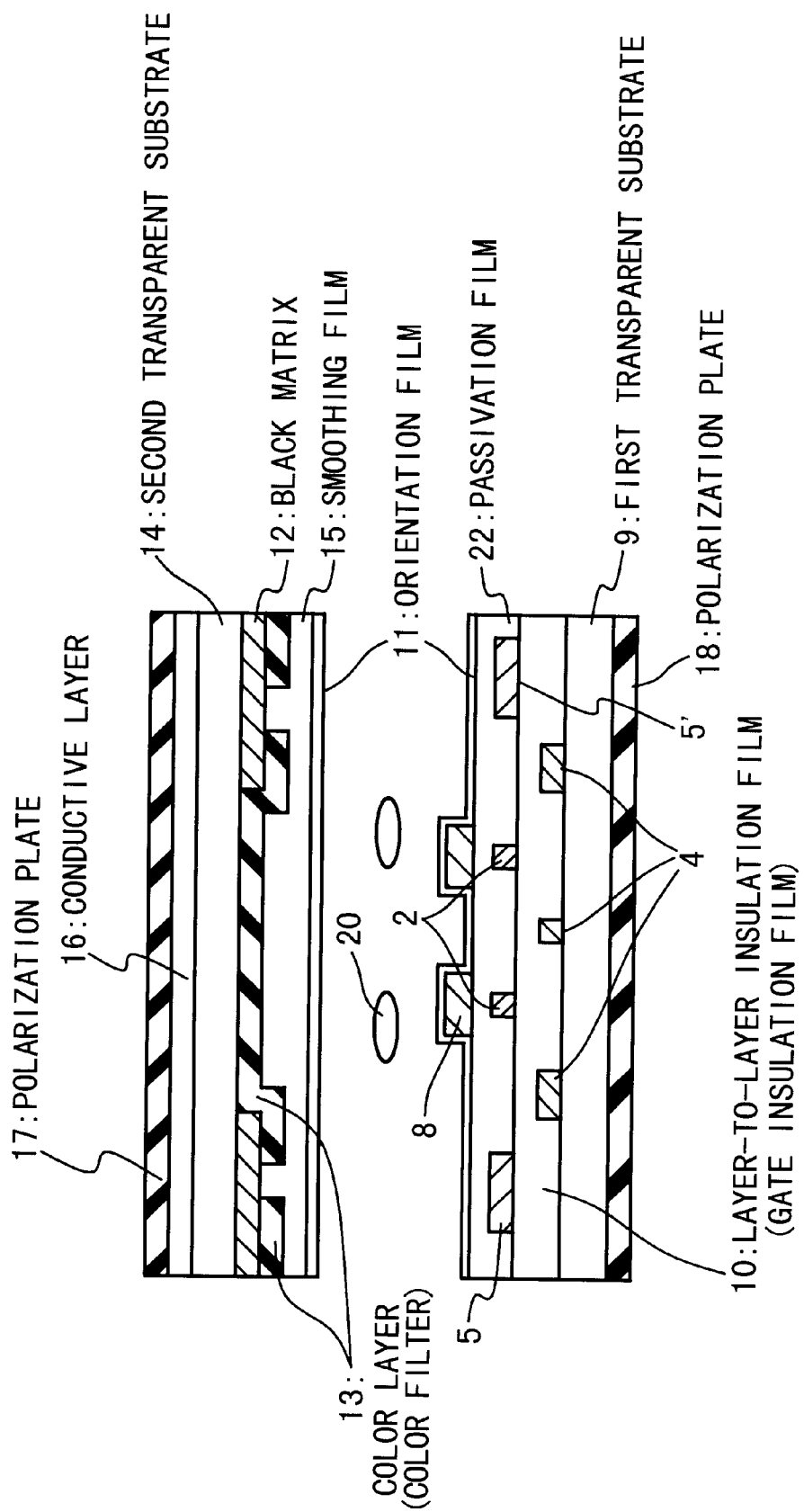
FIG. 17 is a fifth section view according to the display cell of the present invention.

FIG. 17 shows a section taken on the line A–A' of the display cell 105 of the present invention. FIG. 17 is a fifth section view according to the display cell of the present invention. In FIG. 17, the upper structure located on the upper portion of the liquid crystal layer composed of the liquid crystals 20 is provided with the polarization plate 17, the conductive layer 16, the second transparent substrate 14, the black matrix 12, the color layer (color filter) 13, the smoothing film 15 and the orientation film 11. The lower structure located on the lower portion of the liquid crystal layer is provided with the orientation film 11, the auxiliary electrode 8, the passivation film 22, the pixel electrode 2, the data line 5, the layer-to-layer insulation film (gate insulation film) 10, the common electrode 4, the first transparent substrate 9 and the polarization plate 18.

The structure of the display cell 105 shown in FIGS. 16, 17 is basically equal to that of the display cell 104 shown in FIGS. 12, 13. The difference lies in the shape of the pixel electrode 2 and the initial orientation angle of the liquid crystal 20. In the auxiliary electrode 8 of the display cell 105, the shape in the vicinity of the center is expanded. However, the auxiliary electrode 8 for dominantly generating the electric field by using the liquid crystals 20 is straight in shape. Thus, the effectively generated electric field is substantially regularly vertical to the longitudinal direction of the common electrode 4, in all the columns. So, the initial orientation angle 19 of the liquid crystal 20 is set at the angle deviated by 15 degrees with respect to the longitudinal direction of the common electrode 4. Hence, it is possible to attain the same display performance as the display cell 101, even in the configuration in which there is a bent point in the pixel electrode 2, such as the display cell 105.

Figure 18:
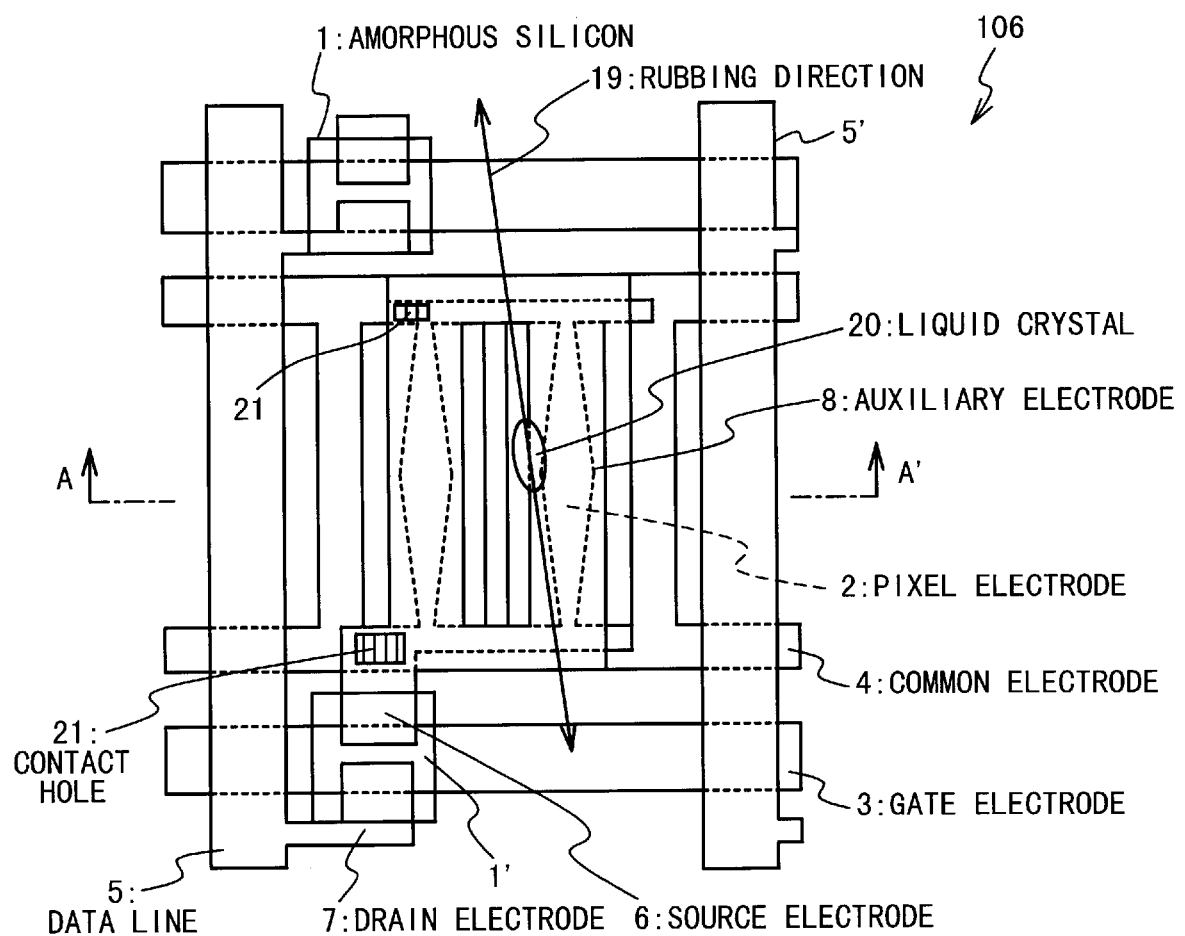
FIG. 18 is a sixth plan view according to the display cell of the present invention.

Here, a sixth embodiment of the display cell according to the present invention will be described below with reference to FIGS. 18, 19. FIG. 18 shows a fifth plan view (the side of the TFT substrate) according to the display cell of the present invention. A cell 106 shown in FIG. 18 has the amorphous silicon 1, the pixel electrode 2, the gate electrode 3, the common electrode 4, the data line 5, the source electrode 6, the drain electrode 7 and the contact holes 21, 21'. The liquid crystals 20 of the display cell 106 shown in FIG. 18 are initially oriented in the rubbing direction 19 (at the angle deviated by 15 degrees with respect to the longitudinal direction of the common electrode).

Figure 19:
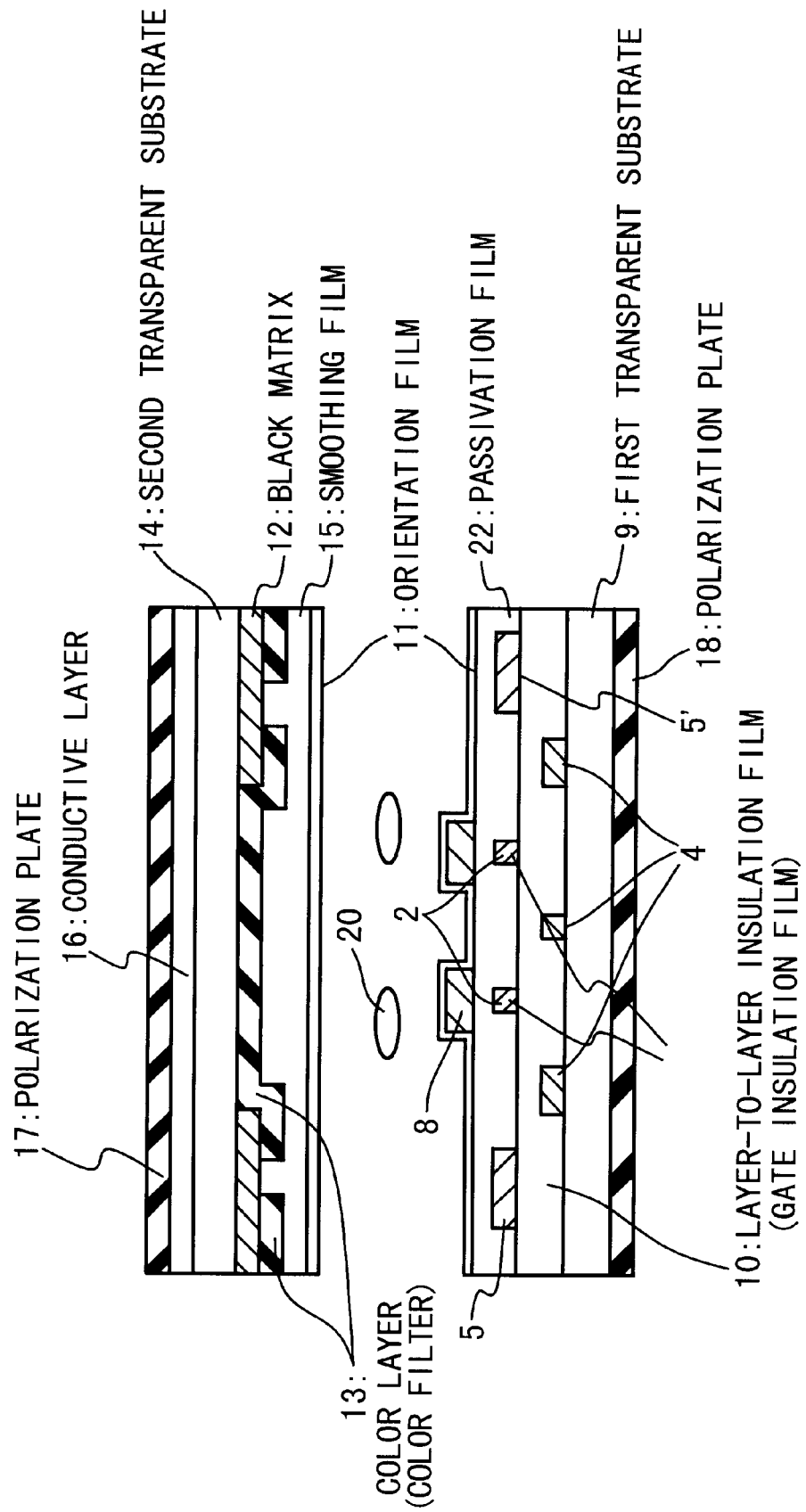
FIG. 19 is a sixth section view according to the display cell of the present invention.

FIG. 19 shows a section taken on the line A–A' of the display cell 106 of the present invention. FIG. 19 is a sixth section view according to the display cell of the present invention. In FIG. 19, the upper structure located on the upper portion of the liquid crystal layer composed of the liquid crystals 20 is provided with the polarization plate 17, the conductive layer 16, the second transparent substrate 14, the black matrix 12, the color layer 13, the smoothing film 15 and the orientation film 11. The lower structure located on the lower portion of the liquid crystal layer is provided with the orientation film 11, the auxiliary electrode 8, the passivation film 22, the pixel electrode 2, the data line 5, the layer-to-layer insulation film (gate insulation film) 10, the common electrode 4, the first transparent substrate 9 and the polarization plate 18.

The structure of the display cell 106 shown in FIGS. 18, 19 is basically equal to that of the display cell 105 shown in FIGS. 16, 17. The difference lies in the configuration in which the display cell 106 has the contact hole 21'. The display cell 106 has the two contact holes. Thus, the potential of the auxiliary electrode 8 can be set accurately and substantially constantly for any position.

Figure 20:
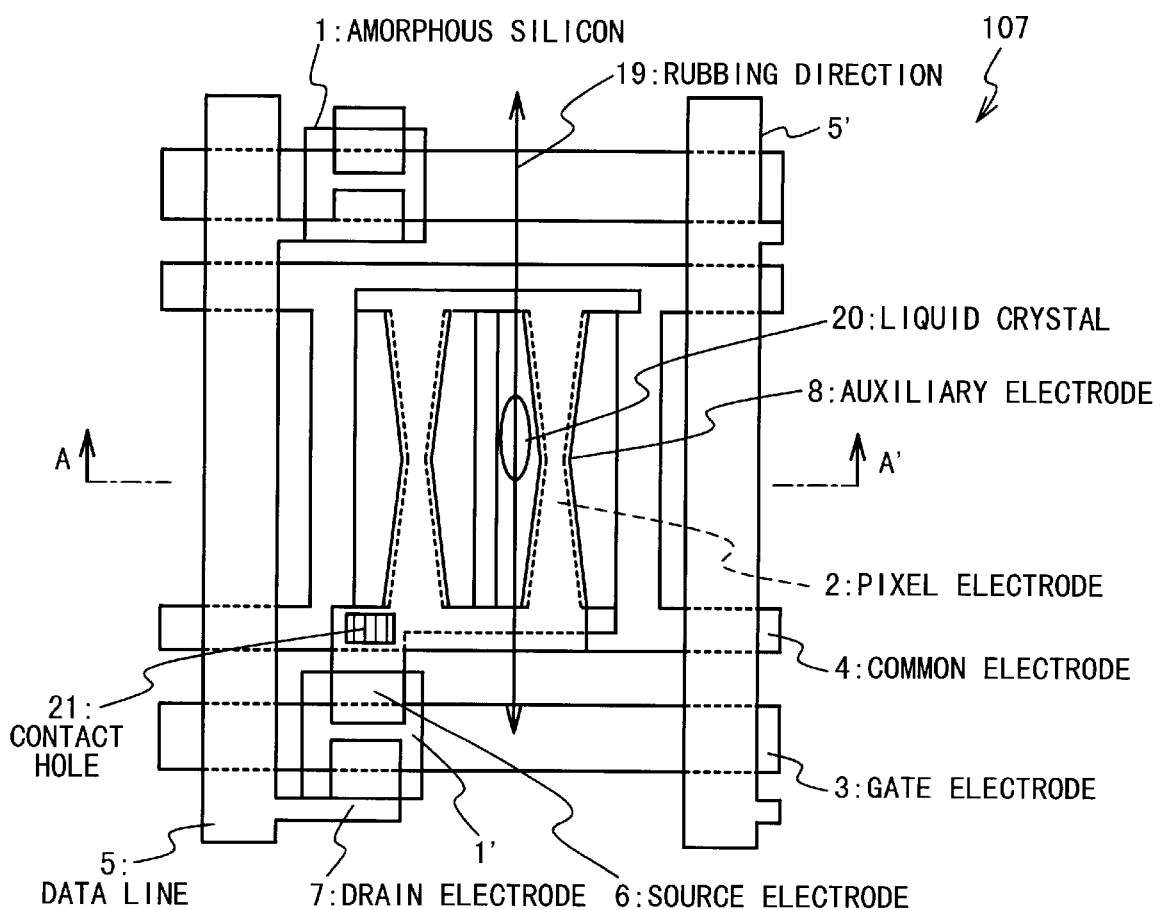
FIG. 20 is a seventh plan view according to the display cell of the present invention.

Here, a seventh embodiment of the display cell according to the present invention will be described below with reference to FIGS. 20, 21. FIG. 20 shows a seventh plan view (the side of the TFT substrate) according to the display cell of the present invention. A cell 107 shown in FIG. 20 has the amorphous silicon 1, the pixel electrode 2, the gate electrode 3, the common electrode 4, the data line 5, the source electrode 6, the drain electrode 7 and the contact hole 21. The auxiliary electrode 8 has the two-pole structure. The liquid crystals 20 of the display cell 107 shown in FIG. 20 are initially oriented in the rubbing direction 19 (parallel to the longitudinal direction of the common electrode 4).

Figure 21:
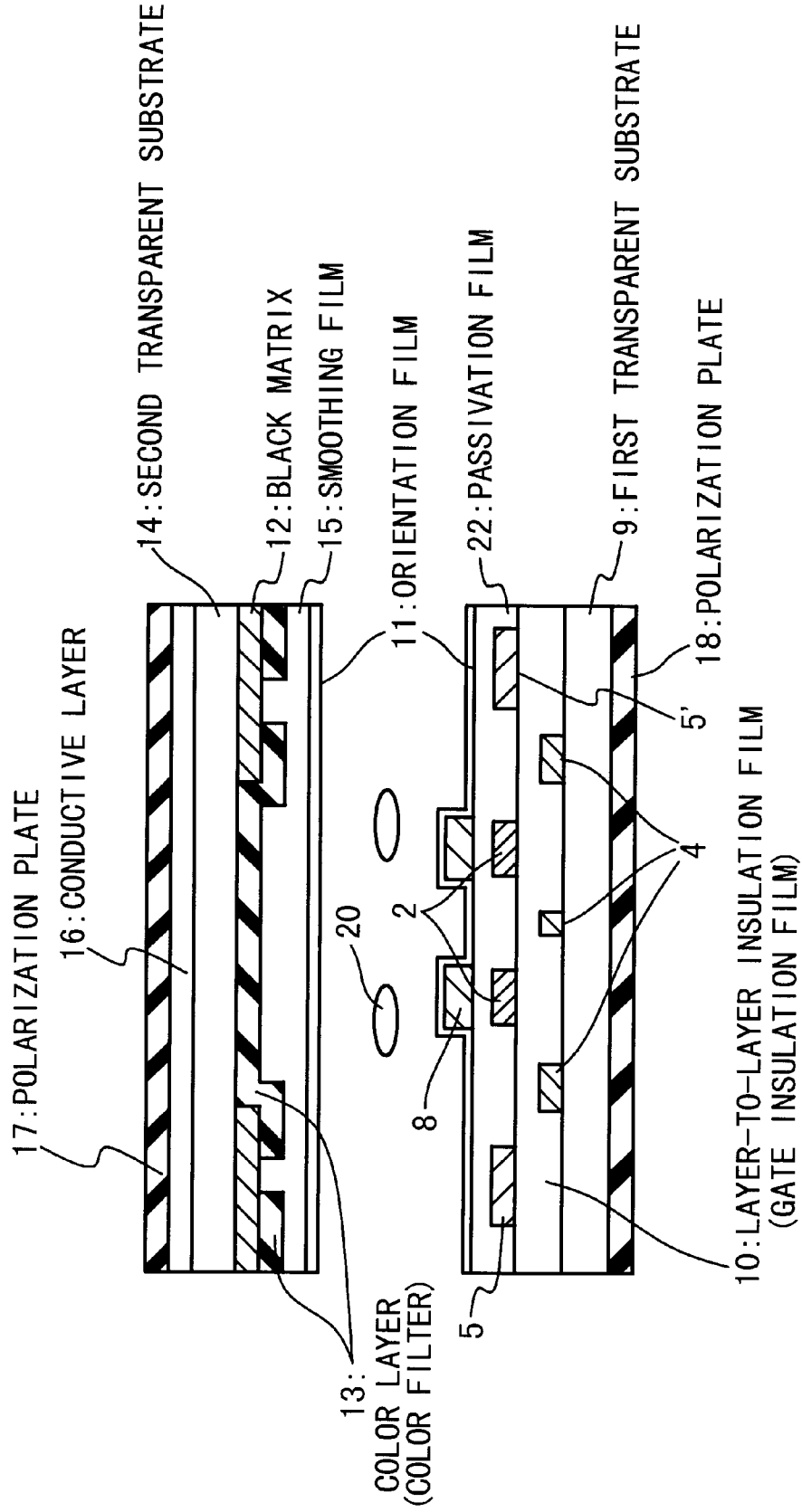
FIG. 21 is a seventh section view according to the display cell of the present invention.

FIG. 21 shows a section taken on the line A–A' of the display cell 107 of the present invention. FIG. 21 is a seventh section view according to the display cell of the present invention. In FIG. 21, the upper structure located on the upper portion of the liquid crystal layer composed of the liquid crystals 20 is provided with the polarization plate 17, the conductive layer 16, the second transparent substrate 14, the black matrix 12, the color layer 13, the smoothing film 15 and the orientation film 11. The lower structure located on the lower portion of the liquid crystal layer is provided with the orientation film 11, the auxiliary electrode 8, the passivation film 22, the pixel electrode 2, the data line 5, the layer-to-layer insulation film (gate insulation film) 10, the common electrode 4, the first transparent substrate 9 and the polarization plate 18.

The structure of the display cell 107 shown in FIGS. 20, 21 is basically equal to that of the display cell 103 shown in FIGS. 12, 13. The difference lies in the shapes of the pixel electrode 2 and the auxiliary electrode 8 and the rubbing direction 19. The pixel electrode 2 of the display cell 107 is matched with the shape of the auxiliary electrode 8, and both of them are bent in shape. The auxiliary electrode 8 having the same potential as the pixel electrode 2 through the contact hole 21 can reduce the drive voltage applied to the liquid crystal, due to the narrow electrode interval from the common electrode. Also, the constricted part is formed in the vicinity of the center, and the common electrode 4 is straight in shape. Thus, in the display cell 107 of the comb electrode, the action of the constricted part leads to the coexistence of the region where the liquid crystal 20 is rotated in the right direction with the region where it is rotated in the left direction, within the column through which the light is passed. For this reason, at the time of the white display, even if the electric field is applied between the pixel electrode 2 and the common electrode 4, the orientation directions of the liquid crystals are not oriented in the one direction. Hence, it is possible to protect the coloration from the oblique field. Moreover, this has the merit of attaining the wider field angle.

Figure 22:
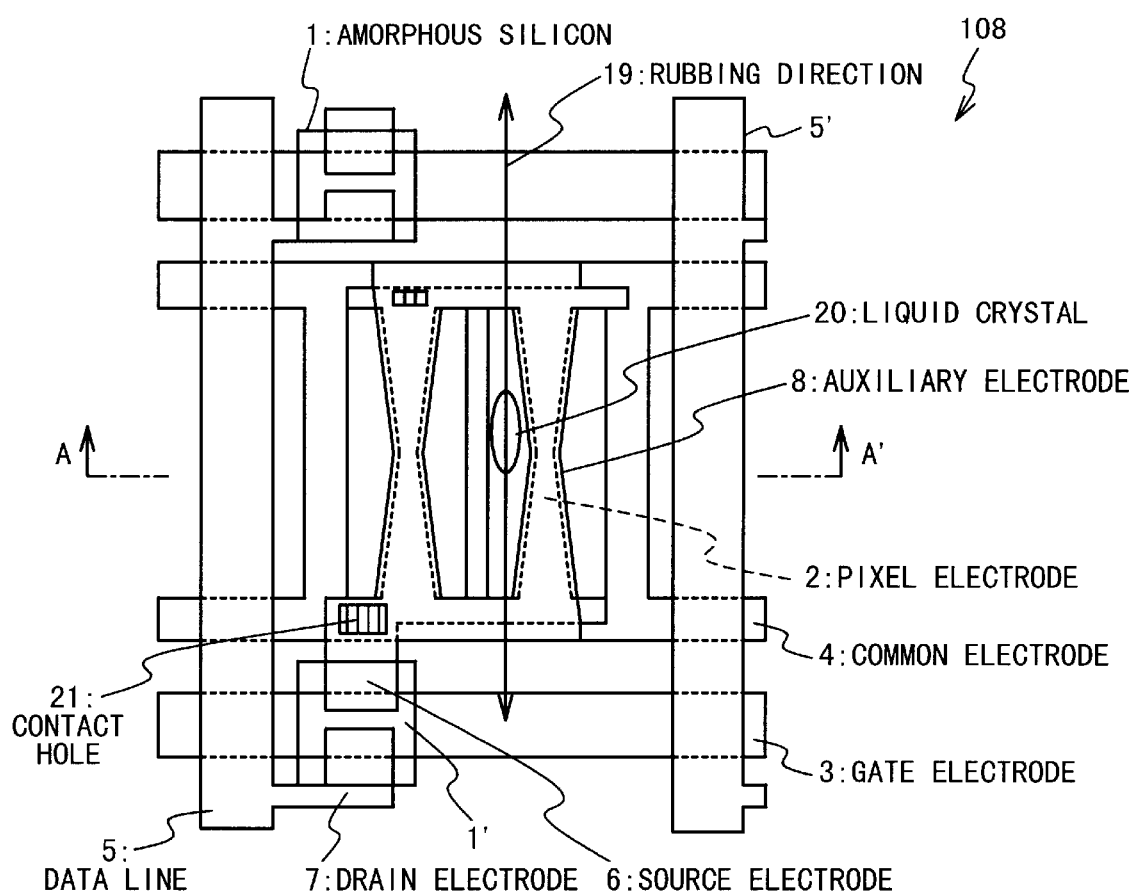
FIG. 22 is an eighth plan view according to the display cell of the present invention.

Here, an eighth embodiment of the display cell according to the present invention will be described below with reference to FIGS. 22, 23. FIG. 22 shows an eighth plan view according to the display cell of the present invention. A cell 108 shown in FIG. 22 has the amorphous silicon 1, the pixel electrode 2, the gate electrode 3, the common electrode 4, the data line 5, the source electrode 6, the drain electrode 7 and the contact holes 21, 21'. The auxiliary electrode 8 has the two-pole structure. The liquid crystals 20 of the display cell 108 shown in FIG. 22 are initially oriented in the rubbing direction 19 (parallel to the longitudinal direction of the common electrode 4).

Figure 23:
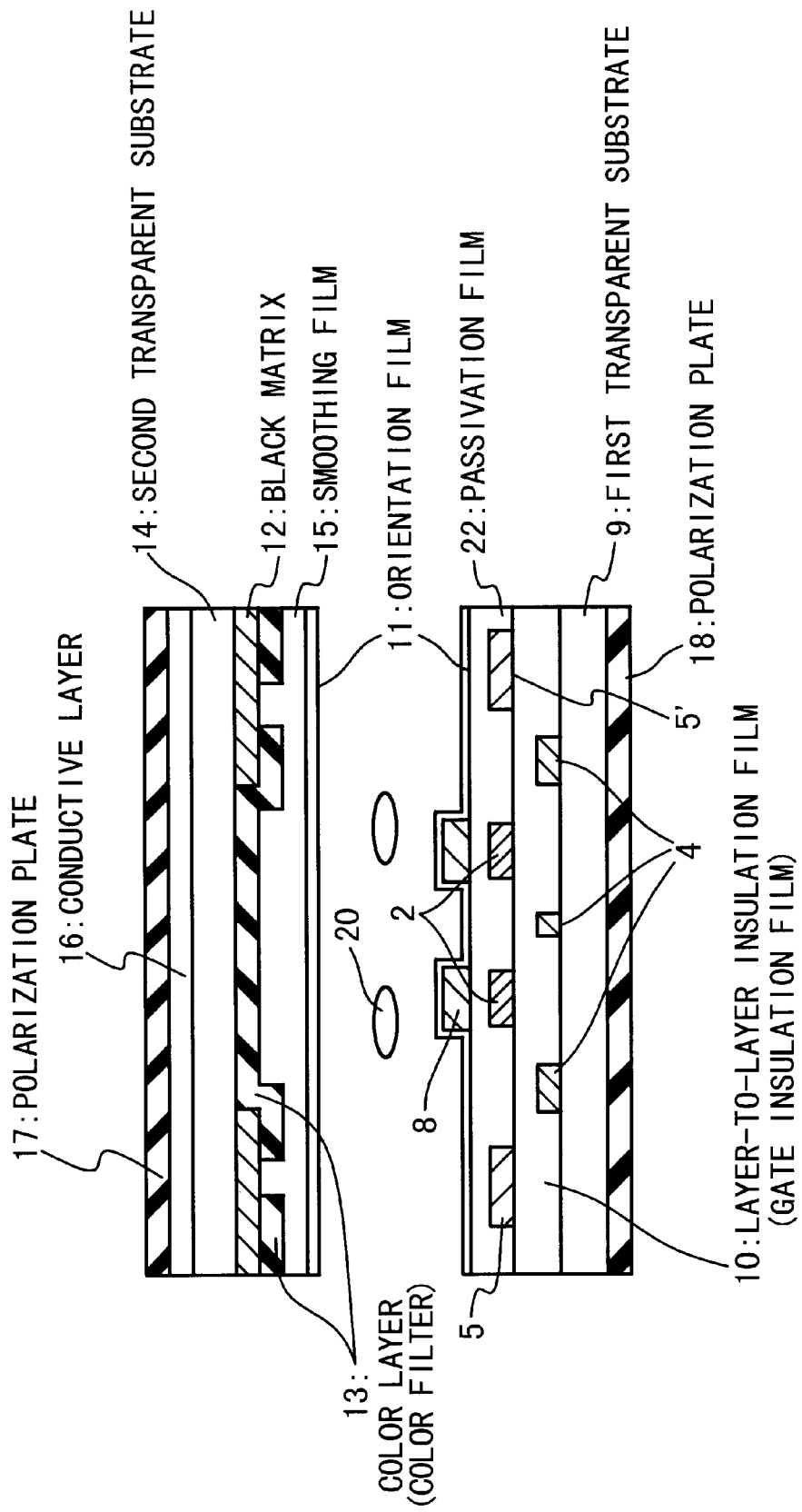
FIG. 23 is an eighth section view according to the display cell of the present invention.

FIG. 23 shows a section taken on the line A–A' of the display cell 108 of the present invention. FIG. 23 is an eighth section view according to the display cell of the present invention. In FIG. 23, the upper structure located on the upper portion of the liquid crystal layer composed of the liquid crystals 20 is provided with the polarization plate 17, the conductive layer 16, the second transparent substrate 14, the black matrix 12, the color layer 13, the smoothing film 15 and the orientation film 11. The lower structure located on the lower portion of the liquid crystal layer is provided with the orientation film 11, the auxiliary electrode 8, the passivation film 22, the pixel electrode 2, the data line 5, the layer-to-layer insulation film (gate insulation film) 10, the common electrode 4, the first transparent substrate 9 and the polarization plate 18.

The structure of the display cell 108 shown in FIGS. 22, 23 is basically equal to that of the display cell 107 shown in FIGS. 20, 21. The difference lies in the configuration in which the display cell 108 has the contact hole 21'. The display cell 108 has the two contact holes. Thus, the potential of the auxiliary electrode 8 can be set accurately and substantially constantly for any position.

Figure 24:
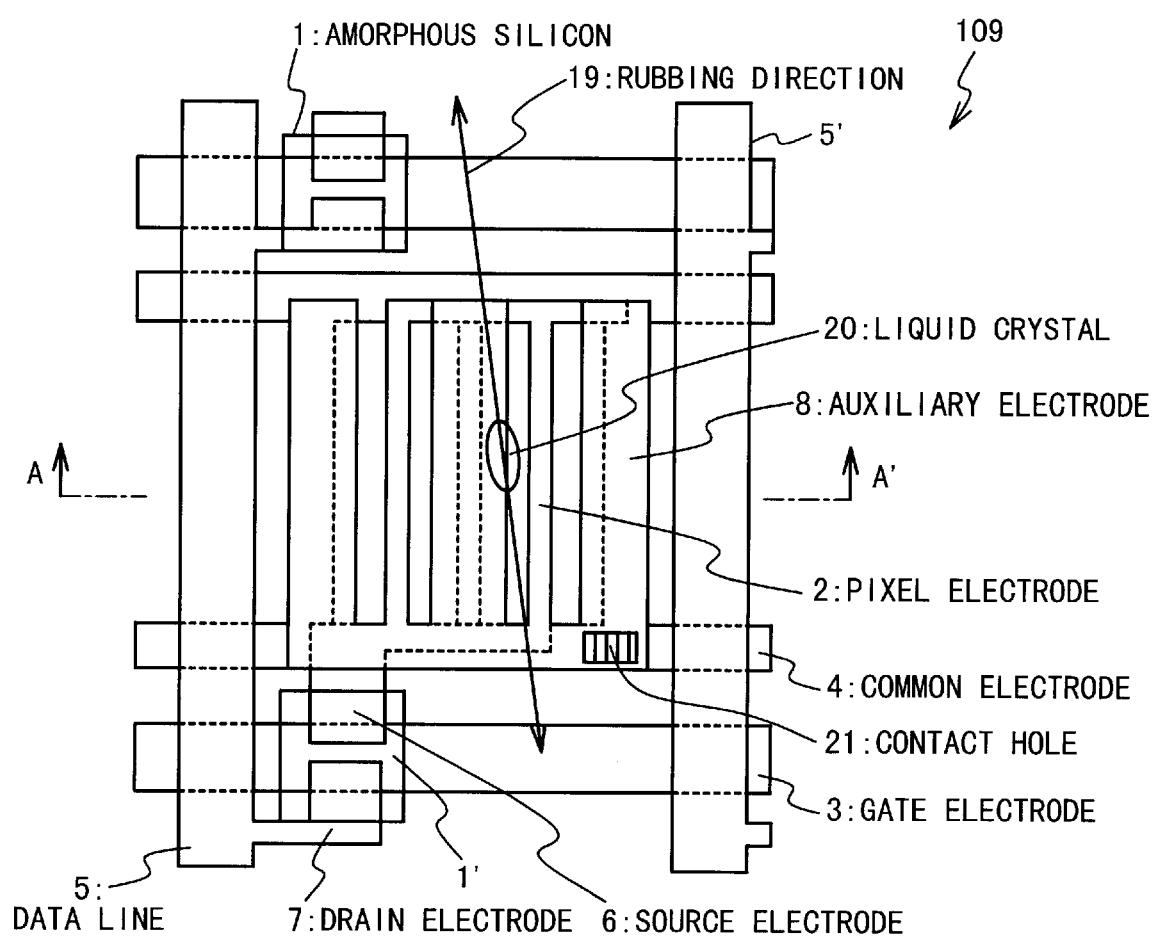
FIG. 24 is a ninth plan view according to the display cell of the present invention.

Here, a ninth embodiment of the display cell according to the present invention will be described below with reference to FIGS. 24, 25. FIG. 24 shows a ninth plan view according to the display cell of the present invention. A cell 109 shown in FIG. 24 has the amorphous silicon 1, the pixel electrode 2, the gate electrode 3, the common electrode 4, the data line 5, the source electrode 6, the drain electrode 7 and the contact hole 21. The auxiliary electrode 8 has a three-pole structure. The liquid crystals 20 of the display cell 109 shown in FIG. 24 are initially oriented in the rubbing direction 19 (at the angle deviated by 15 degrees with respect to the longitudinal direction of the pixel electrode 2).

Figure 25:
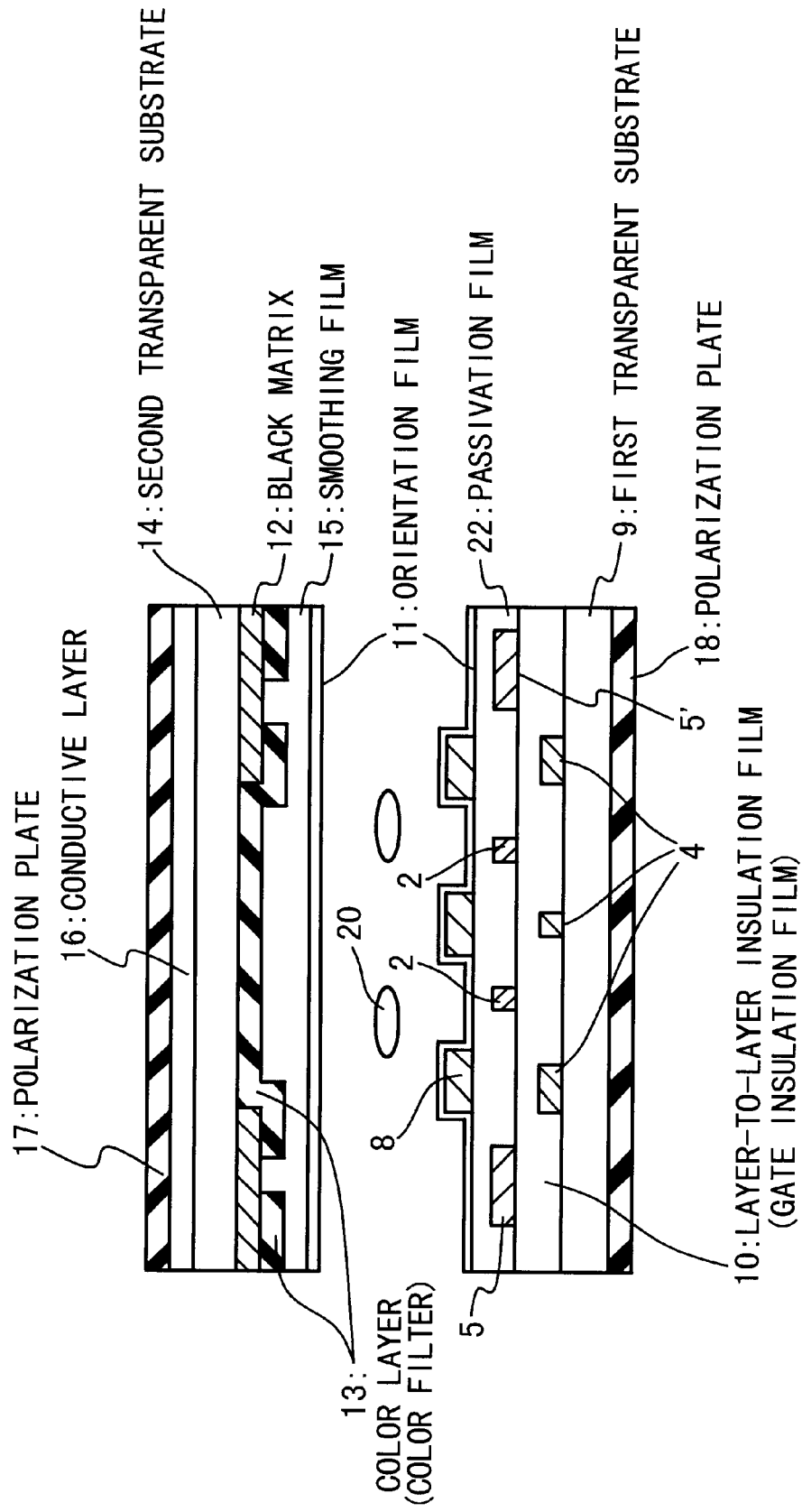
FIG. 25 is a ninth section view according to the display cell of the present invention.

FIG. 25 shows a section taken on the line A–A' of the display cell 109 of the present invention. FIG. 25 is a ninth section view according to the display cell of the present invention. In FIG. 25, the upper structure located on the upper portion of the liquid crystal layer composed of the liquid crystals 20 is provided with the polarization plate 17, the conductive layer 16, the second transparent substrate 14, the black matrix 12, the color layer 13, the smoothing film 15 and the orientation film 11. The lower structure located on the lower portion of the liquid crystal layer is provided with the orientation film 11, the auxiliary electrode 8, the passivation film 22, the pixel electrode 2, the data line 5, the layer-to-layer insulation film (gate insulation film) 10, the common electrode 4, the first transparent substrate 9 and the polarization plate 18.

The structure of the display cell 109 shown in FIGS. 24, 25 is basically equal to that of the display cell 101 shown in FIGS. 8, 9. The difference lies in the number of electrodes in the auxiliary electrode 8. In the display cell 109, the auxiliary electrode 8 has the same potential as the common electrode 4 through the contact hole 21. In the auxiliary electrode 8 made of transparent material, the electrode interval from the pixel electrode 2 is made narrower while the drop in the aperture ratio is avoided. Thus, it is possible to increase the strength of the electric field.

Figure 26:
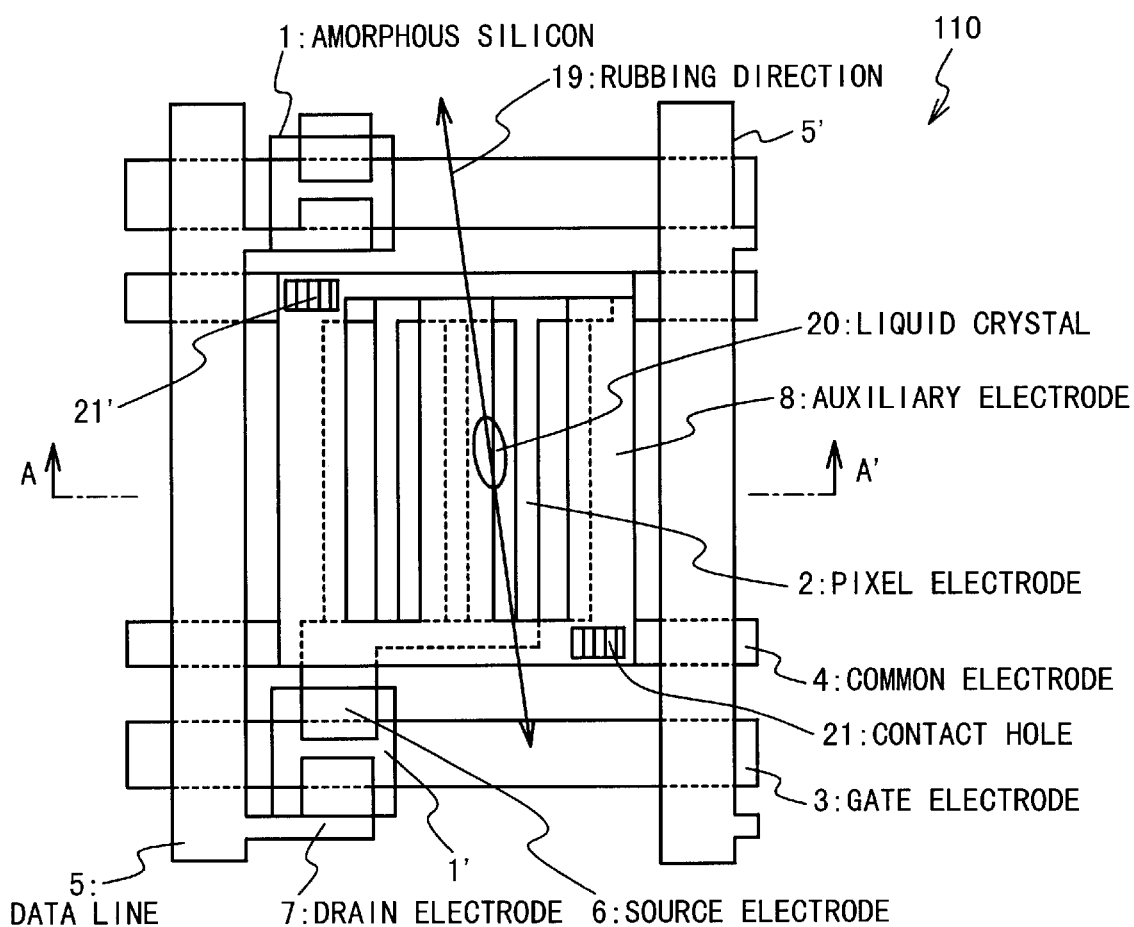
FIG. 26 is a tenth plan view according to the display cell of the present invention.

Here, a tenth embodiment of the display cell according to the present invention will be described below with reference to FIGS. 26, 27. FIG. 26 shows a tenth plan view according to the display cell of the present invention. A cell 110 shown in FIG. 26 has the amorphous silicon 1, the pixel electrode 2, the gate electrode 3, the common electrode 4, the data line 5, the source electrode 6, the drain electrode 7 and the contact holes 21, 21'. The auxiliary electrode 8 has the three-pole structure. The liquid crystals 20 of the display cell 109 shown in FIG. 26 are initially oriented in the rubbing direction 19 (at the angle deviated by 15 degrees with respect to the longitudinal direction of the pixel electrode 2).

Figure 27:
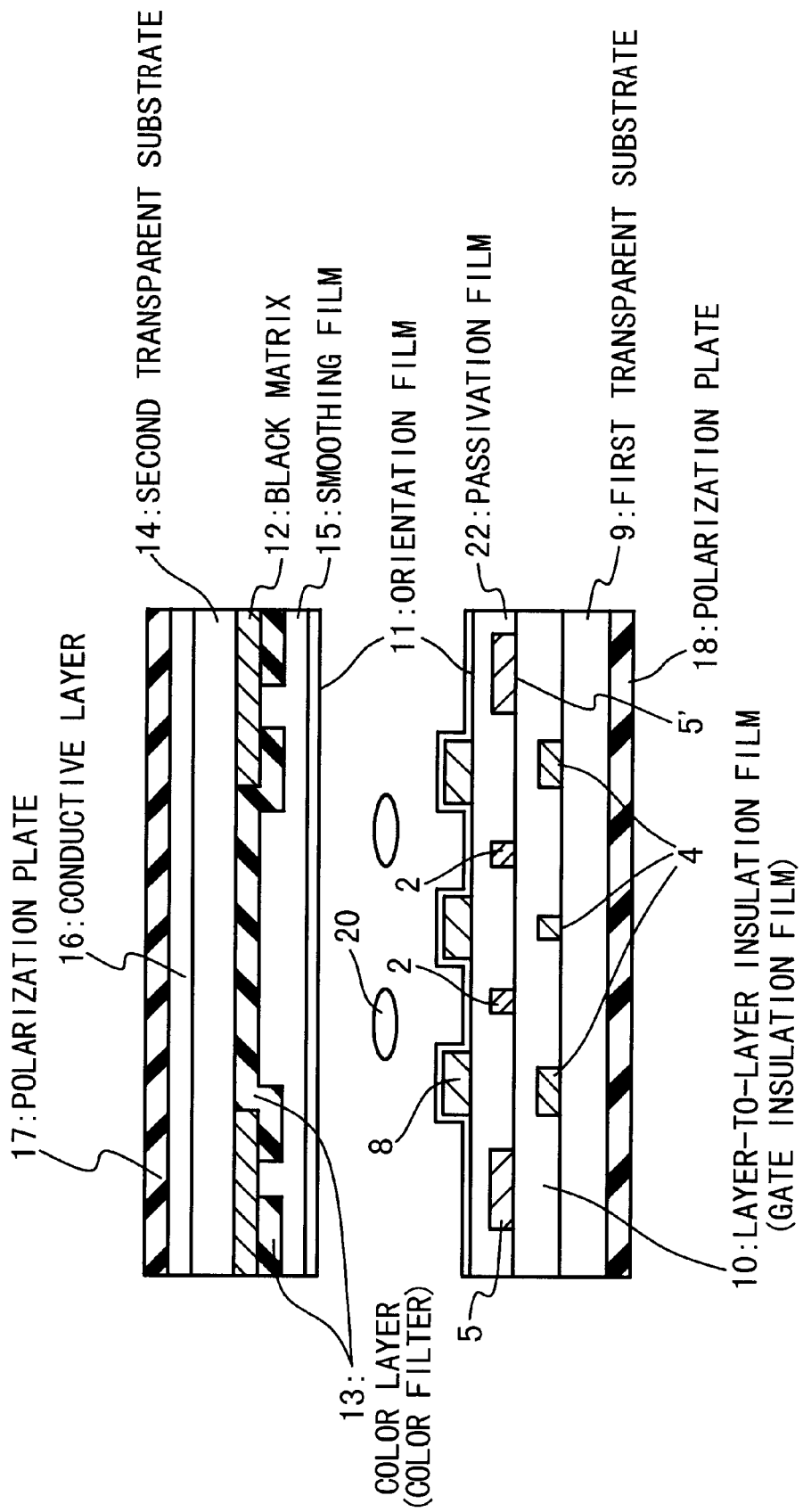
FIG. 27 is a tenth section view according to the display cell of the present invention.

FIG. 27 shows a section taken on the line A–A' of the display cell 110 of the present invention. FIG. 27 is a tenth section view according to the display cell of the present invention. In FIG. 27, the upper structure located on the upper portion of the liquid crystal layer composed of the liquid crystals 20 is provided with the polarization plate 17, the conductive layer 16, the second transparent substrate 14, the black matrix 12, the color layer 13, the smoothing film 15 and the orientation film 11. The lower structure located on the lower portion of the liquid crystal layer is provided with the orientation film 11, the auxiliary electrode 8, the passivation film 22, the pixel electrode 2, the data line 5, the layer-to-layer insulation film (gate insulation film) 10, the common electrode 4, the first transparent substrate 9 and the polarization plate 18.

The structure of the display cell 110 shown in FIGS. 26, 27 is basically equal to that of the display cell 109 shown in FIGS. 24, 25. The difference lies in the number of electrodes in the contact holes. The display cell 109 has the two contact holes. Thus, the potential of the auxiliary electrode 8 is set accurately and substantially constantly for any position.

Figure 28:
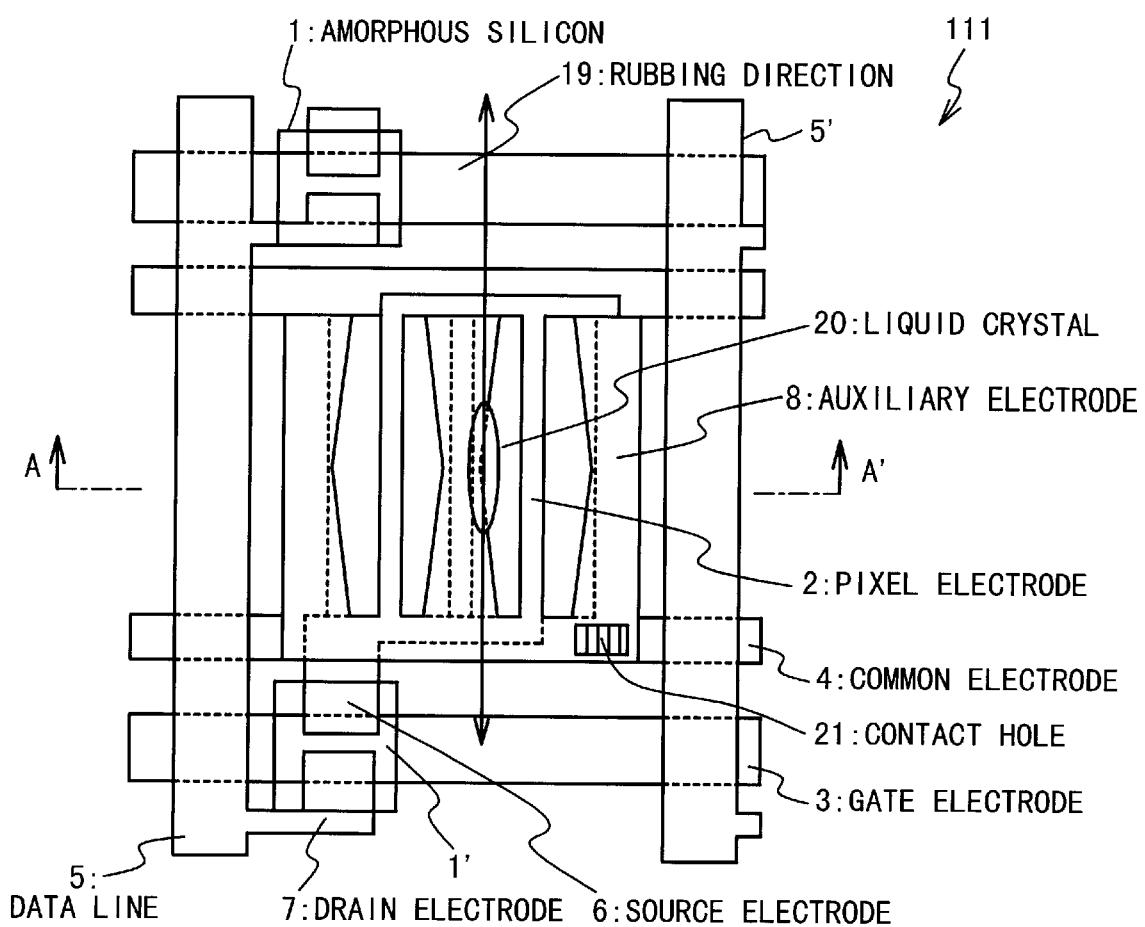
FIG. 28 is an eleventh plan view according to the display cell of the present invention.

Here, an eleventh embodiment of the display cell according to the present invention will be described below with reference to FIGS. 28, 29. FIG. 28 shows an eleventh plan view according to the display cell of the present invention. A cell 111 shown in FIG. 28 has the amorphous silicon 1, the pixel electrode 2, the gate electrode 3, the common electrode 4, the data line 5, the source electrode 6, the drain electrode 7 and the contact hole 21. The liquid crystals 20 of the display cell 111 shown in FIG. 28 are initially oriented in the rubbing direction 19 (parallel to the longitudinal direction of the pixel electrode 2).

Figure 29:
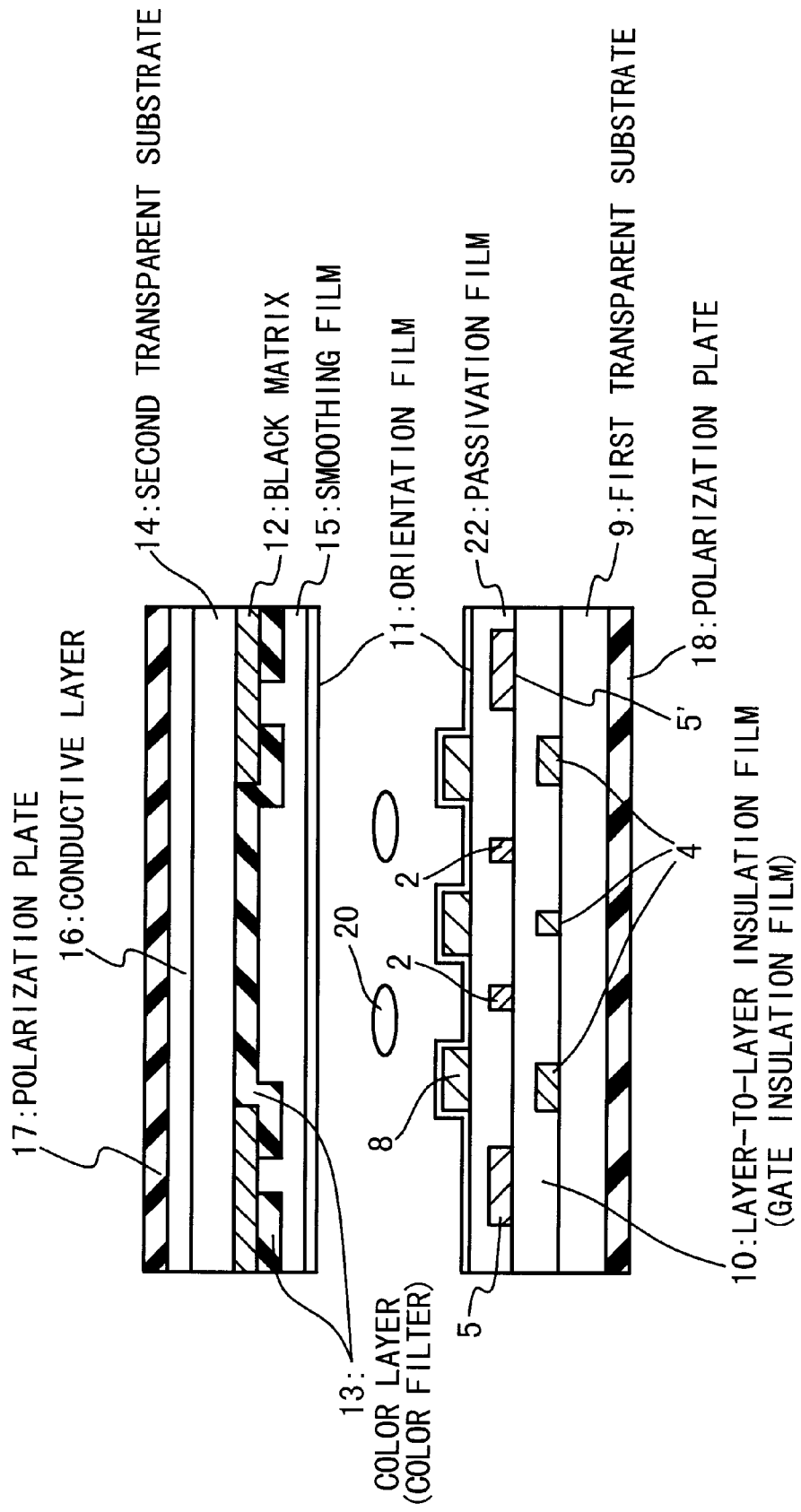
FIG. 29 is an eleventh section view according to the display cell of the present invention.

FIG. 29 shows a section taken on the line A–A' of the display cell 111 of the present invention. FIG. 29 is an eleventh section view according to the display cell of the present invention. In FIG. 29, the upper structure located on the upper portion of the liquid crystal layer composed of the liquid crystals 20 is provided with the polarization plate 17, the conductive layer 16, the second transparent substrate 14, the black matrix 12, the color layer 13, the smoothing film 15 and the orientation film 11. The lower structure located on the lower portion of the liquid crystal layer is provided with the orientation film 11, the auxiliary electrode 8, the passivation film 22, the pixel electrode 2, the data line 5, the layer-to-layer insulation film (gate insulation film) 10, the common electrode 4, the first transparent substrate 9 and the polarization plate 18.

The structure of the display cell 111 shown in FIGS. 28, 29 is basically equal to that of the display cell 109 shown in FIGS. 24, 25. The difference lies in the shape of the auxiliary electrode 8. The auxiliary electrode 8 of the display cell 111 has the constricted part. In the auxiliary electrode 8 which is the transparent electrode and has the same potential as the common electrode 4 of the display cell 111 through the contact hole 21, the strength of the electric field applied to a liquid crystal 202 can be increased while the drop in the aperture ratio is avoided, in order to make the electrode interval from the pixel electrode 2 narrower. Also, the constricted part is formed in the vicinity of the center. Thus, the region where the liquid crystal 20 is rotated in the right direction coexists with the region where it is rotated in the left direction, within the column through which the light is passed. For this reason, in the white display, even if the electric field is applied between the pixel electrode 2 and the common electrode 4, the orientation directions of the liquid crystals are not oriented in the one direction. Hence, it is possible to protect the coloration from the oblique field. Moreover, this has the merit of attaining the wider field angle.

Figure 30:
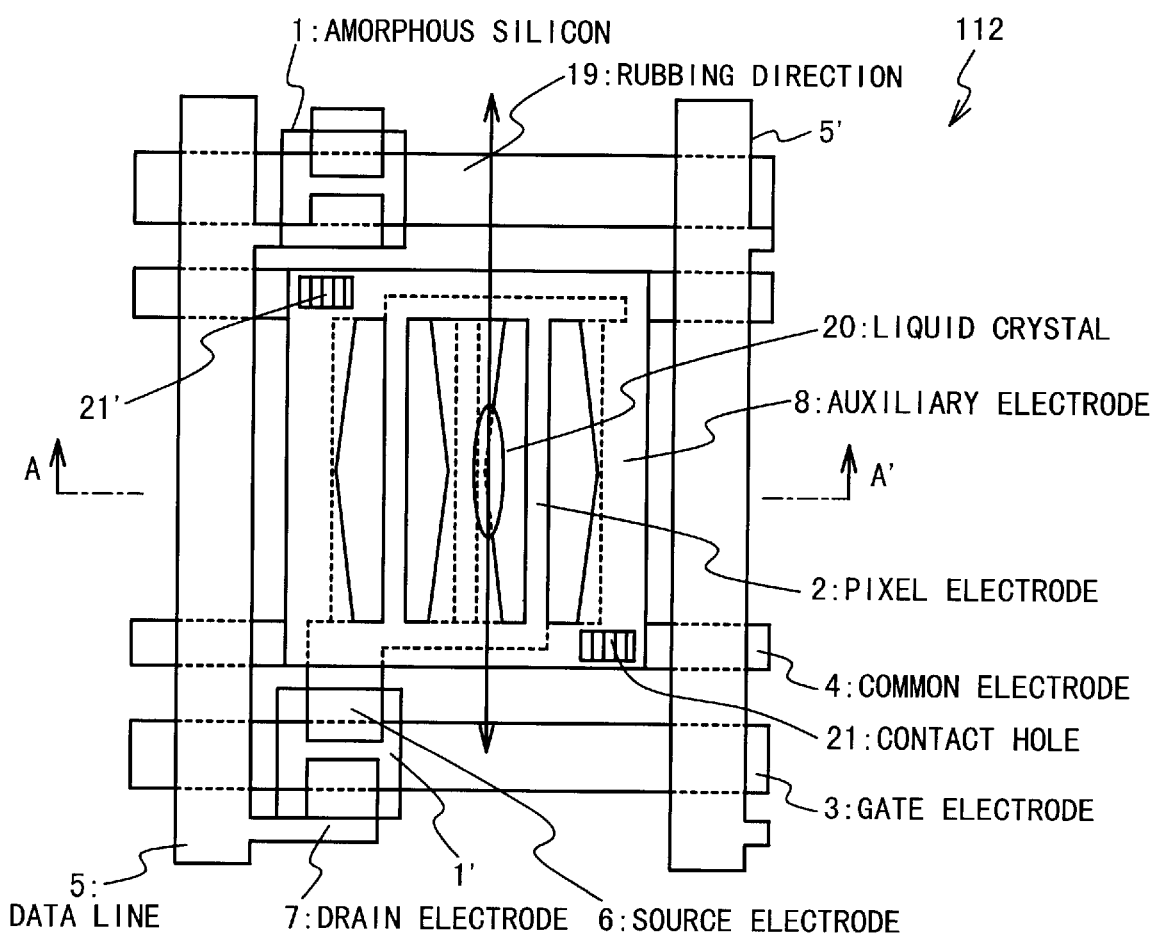
FIG. 30 is a twelfth plan view according to the display cell of the present invention.

Here, a twelfth embodiment of the display cell according to the present invention will be described below with reference to FIGS. 30, 31. FIG. 30 shows a twelfth plan view according to the display cell of the present invention. A cell 112 shown in FIG. 30 has the amorphous silicon 1, the pixel electrode 2, the gate electrode 3, the common electrode 4, the data line 5, the source electrode 6, the drain electrode 7 and the contact holes 21, 21'. The auxiliary electrode 8 has the three-pole structure. The liquid crystals 20 of the display cell 112 shown in FIG. 30 are initially oriented in the rubbing direction 19 (parallel to the longitudinal direction of the pixel electrode 2).

Figure 31:
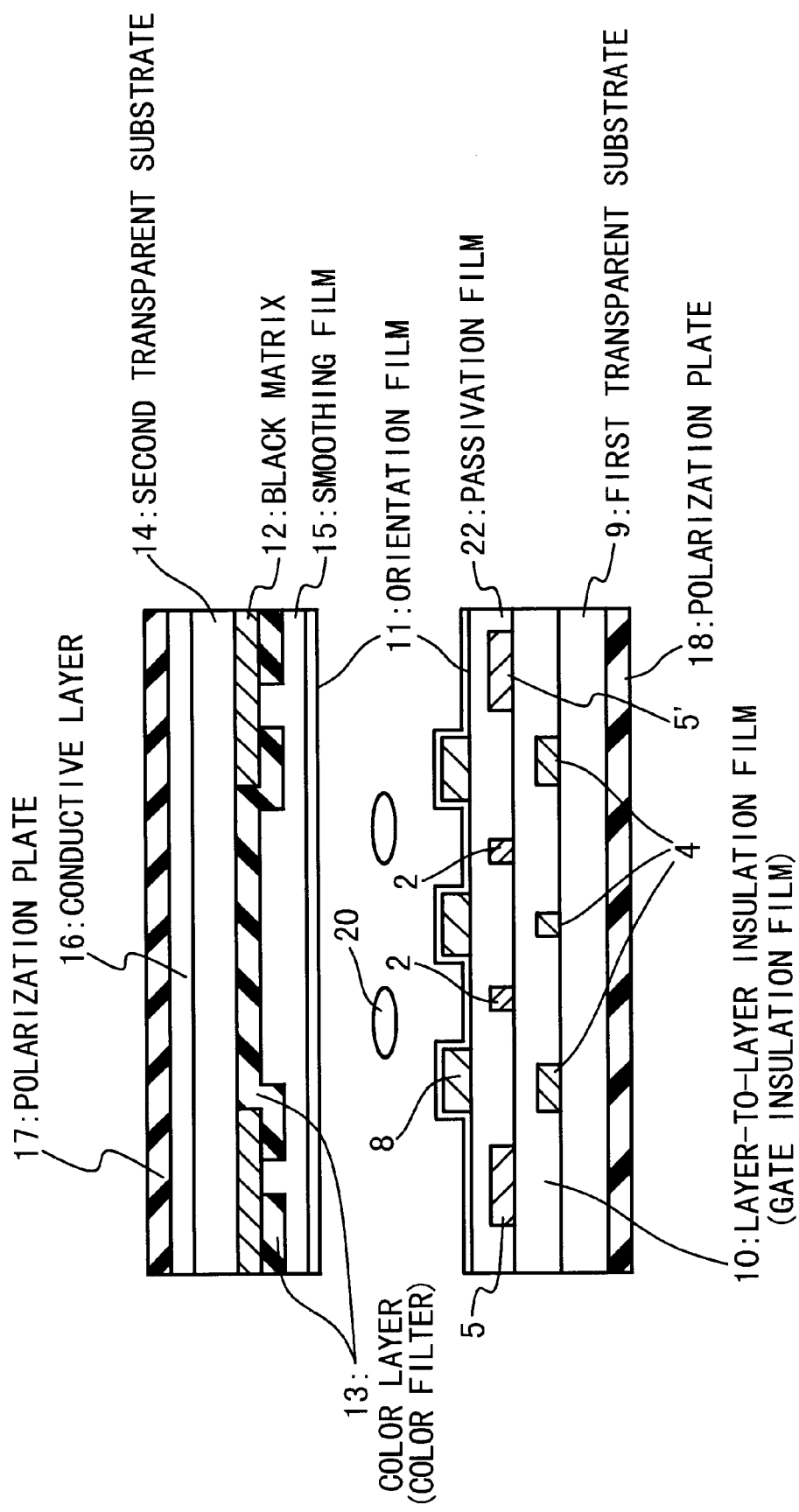
FIG. 31 is a twelfth section view according to the display cell of the present invention.

FIG. 31 shows a section taken on the line A–A' of the display cell 112 of the present invention. FIG. 31 is a twelfth section view according to the display cell of the present invention. In FIG. 31, the upper structure located on the upper portion of the liquid crystal layer composed of the liquid crystals 20 is provided with the polarization plate 17, the conductive layer 16, the second transparent substrate 14, the black matrix 12, the color layer 13, the smoothing film 15 and the orientation film 11. The lower structure located on the lower portion of the liquid crystal layer is provided with the orientation film 11, the auxiliary electrode 8, the passivation film 22, the pixel electrode 2, the data line 5, the layer-to-layer insulation film (gate insulation film) 10, the common electrode 4, the first transparent substrate 9 and the polarization plate 18.

The structure of the display cell 112 shown in FIGS. 30, 31 is basically equal to that of the display cell 111 shown in FIGS. 28, 29. The difference lies in the configuration in which the display cell 112 has the contact hole 21'. The display cell 112 has the two contact holes. Thus, the potential of the auxiliary electrode 8 is set accurately and substantially constantly for any position.

Figure 32:
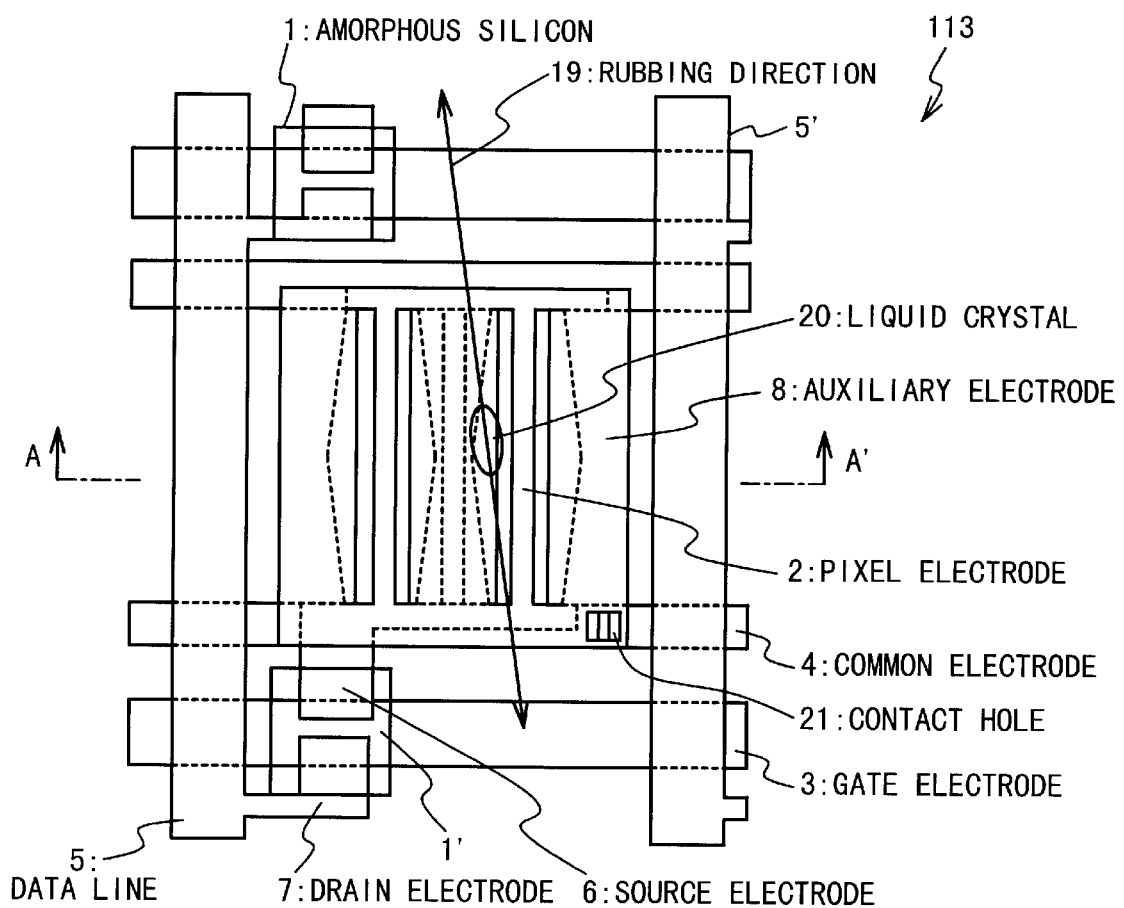
FIG. 32 is a thirteenth plan view according to the display cell of the present invention.

Here, a thirteenth embodiment of the display cell according to the present invention will be described below with reference to FIGS. 32, 33. FIG. 32 shows a thirteenth plan view according to the display cell of the present invention. A cell 113 shown in FIG. 32 has the amorphous silicon 1, the pixel electrode 2, the gate electrode 3, the common electrode 4, the data line 5, the source electrode 6, the drain electrode 7 and the contact hole 21. The auxiliary electrode 8 has the three-pole structure. The liquid crystals 20 of the display cell 111 shown in FIG. 32 are initially oriented in the rubbing direction 19 (at the angle deviated by 15 degrees with respect to the longitudinal direction of the pixel electrode 2).

Figure 33:
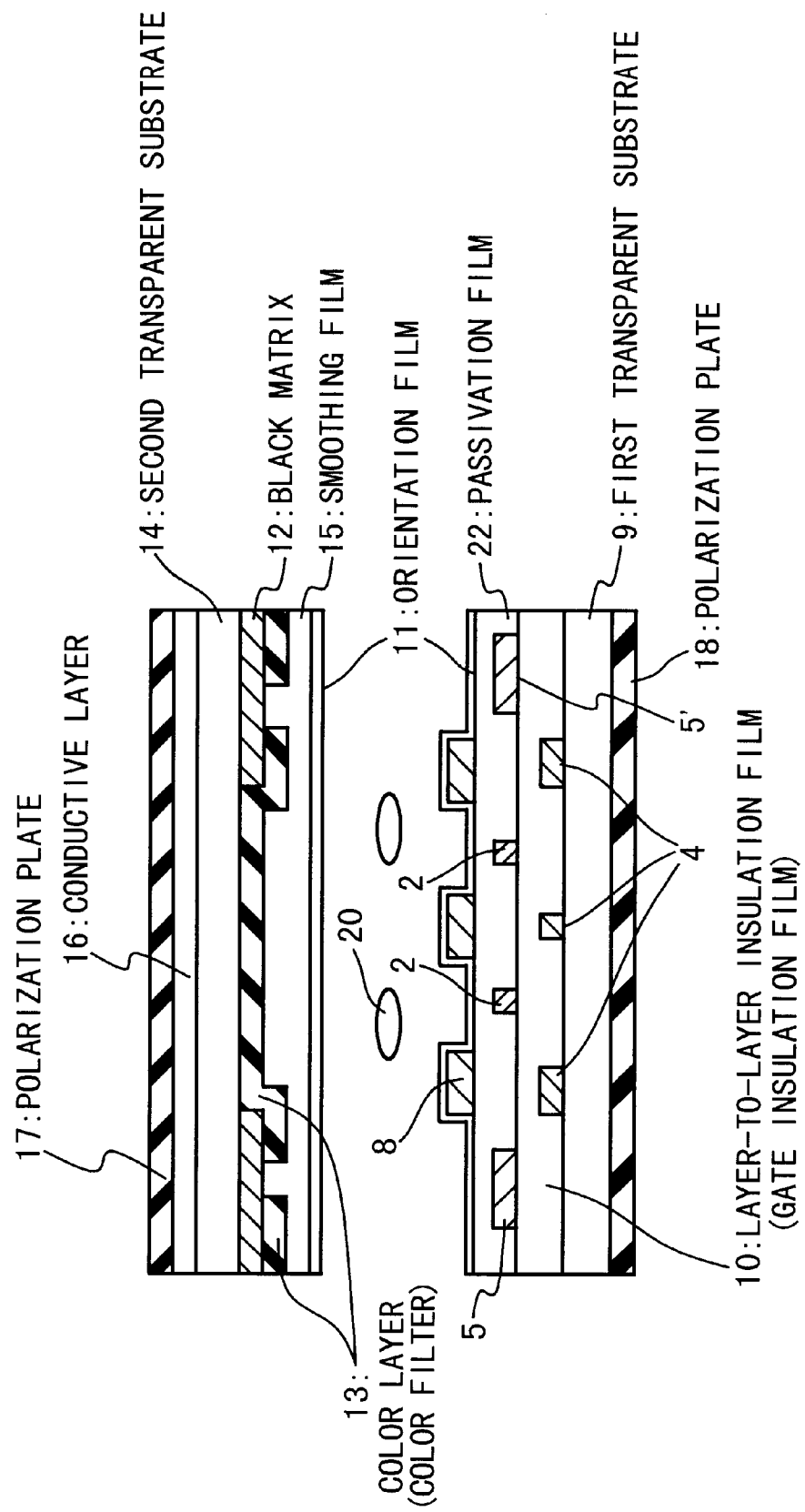
FIG. 33 is a thirteenth section view according to the display cell of the present invention.

FIG. 33 shows a section taken on the line A–A' of the display cell 113 of the present invention. FIG. 33 is a thirteenth section view according to the display cell of the present invention. In FIG. 33, the upper structure located on the upper portion of the liquid crystal layer composed of the liquid crystals 20 is provided with the polarization plate 17, the conductive layer 16, the second transparent substrate 14, the black matrix 12, the color layer 13, the smoothing film 15 and the orientation film 11. The lower structure located on the lower portion of the liquid crystal layer is provided with the orientation film 11, the auxiliary electrode 8, the passivation film 22, the pixel electrode 2, the data line 5, the layer-to-layer insulation film (gate insulation film) 10, the common electrode 4, the first transparent substrate 9 and the polarization plate 18.

The structure of the display cell 113 shown in FIGS. 32, 33 is basically equal to that of the display cell 109 shown in FIGS. 24, 25. The difference lies in the shape of the common electrode 4 and the initial orientation angle of the liquid crystal 20. In the common electrode 4 of the display cell 113, the shape in the vicinity of the center is expanded. However, the auxiliary electrode 8 for dominantly generating the electric field by using the liquid crystals 20 is straight in shape. Thus, the effectively generated electric field is substantially regularly vertical to the longitudinal direction of the pixel electrode 2, in all the columns. So, the initial orientation angle 19 of the liquid crystal 20 is set at the angle deviated by 15 degrees with respect to the longitudinal direction of the common electrode 4. Hence, it is possible to attain the same display performance as the display cell 109, even in the configuration in which there is a bent point in the common electrode 4, such as the display cell 105.

Figure 34:
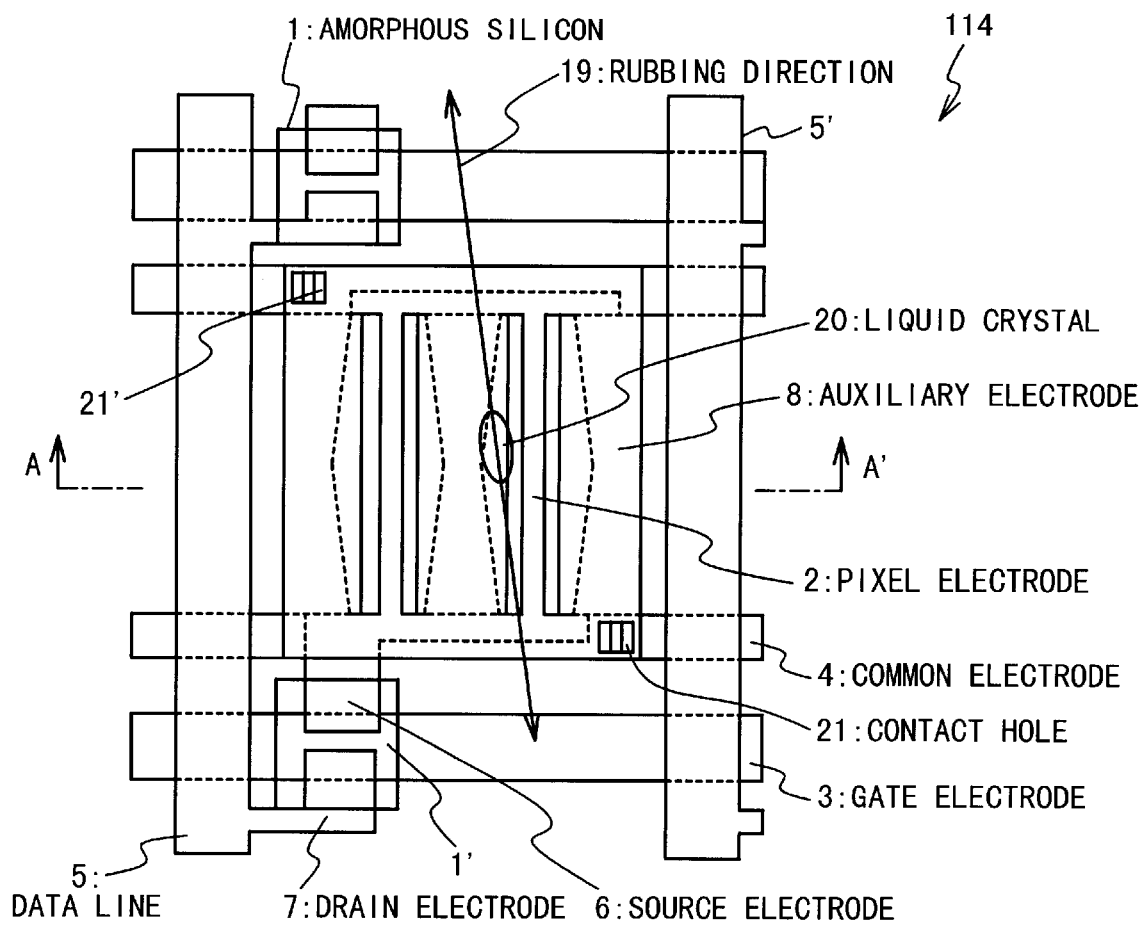
FIG. 34 is a fourteenth plan view according to the display cell of the present invention.

Next, a fourteenth embodiment of the display cell according to the present invention will be described below with reference to FIGS. 34, 35. FIG. 34 shows a fourteenth plan view according to the display cell of the present invention. A cell 114 shown in FIG. 34 has the amorphous silicon 1, the pixel electrode 2, the gate electrode 3, the common electrode 4, the data line 5, the source electrode 6, the drain electrode 7 and the contact holes 21, 21'. The auxiliary electrode 8 has the three-pole structure. The liquid crystals 20 of the display cell 114 shown in FIG. 34 are initially oriented in the rubbing direction 19 (at the angle deviated by 15 degrees with respect to the longitudinal direction of the pixel electrode 2).

Figure 35:
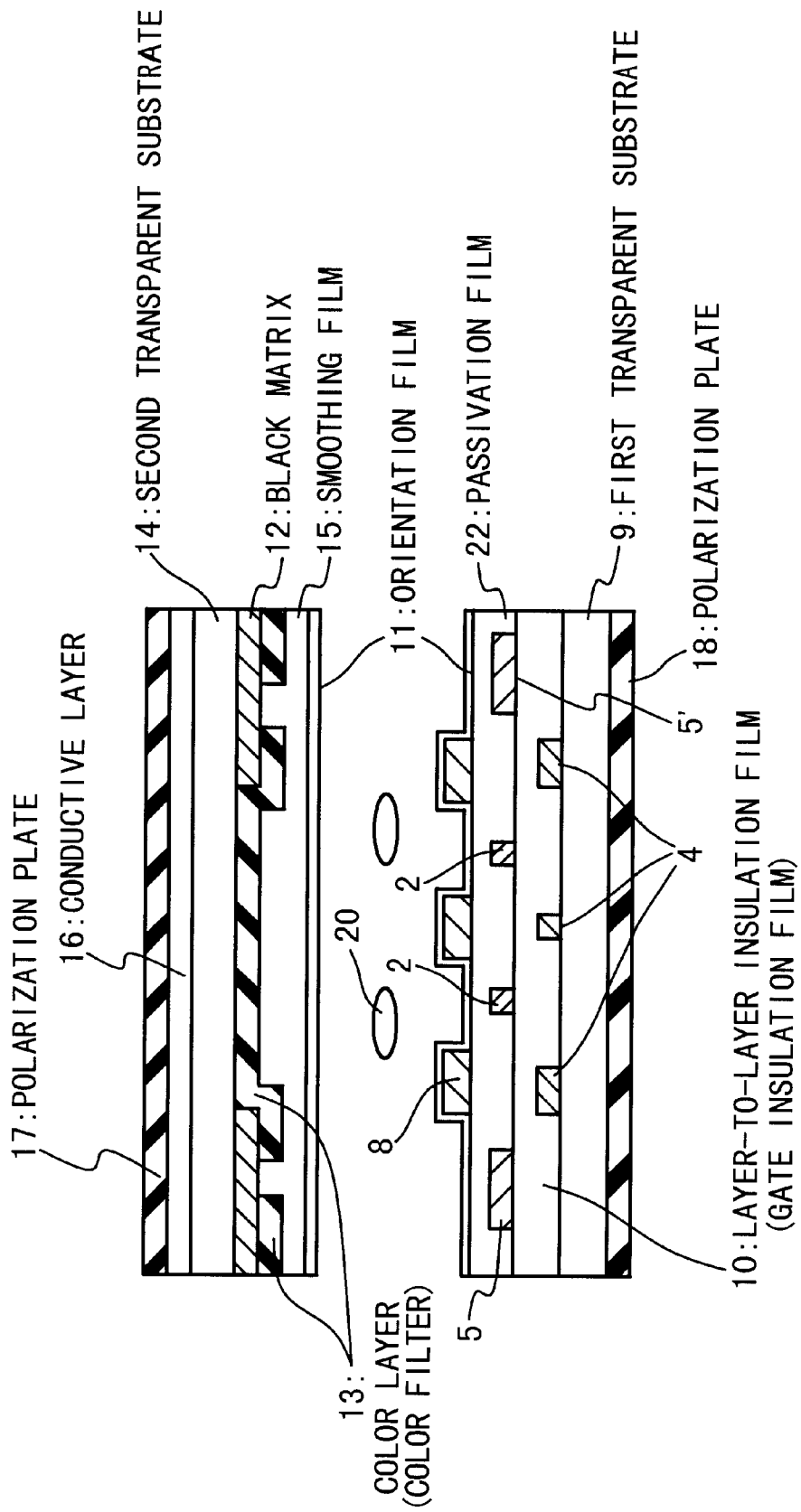
FIG. 35 is a fourteenth section view according to the display cell of the present invention.

FIG. 35 shows a section taken on the line A–A' of the display cell 114 of the present invention. FIG. 35 is a fourteenth section view according to the display cell of the present invention. In FIG. 35, the upper structure located on the upper portion of the liquid crystal layer composed of the liquid crystals 20 is provided with the polarization plate 17, the conductive layer 16, the second transparent substrate 14, the black matrix 12, the color layer 13, the smoothing film 15 and the orientation film 11. The lower structure located on the lower portion of the liquid crystal layer is provided with the orientation film 11, the auxiliary electrode 8, the passivation film 22, the pixel electrode 2, the data line 5, the layer-to-layer insulation film (gate insulation film) 10, the common electrode 4, the first transparent substrate 9 and the polarization plate 18.

The structure of the display cell 114 shown in FIGS. 34, 35 is basically equal to that of the display cell 113 shown in FIGS. 32, 33. The difference lies in the configuration in which the display cell 114 has the contact hole 21'. The display cell 114 has the two contact holes. Thus, the potential of the auxiliary electrode 8 is set accurately and substantially constantly for any position.

Figure 36:
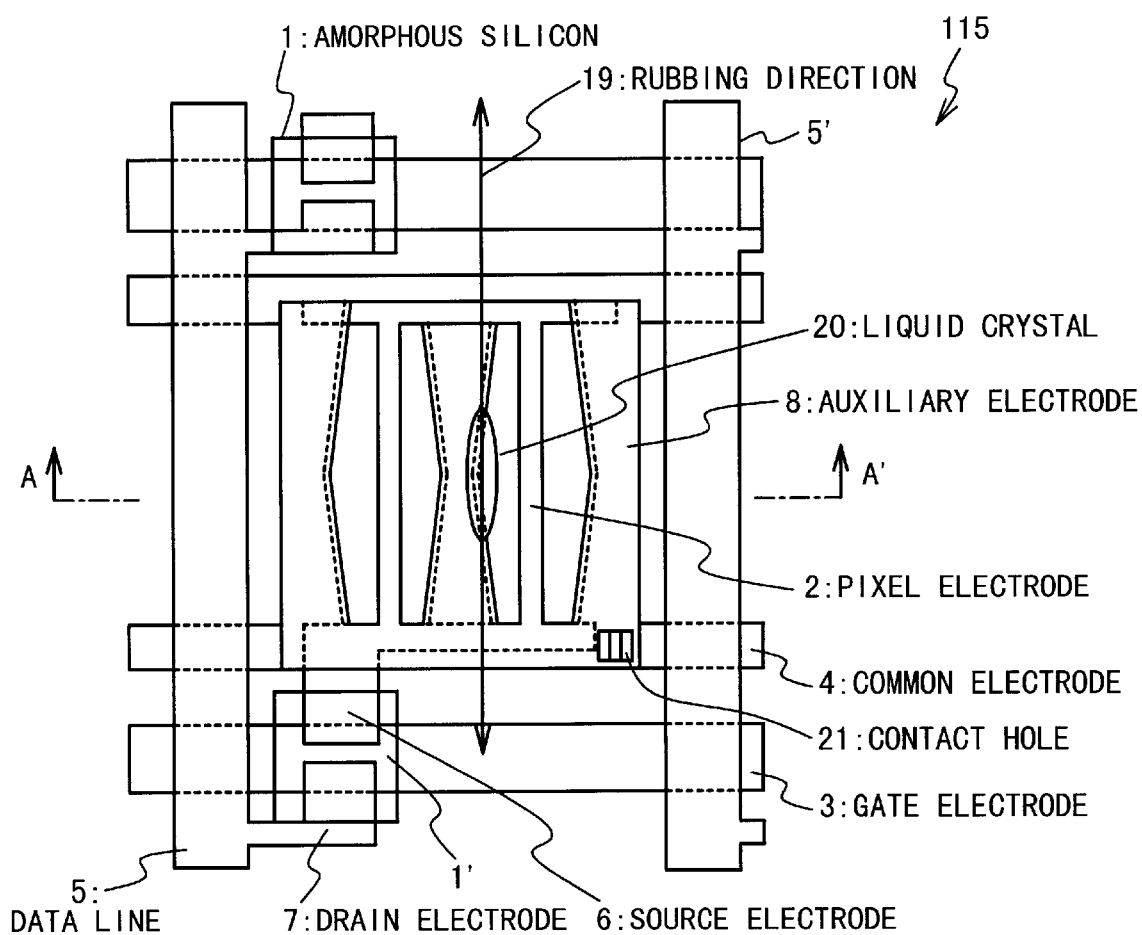
FIG. 36 is a fifteenth plan view according to the display cell of the present invention.

Next, a fifteenth embodiment of the display cell according to the present invention will be described below with reference to FIGS. 36, 37. FIG. 36 shows a fifteenth plane according to the display cell of the present invention. A cell 115 shown in FIG. 36 has the amorphous silicon 1, the pixel electrode 2, the gate electrode 3, the common electrode 4, the data line 5, the source electrode 6, the drain electrode 7 and the contact hole 21. The auxiliary electrode 8 has the three-pole structure. The liquid crystals 20 of the display cell 115 shown in FIG. 36 are initially oriented in the rubbing direction 19 (parallel to the longitudinal direction of the pixel electrode 2).

Figure 37:
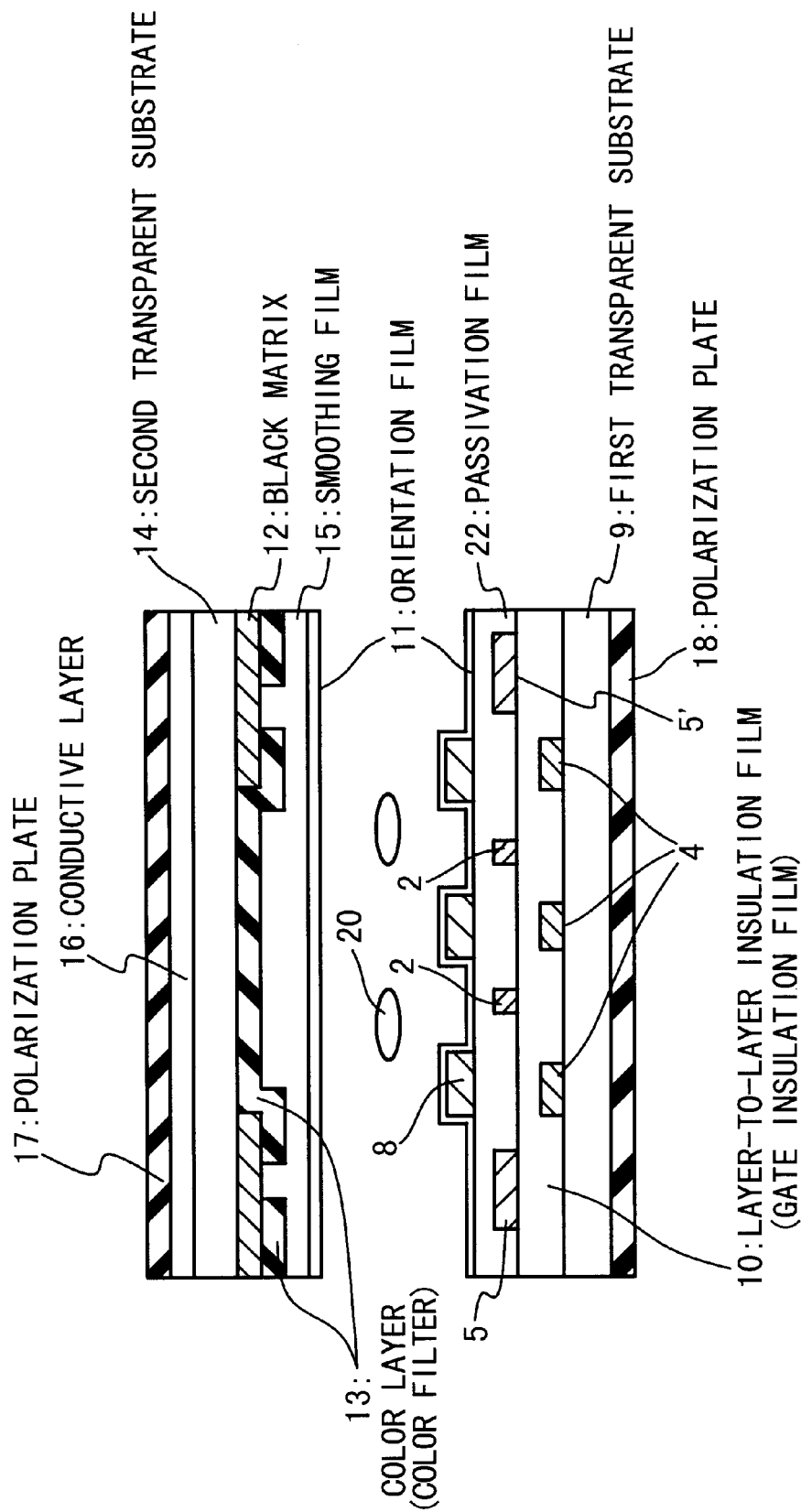
FIG. 37 is a fifteenth section view according to the display cell of the present invention.

FIG. 37 shows a section taken on the line A–A' of the display cell 115 of the present invention. FIG. 37 is a fifteenth section view according to the display cell of the present invention. In FIG. 37, the upper structure located on the upper portion of the liquid crystal layer composed of the liquid crystals 20 is provided with the polarization plate 17, the conductive layer 16, the second transparent substrate 14, the black matrix 12, the color layer 13, the smoothing film 15 and the orientation film 11. The lower structure located on the lower portion of the liquid crystal layer is provided with the orientation film 11, the auxiliary electrode 8, the passivation film 22, the pixel electrode 2, the data line 5, the layer-to-layer insulation film (gate insulation film) 10, the common electrode 4, the first transparent substrate 9 and the polarization plate 18.

The structure of the display cell 115 shown in FIGS. 36, 37 is basically equal to that of the display cell 113 shown in FIGS. 32, 33. The difference lies in the shapes of the common electrode 4 and the auxiliary electrode 8 and the rubbing direction 19. The auxiliary electrode 8 of the display cell 115 is matched with the common electrode 4, and both of them are bent in shape. The auxiliary electrode 8 having the same potential as the common electrode 4 through the contact hole 21 can reduce the drive voltage applied to the liquid crystal, due to the narrow electrode interval from the common electrode. Also, the constricted part is formed in the vicinity of the center, and the pixel electrode 2 is straight in shape. Thus, in the display cell 115 of the comb electrode, the action of the constricted part leads to the coexistence of the region where the liquid crystal 20 is rotated in the right direction with the region where it is rotated in the left direction, within the column through which the light is passed. For this reason, at the time of the white display, even if the electric field is applied between the pixel electrode 2 and the common electrode 4, the orientation directions of the liquid crystals are not oriented in the one direction. Hence, it is possible to protect the coloration from the oblique field. Moreover, this has the merit of attaining the wider field angle.

Figure 38:
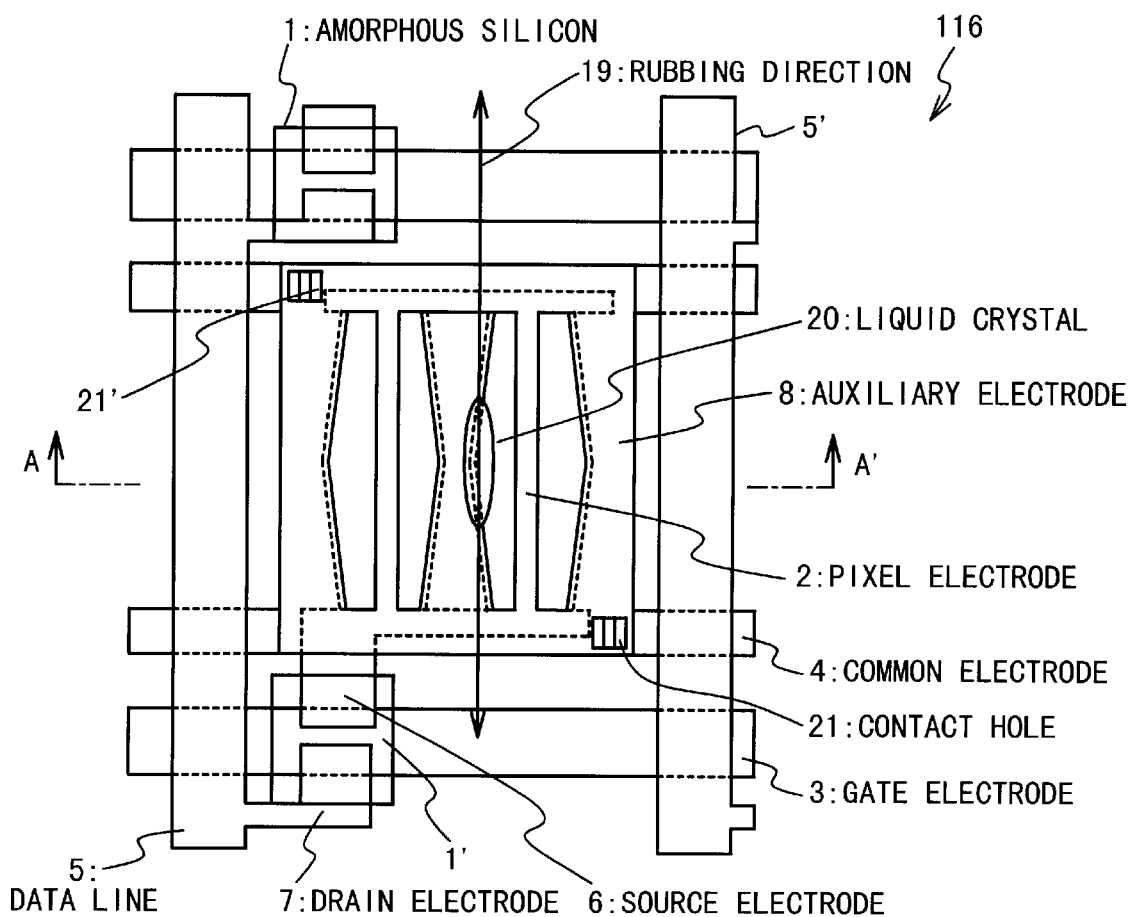
FIG. 38 is a sixteenth plan view according to the display cell of the present invention.

Next, a sixth embodiment of the display cell according to the present invention will be described below with reference to FIGS. 38, 39. FIG. 38 shows a sixth plane according to the display cell of the present invention. A cell 116 shown in FIG. 38 has the amorphous silicon 1, the pixel electrode 2, the gate electrode 3, the common electrode 4, the data line 5, the source electrode 6, the drain electrode 7 and the contact holes 21, 21'. The auxiliary electrode 8 has the three-pole structure. The liquid crystals 20 of the display cell 116 shown in FIG. 38 are initially oriented in the rubbing direction 19 (parallel to the longitudinal direction of the pixel electrode 2).

Figure 39:
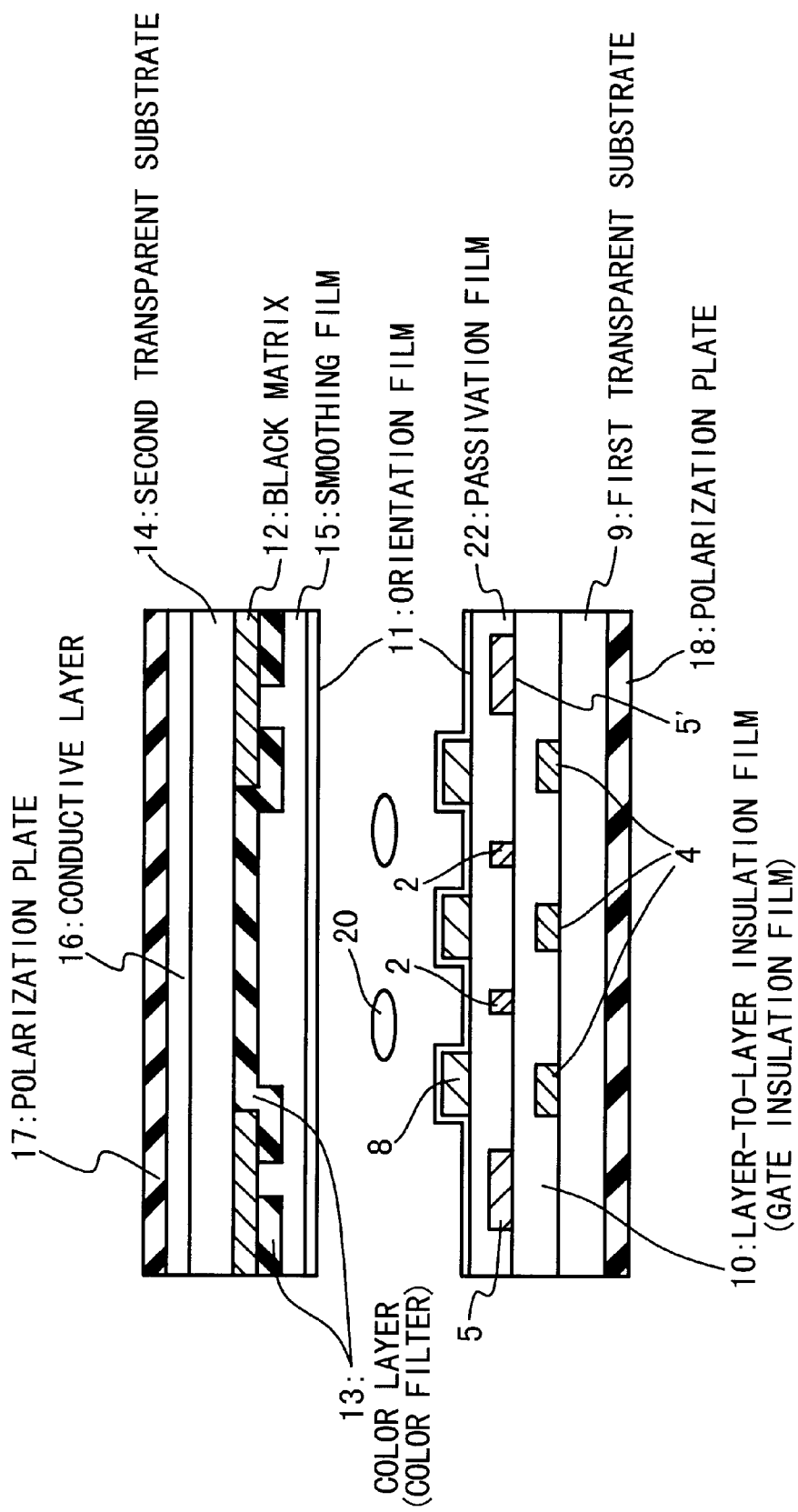
FIG. 39 is a sixteenth section view according to the display cell of the present invention.

FIG. 39 shows a section taken on the line A–A' of the display cell 116 of the present invention. FIG. 39 is a sixth section view according to the display cell of the present invention. In FIG. 39, the upper structure located on the upper portion of the liquid crystal layer composed of the liquid crystals 20 is provided with the polarization plate 17, the conductive layer 16, the second transparent substrate 14, the black matrix 12, the color layer 13, the smoothing film 15 and the orientation film 11. The lower structure located on the lower portion of the liquid crystal layer is provided with the orientation film 11, the auxiliary electrode 8, the passivation film 22, the pixel electrode 2, the data line 5, the layer-to-layer insulation film (gate insulation film) 10, the common electrode 4, the first transparent substrate 9 and the polarization plate 18.

The structure of the display cell 116 shown in FIGS. 38, 39 is basically equal to that of the display cell 115 shown in FIGS. 36, 37. The difference lies in the configuration in which the display cell 116 has the contact hole 21'. The display cell 116 has the two contact holes. Thus, the potential of the auxiliary electrode 8 is set accurately and substantially constantly for any position.

Figure 40:
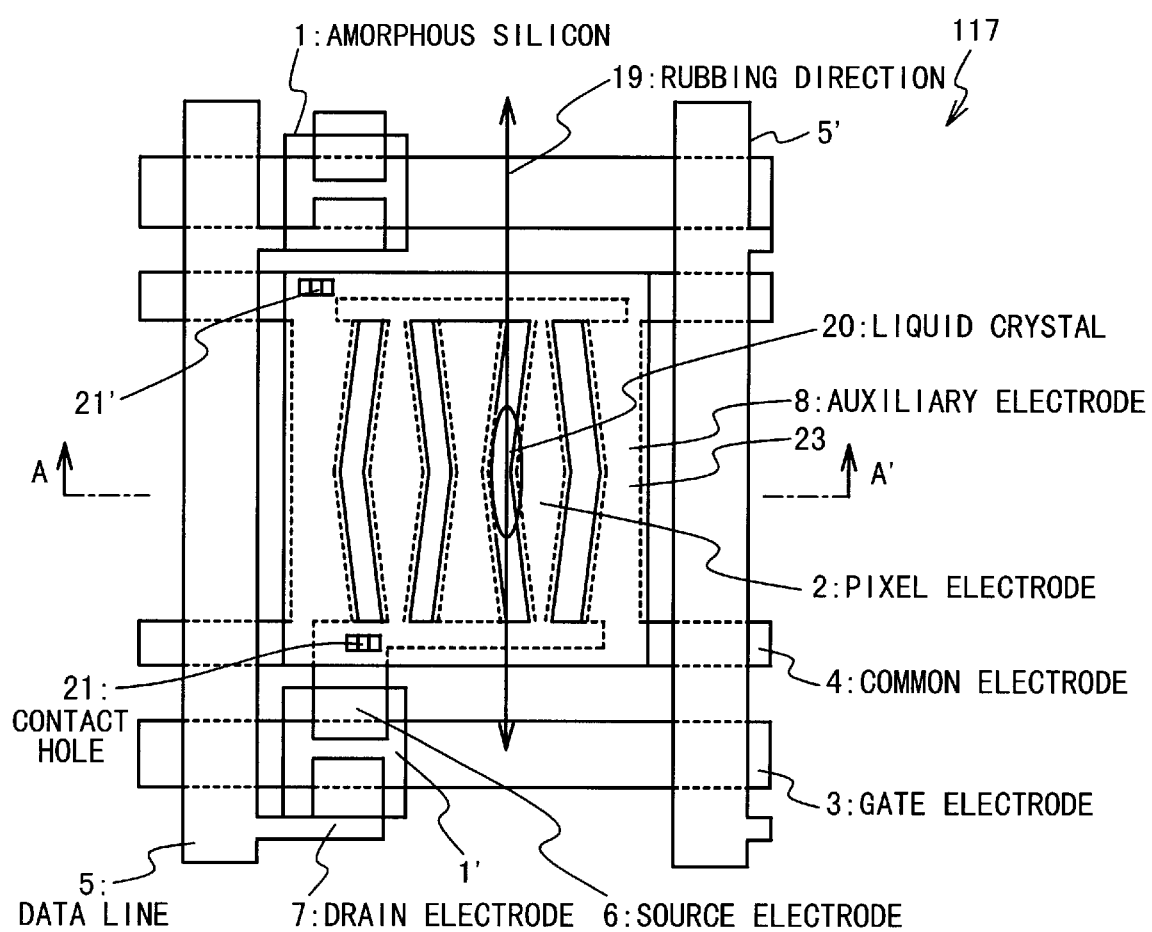
FIG. 40 is a seventeenth plan view according to the display cell of the present invention.

Next, a seventh embodiment of the display cell according to the present invention will be described below with reference to FIGS. 40, 41. FIG. 40 shows a seventh plane according to the display cell of the present invention. A cell 117 shown in FIG. 40 has the amorphous silicon 1, the pixel electrode 2, the gate electrode 3, the common electrode 4, the data line 5, the source electrode 6, the drain electrode 7 and the contact holes 21, 21'. The auxiliary electrode 8 has the three-pole structure. The liquid crystals 20 of the display cell 116 shown in FIG. 40 are initially oriented in the rubbing direction 19 (parallel to the longitudinal direction of the data line 5).

Figure 41:
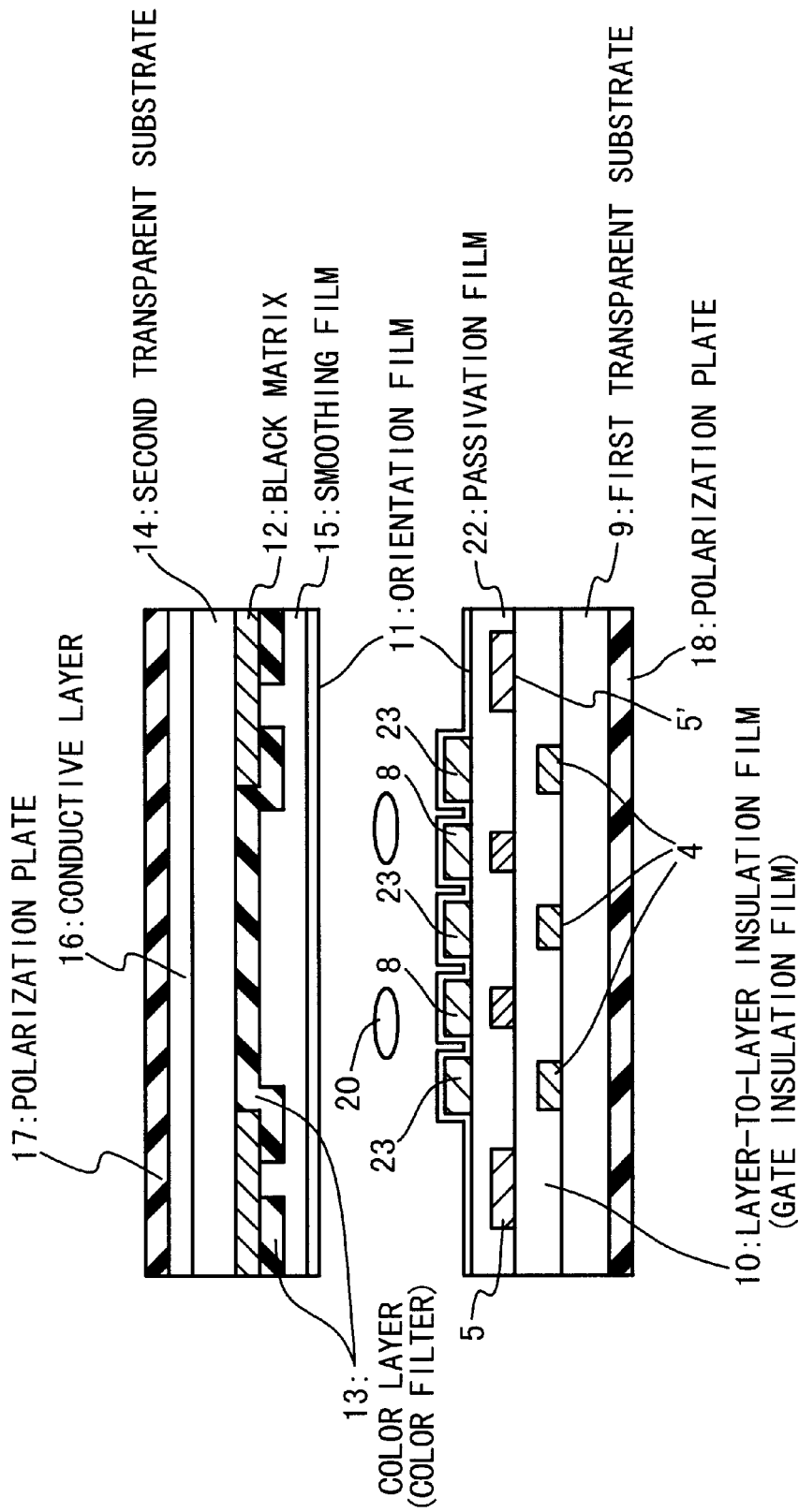
FIG. 41 is a seventeenth section view according to the display cell of the present invention.

FIG. 41 shows a section taken on the line A–A' of the display cell 116 of the present invention. FIG. 41 is a seventh section view according to the display cell of the present invention. In FIG. 41, the upper structure located on the upper portion of the liquid crystal layer composed of the liquid crystals 20 is provided with the polarization plate 17, the conductive layer 16, the second transparent substrate 14, the black matrix 12, the color layer 13, the smoothing film 15 and the orientation film 11. The lower structure located on the lower portion of the liquid crystal layer is provided with the orientation film 11, the auxiliary electrode 8, a second auxiliary electrode 23, the passivation film 22, the pixel electrode 2, the data line 5, the layer-to-layer insulation film (gate insulation film) 10, the common electrode 4, the first transparent substrate 9 and the polarization plate 18.

The auxiliary electrode 8 is connected through the contact hole 21 to the pixel electrode 2. The second auxiliary electrode 23 is connected through the contact hole 21' to the common electrode 4.

The second auxiliary electrode 23 is the transparent electrode made of ITO and the like. The potential substantially equal to that of the common electrode 4 is applied to the auxiliary electrode 8. The potential substantially equal to that of the common electrode 4 is applied to the second auxiliary electrode 23. The electrode interval between the auxiliary electrode 8 and the second auxiliary electrode 23 is arranged so as to make the electrode interval between the pixel electrode 2 and the common electrode 4 narrower. Thus, while the drop in the aperture ratio is avoided, the strength of the generated electric field can be further increased as compared with those generated by the display cells 101 to 115 for increasing the strength of the electric field by using only the auxiliary electrode 8.

The structure of the display cell 117 shown in FIGS. 40, 41 is the variation of the display cell 116 shown in FIGS. 38, 39. In the display cell 117, so as to increase the electric field strengths of the pixel electrode 2 and the common electrode 4, the auxiliary electrode made of the transparent electrode is mounted in each of them. Also, the auxiliary electrode 8 and the second auxiliary electrode 23 have the shapes matched with the pixel electrode 2 and the common electrode 4, respectively, so that the electric field strengths are increased. Also, all of the pixel electrode 2, the common electrode 4, the auxiliary electrode 8 and the second auxiliary electrode 23 are bent in shape. So, the initial orientation angles of the liquid crystals are set at the angle parallel to the longitudinal direction of the data line 5. In the display cell 117 having this configuration, due to the action of the constricted part, the region where the liquid crystal 20 is rotated in the right direction coexists with the region where it is rotated in the left direction, within the column through which the light is passed. For this reason, at the time of the white display, even if the electric field is applied between the pixel electrode 2 and the common electrode 4, the orientation directions of the liquid crystals are not in the one direction. Hence, it is possible to protect the coloration from the oblique field. Moreover, this has the merit of attaining the wider field angle.

Figure 42:
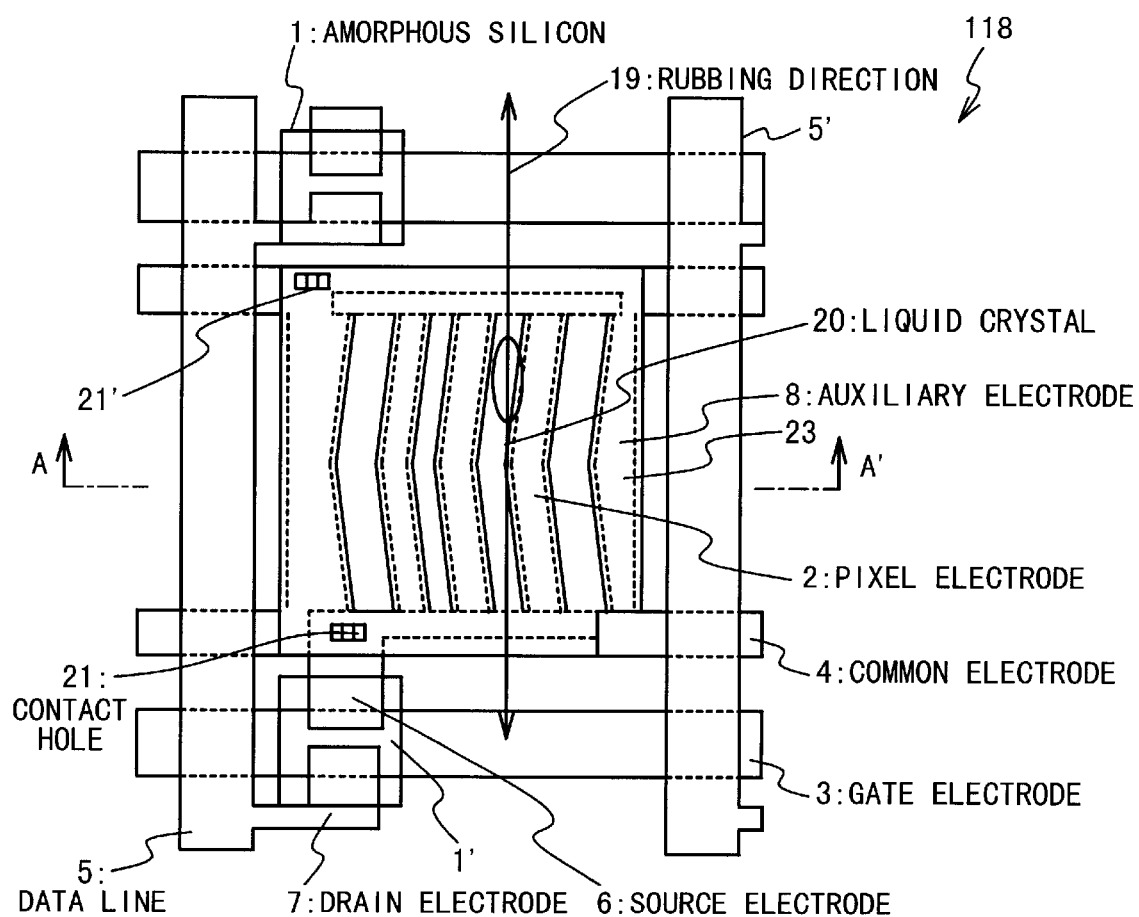
FIG. 42 is an eighteenth plan view according to the display cell of the present invention.

Next, an eighteenth embodiment of the display cell according to the present invention will be described below with reference to FIGS. 42, 43. FIG. 42 shows an eighteenth plane according to the display cell of the present invention. A cell 118 shown in FIG. 42 has the amorphous silicon 1, the pixel electrode 2, the gate electrode 3, the common electrode 4, the data line 5, the source electrode 6, the drain electrode 7, the contact holes 21, 21' and the second auxiliary electrode 23. The auxiliary electrode 8 has the three-pole structure. The liquid crystals 20 of the display cell 118 shown in FIG. 42 are initially oriented in the rubbing direction 19 (parallel to the longitudinal direction of the data line 5).

Figure 43:
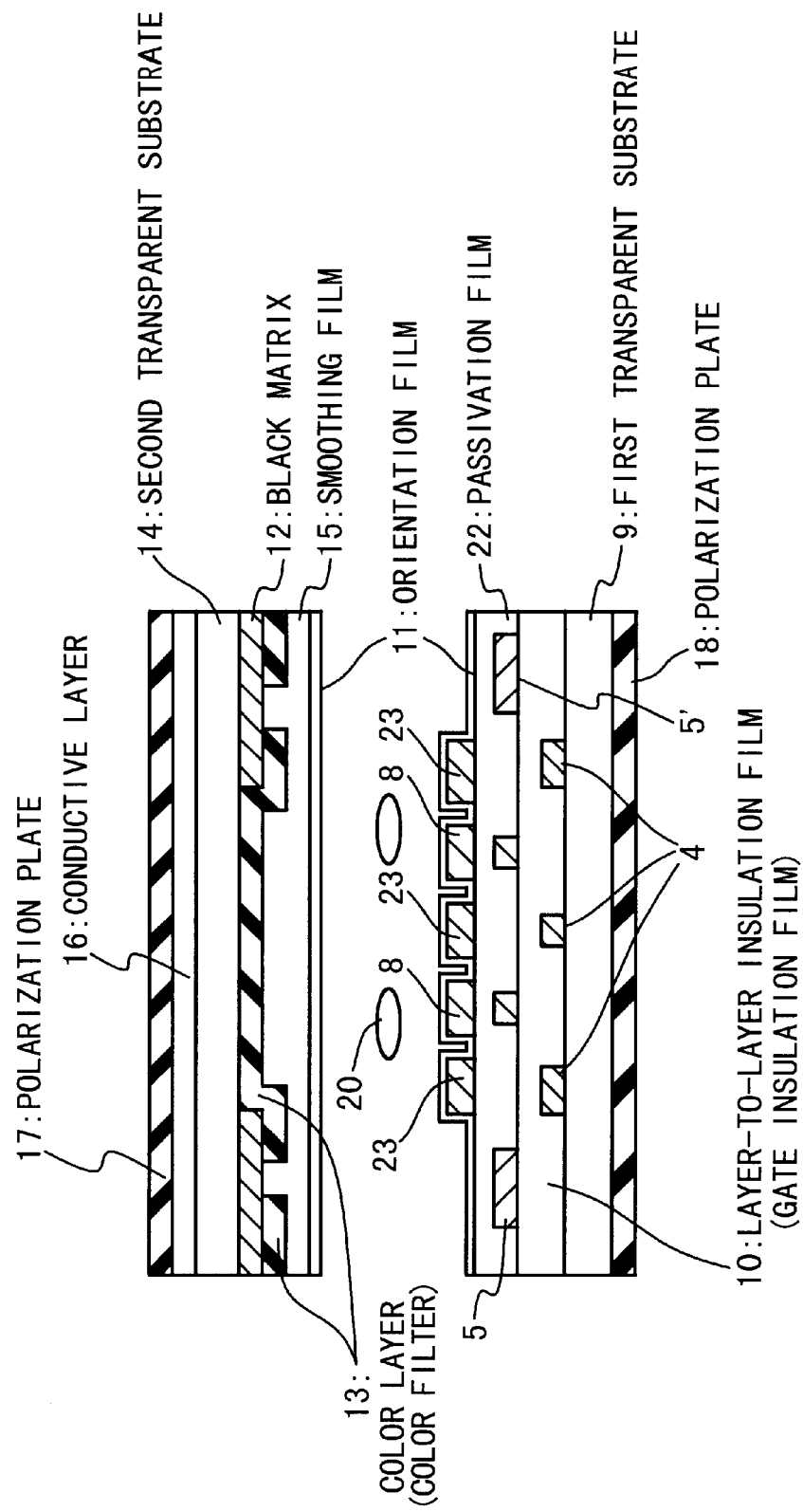
FIG. 43 is an eighteenth section view according to the display cell of the present invention.

FIG. 43 shows a section taken on the line A–A' of the display cell 118 of the present invention. FIG. 43 is an eighteenth section view according to the display cell of the present invention. In FIG. 43, the upper structure located on the upper portion of the liquid crystal layer composed of the liquid crystals 20 is provided with the polarization plate 17, the conductive layer 16, the second transparent substrate 14, the black matrix 12, the color layer 13, the smoothing film 15 and the orientation film 11. The lower structure located on the lower portion of the liquid crystal layer is provided with the orientation film 11, the auxiliary electrode 8, the second auxiliary electrode 23, the passivation film 22, the pixel electrode 2, the data line 5, the layer-to-layer insulation film (gate insulation film) 10, the common electrode 4, the first transparent substrate 9 and the polarization plate 18.

The structure of the display cell 118 shown in FIGS. 42, 43 is the variation of the display cell 117 shown in FIGS. 40, 41. In the display cell 118, the auxiliary electrode 8 is created in the form of a triangular notch. The pixel electrode 2 is similarly created in the form of a triangular notch, which is matched with the auxiliary electrode 8. The second auxiliary electrode 23 has the expansion part and the constricted part matched with the shape of the auxiliary electrode 8. The common electrode 4 similarly has the expansion part and the constricted part matched with the second auxiliary electrode 23. By those shapes, in the display cell 118, due to the actions of the constricted parts, the region where the liquid crystal 20 is rotated in the right direction coexists with the region where it is rotated in the left direction, within the column through which the light is passed. For this reason, at the time of the white display, even if the electric field is applied between the pixel electrode 2 and the common electrode 4, the orientation directions of the liquid crystals are not in the one direction. Hence, it is possible to protect the coloration from the oblique field. Moreover, this has the merit of attaining the wider field angle.

Figure 44:
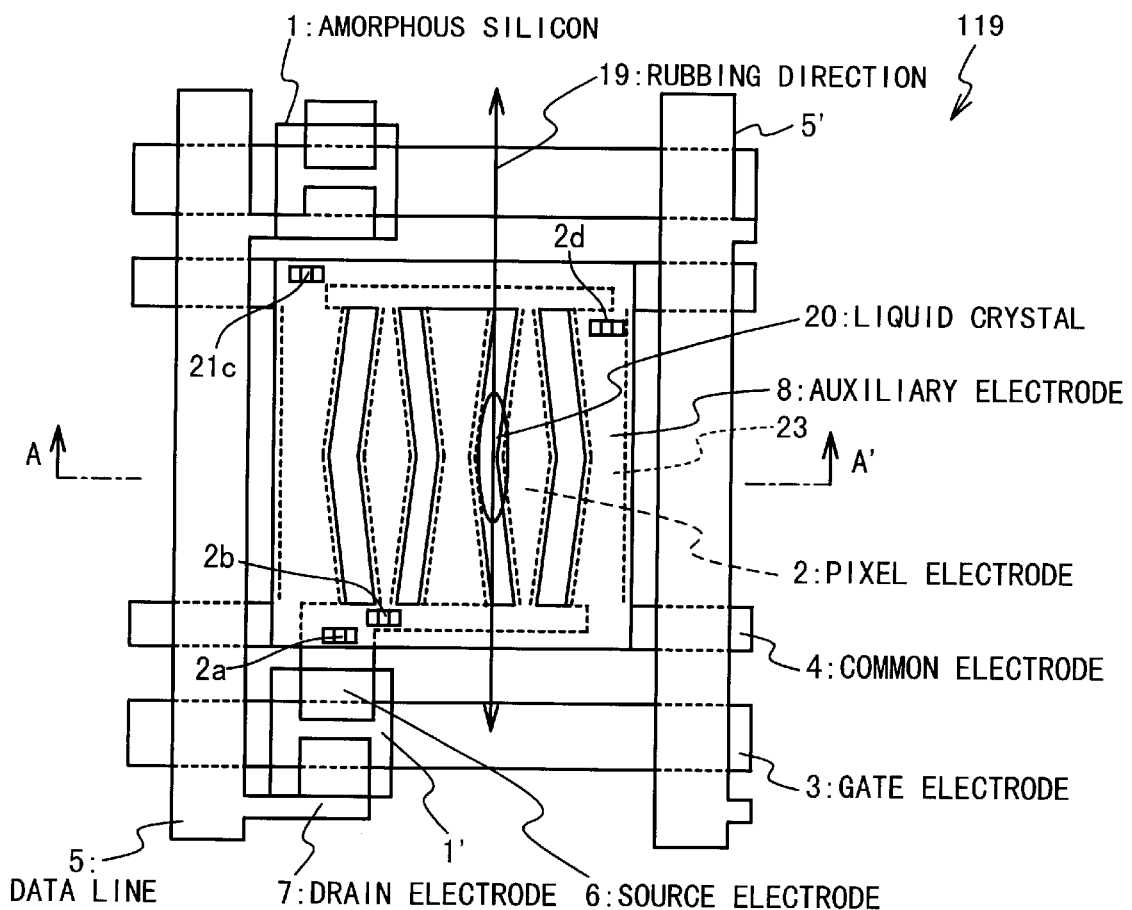
FIG. 44 is a nineteenth plan view according to the display cell of the present invention.

Next, a nineteenth embodiment of the display cell according to the present invention will be described below with reference to FIGS. 44, 44. FIG. 44 shows a nineteenth plane according to the display cell of the present invention. A cell 119 shown in FIG. 44 has the amorphous silicon 1, the pixel electrode 2, the gate electrode 3, the common electrode 4, the data line 5, the source electrode 6, the drain electrode 7, contact holes 21a, 21b, 21c and 21d, and the second auxiliary electrode 23. The auxiliary electrode 8 has the three-pole structure. The liquid crystals 20 of the display cell 119 shown in FIG. 44 are initially oriented in the rubbing direction 19 (parallel to the longitudinal direction of the data line 5).

Figure 45:
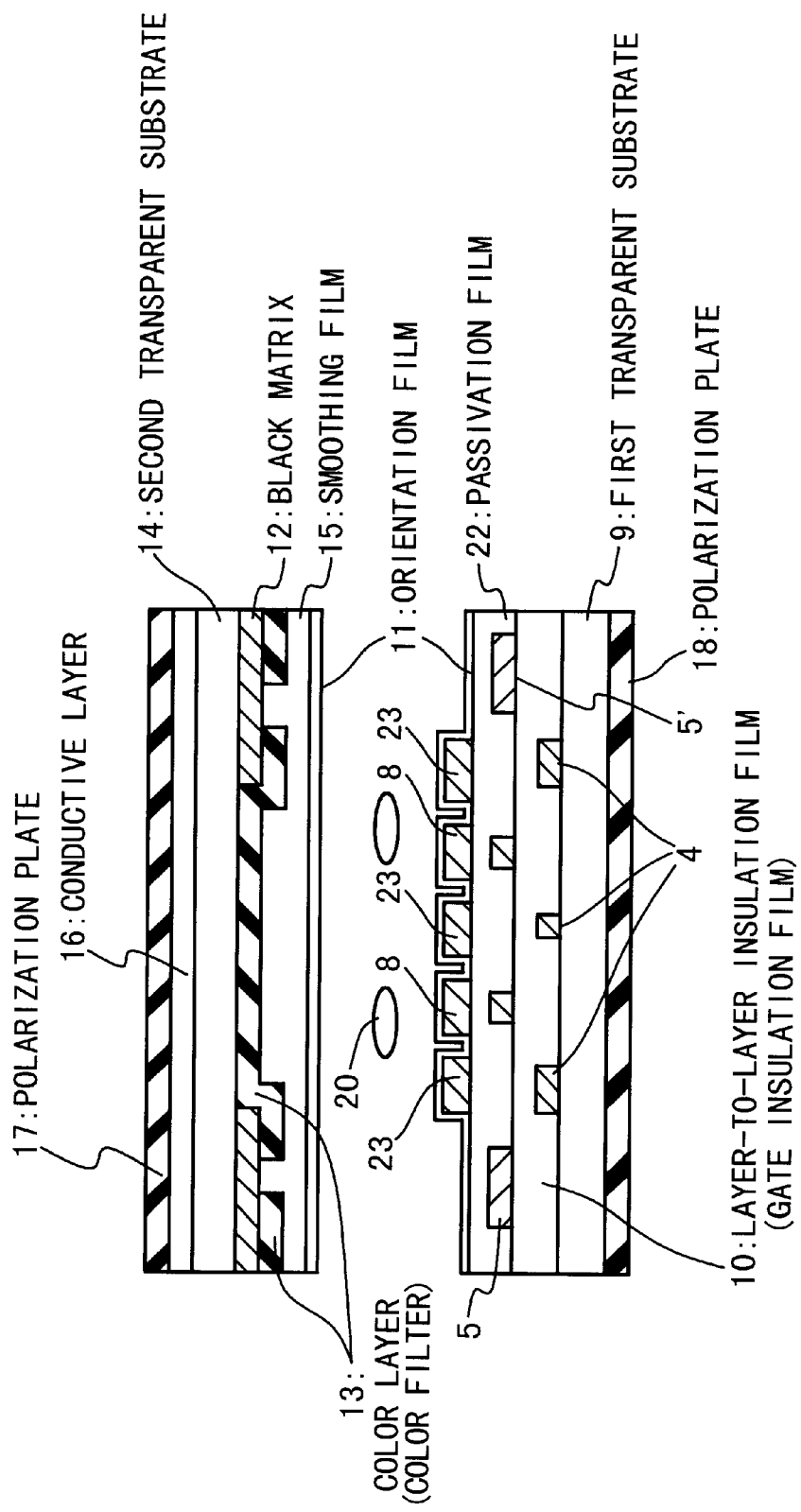
FIG. 45 is a nineteenth section view according to the display cell of the present invention.

FIG. 45 shows a section taken on the line A–A' of the display cell 119 of the present invention. FIG. 45 is a nineteenth section view according to the display cell of the present invention. In FIG. 45, the upper structure located on the upper portion of the liquid crystal layer composed of the liquid crystals 20 is provided with the polarization plate 17, the conductive layer 16, the second transparent substrate 14, the black matrix 12, the color layer 13, the smoothing film 15 and the orientation film 11. The lower structure located on the lower portion of the liquid crystal layer is provided with the orientation film 11, the auxiliary electrode 8, the second auxiliary electrode 23, the passivation film 22, the pixel electrode 2, the data line 5, the layer-to-layer insulation film (gate insulation film) 10, the common electrode 4, the first transparent substrate 9 and the polarization plate 18.

The structure of the display cell 119 shown in FIGS. 44, 45 is basically equal to that of the display cell 117 shown in FIGS. 40, 41. In the display cell 119, the auxiliary electrode 8 is connected through the contact holes 21a, 21b to the pixel electrode 2. The second auxiliary electrode 23 is connected through the contact holes 21c, 21d to the common electrode 4. The contact holes are disposed on each of the auxiliary electrode 8 and the second auxiliary electrode 23, respectively. Thus, it is possible to improve the regularities in the potentials of the auxiliary electrode 8 and the second auxiliary electrode 23.

Figure 46:
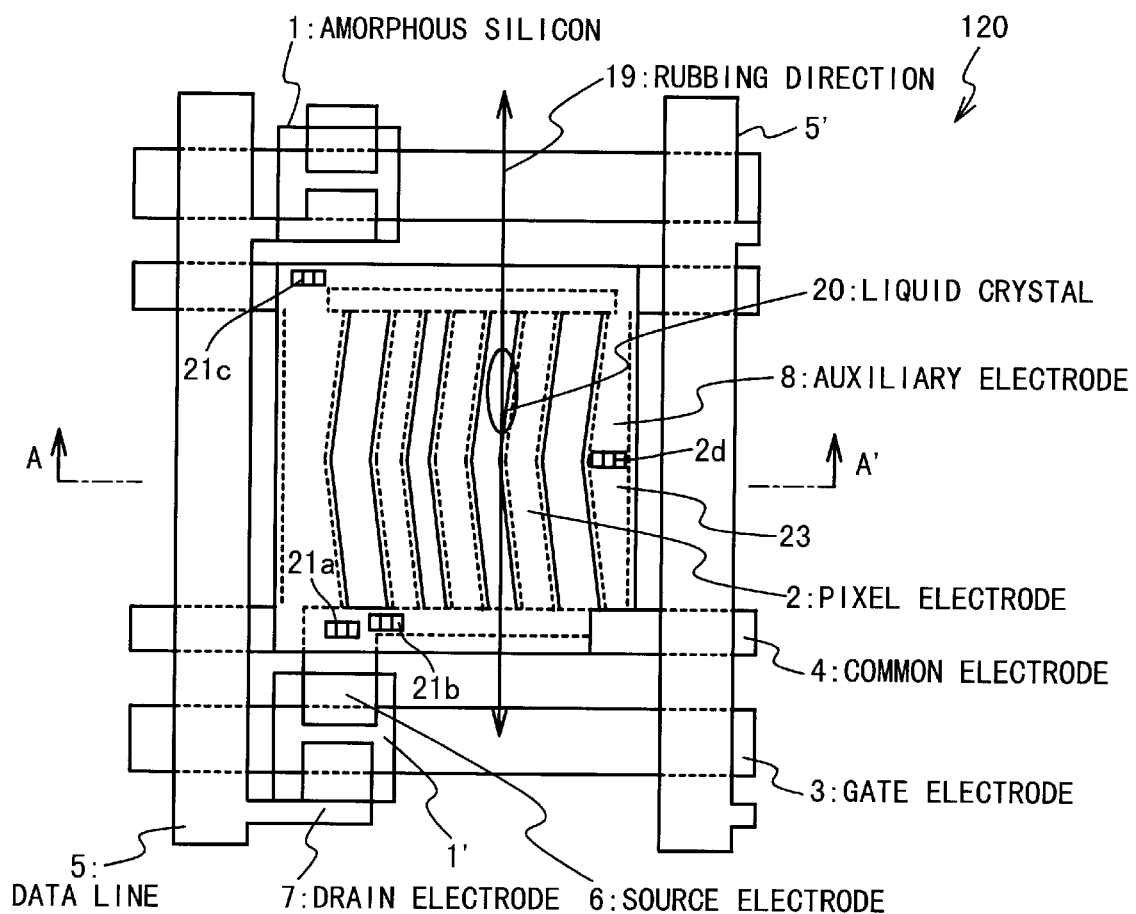
FIG. 46 is a 20-th plan view according to the display cell of the present invention.

Next, a 20-th embodiment of the display cell according to the present invention will be described below with reference to FIGS. 46, 47. FIG. 46 shows a 20-th plan view according to the display cell of the present invention. A cell 120 shown in FIG. 46 has the amorphous silicon 1, the pixel electrode 2, the gate electrode 3, the common electrode 4, the data line 5, the source electrode 6, the drain electrode 7, the contact holes 21a, 21b, 21c and 21d, and the second auxiliary electrode 23. The auxiliary electrode 8 has the three-pole structure. The liquid crystals 20 of the display cell 120 shown in FIG. 46 are initially oriented in the rubbing direction 19 (parallel to the longitudinal direction of the data line 5).

Figure 47:
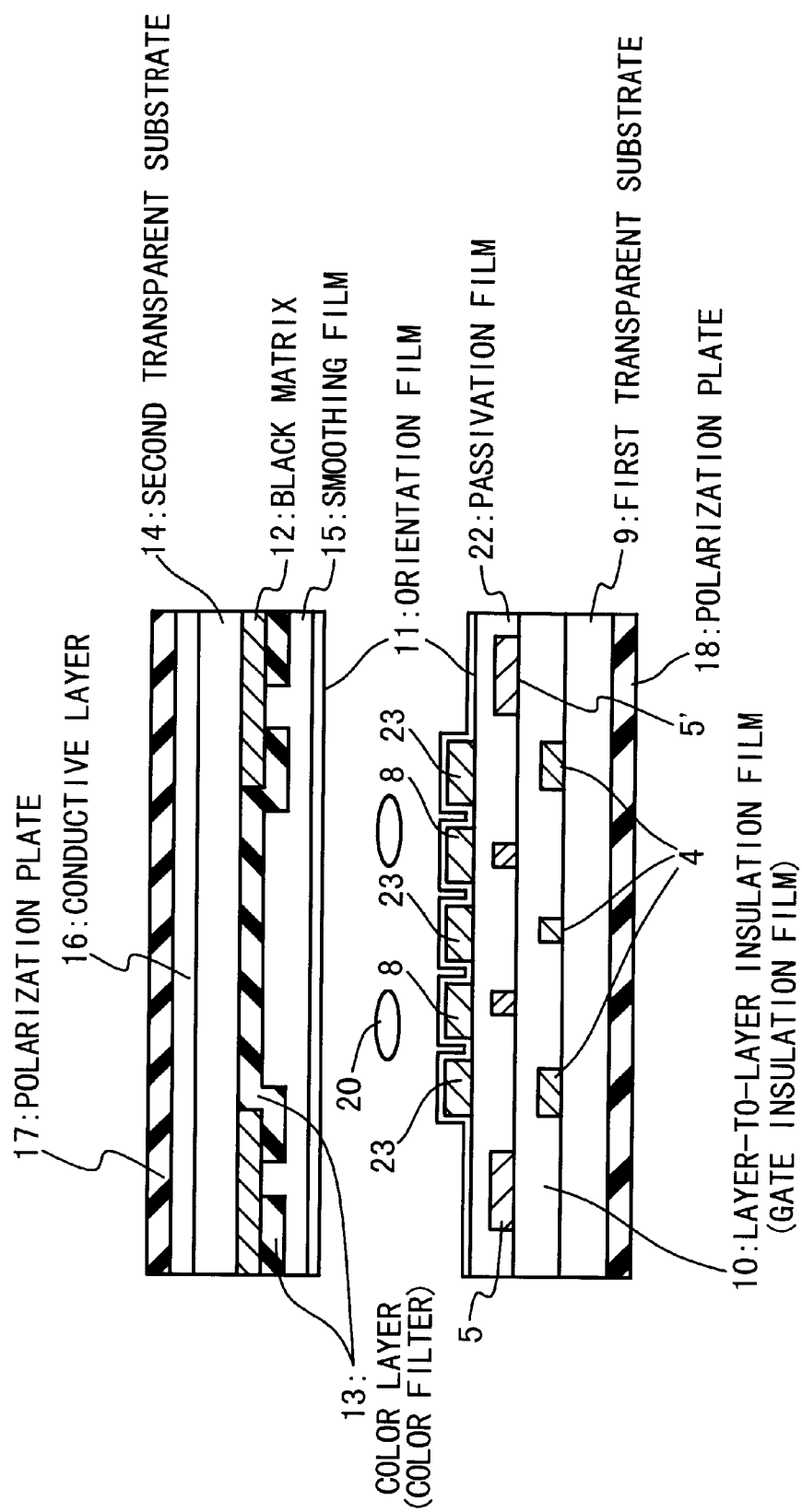
FIG. 47 is a 20-th section view according to the display cell of the present invention.

FIG. 47 shows a section taken on the line A–A' of the display cell 120 of the present invention. FIG. 47 is a 20-th section view according to the display cell of the present invention. In FIG. 47, the upper structure located on the upper portion of the liquid crystal layer composed of the liquid crystals 20 is provided with the polarization plate 17, the conductive layer 16, the second transparent substrate 14, the black matrix 12, the color layer 13, the smoothing film 15 and the orientation film 11. The lower structure located on the lower portion of the liquid crystal layer is provided with the orientation film 11, the auxiliary electrode 8, the second auxiliary electrode 23, the passivation film 22, the pixel electrode 2, the data line 5, the layer-to-layer insulation film (gate insulation film) 10, the common electrode 4, the first transparent substrate 9 and the polarization plate 18.

The structure of the display cell 120 shown in FIGS. 46, 47 is the variation of the display cell 118 shown in FIGS. 42, 43. In the display cell 120, the auxiliary electrode 8 is connected through the contact holes 21a, 21b to the pixel electrode 2. The second auxiliary electrode 23 is connected through the contact holes 21c, 21d to the common electrode 4. The contact holes are disposed on each of the auxiliary electrode 8 and the second auxiliary electrode 23, respectively. Thus, it is possible to improve the regularities in the potentials of the auxiliary electrode 8 and the second auxiliary electrode 23.

Figure 48:
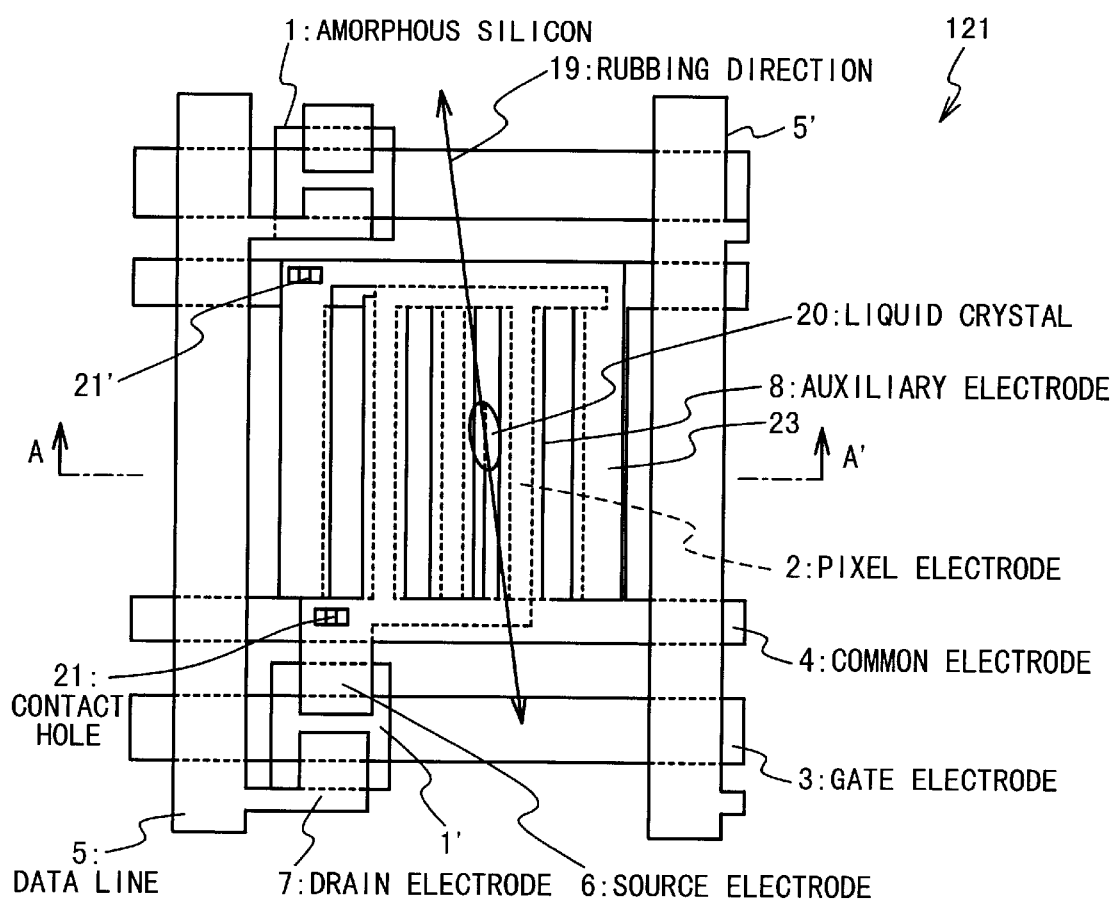
FIG. 48 is a 21-th plan view according to the display cell of the present invention.

Next, a 21-th embodiment of the display cell according to the present invention will be described below with reference to FIGS. 48, 49. FIG. 48 shows a 21-th plan view according to the display cell of the present invention. A display cell 121 shown in FIG. 48 has the amorphous silicon 1, the pixel electrode 2, the gate electrode 3, the common electrode 4, the data line 5, the source electrode 6, the drain electrode 7, the contact holes 21, 21' and the second auxiliary electrode 23. The auxiliary electrode 8 has the three-pole structure. The liquid crystals 20 of the display cell 121 shown in FIG. 48 are initially oriented in the rubbing direction 19 (at the angle deviated by 15 degrees with respect to the longitudinal direction of the pixel electrode 2).

Figure 49:
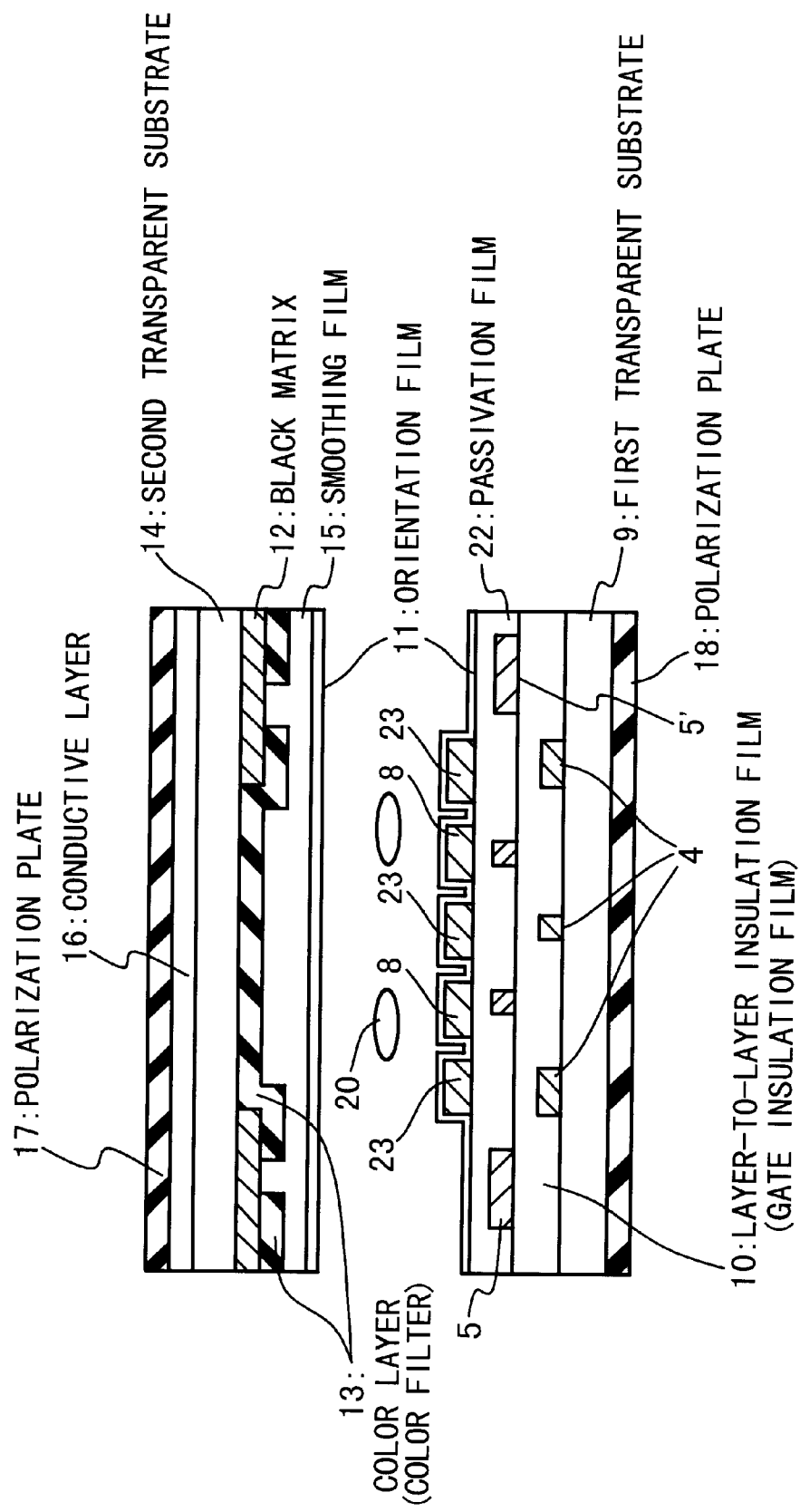
FIG. 49 is a 21-th section view according to the display cell of the present invention.

FIG. 49 shows a section taken on the line A–A' of the display cell 121 of the present invention. FIG. 49 is a 21-th section view according to the display cell of the present invention. In FIG. 49, the upper structure located on the upper portion of the liquid crystal layer composed of the liquid crystals 20 is provided with the polarization plate 17, the conductive layer 16, the second transparent substrate 14, the black matrix 12, the color layer 13, the smoothing film 15 and the orientation film 11. The lower structure located on the lower portion of the liquid crystal layer is provided with the orientation film 11, the auxiliary electrode 8, the second auxiliary electrode 23, the passivation film 22, the pixel electrode 2, the data line 5, the layer-to-layer insulation film (gate insulation film) 10, the common electrode 4, the first transparent substrate 9 and the polarization plate 18.

The auxiliary electrode 8 is connected through the contact hole 21 to the pixel electrode 2. The second auxiliary electrode 23 is connected through the contact hole 21' to the common electrode 4.

The auxiliary electrode 8 provides the effect corresponding to the expansion of the pixel electrode 2. The auxiliary electrode 8 increases the strength of the electric field generated by the action of the pixel electrode 2. The second auxiliary electrode 23 provides the effect corresponding to the expansion of the common electrode 4. The second auxiliary electrode 23 increases the strength of the electric field generated by the action of the common electrode 4.

The structure of the display cell 121 shown in FIGS. 48, 49 is the variation of the display cell 117 shown in FIGS. 40, 41. The difference lies in the placement of the auxiliary electrode for increasing the strength of the electric field. The display cell 121 has both the auxiliary electrode 8 for increasing the pixel potential and the second auxiliary electrode 23 for increasing the common potential. Thus, the display cell 121 provides the excellent effect of increasing the strength of the electric field, as compared with the display cell 102.

Figure 50:
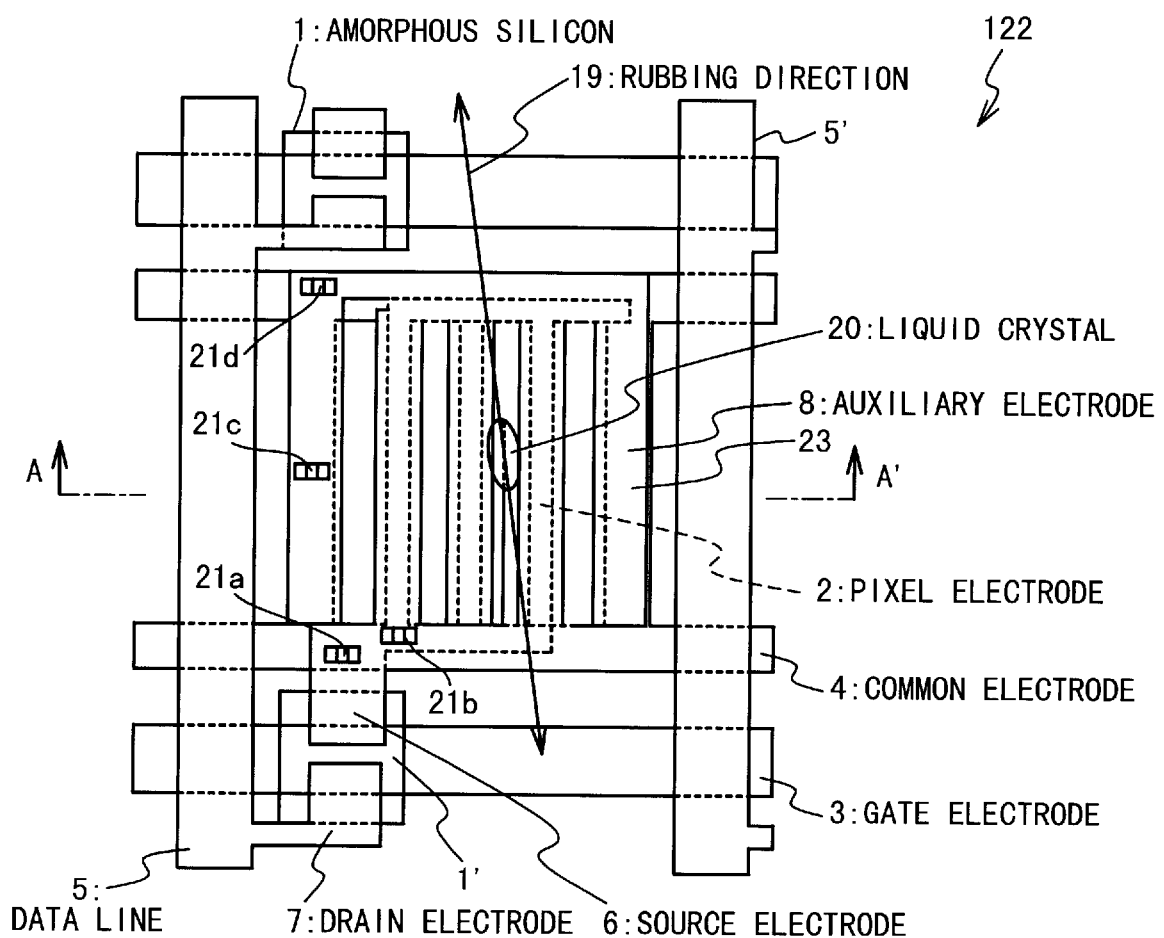
FIG. 50 is a 22-th plan view according to the display cell of the present invention.

Next, a 22-th embodiment of the display cell according to the present invention will be described below with reference to FIGS. 50, 51. FIG. 50 shows a 22-th plane according to the display cell of the present invention. A display cell 122 shown in FIG. 50 has the amorphous silicon 1, the pixel electrode 2, the gate electrode 3, the common electrode 4, the data line 5, the source electrode 6, the drain electrode 7, the contact holes 21a, 21b, 21c and 21d, and the second auxiliary electrode 23. The auxiliary electrode 8 has the three-pole structure. The liquid crystals 20 of the display cell 122 shown in FIG. 50 are initially oriented in the rubbing direction 19 (at the angle deviated by 15 degrees with respect to the longitudinal direction of the pixel electrode 2).

Figure 51:
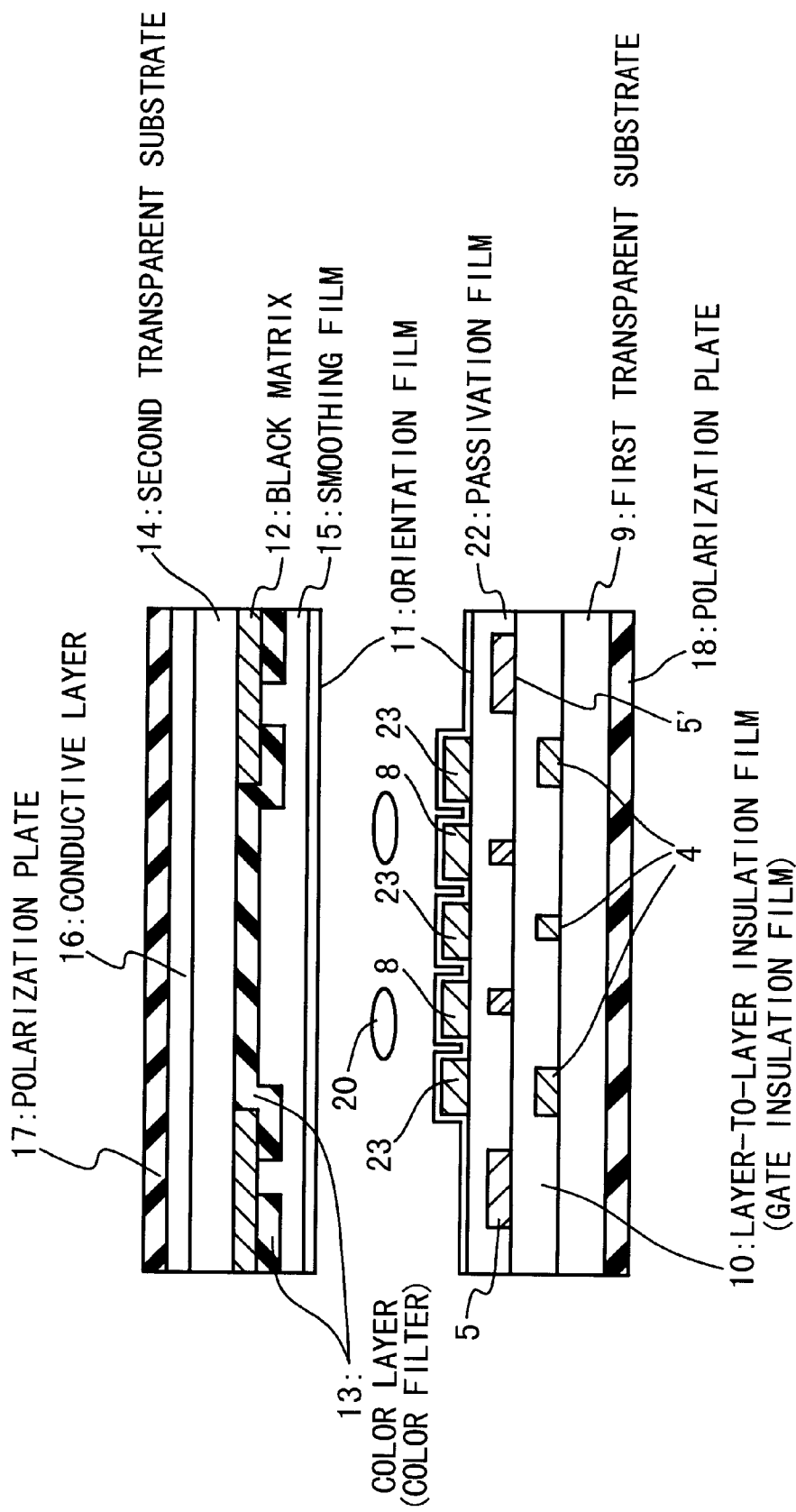
FIG. 51 is a 22-th section view according to the display cell of the present invention.

FIG. 51 shows a section taken on the line A–A' of the display cell 122 of the present invention. FIG. 51 is a 22-th section view according to the display cell of the present invention. In FIG. 51, the upper structure located on the upper portion of the liquid crystal layer composed of the liquid crystals 20 is provided with the polarization plate 17, the conductive layer 16, the second transparent substrate 14, the black matrix 12, the color layer 13, the smoothing film 15 and the orientation film 11. The lower structure located on the lower portion of the liquid crystal layer is provided with the orientation film 11, the auxiliary electrode 8, the second auxiliary electrode 23, the passivation film 22, the pixel electrode 2, the data line 5, the layer-to-layer insulation film (gate insulation film) 10, the common electrode 4, the first transparent substrate 9 and the polarization plate 18.

The auxiliary electrode 8 is connected through the contact holes 21a, 21b to the pixel electrode 2. The second auxiliary electrode 23 is connected through the contact holes 21c, 21d to the common electrode 4. Each of the auxiliary electrode 8 and the second auxiliary electrode 23 of the display cell 122 has the two contact holes. Thus, the potential is set accurately and substantially constantly for any position.

Figure 52:
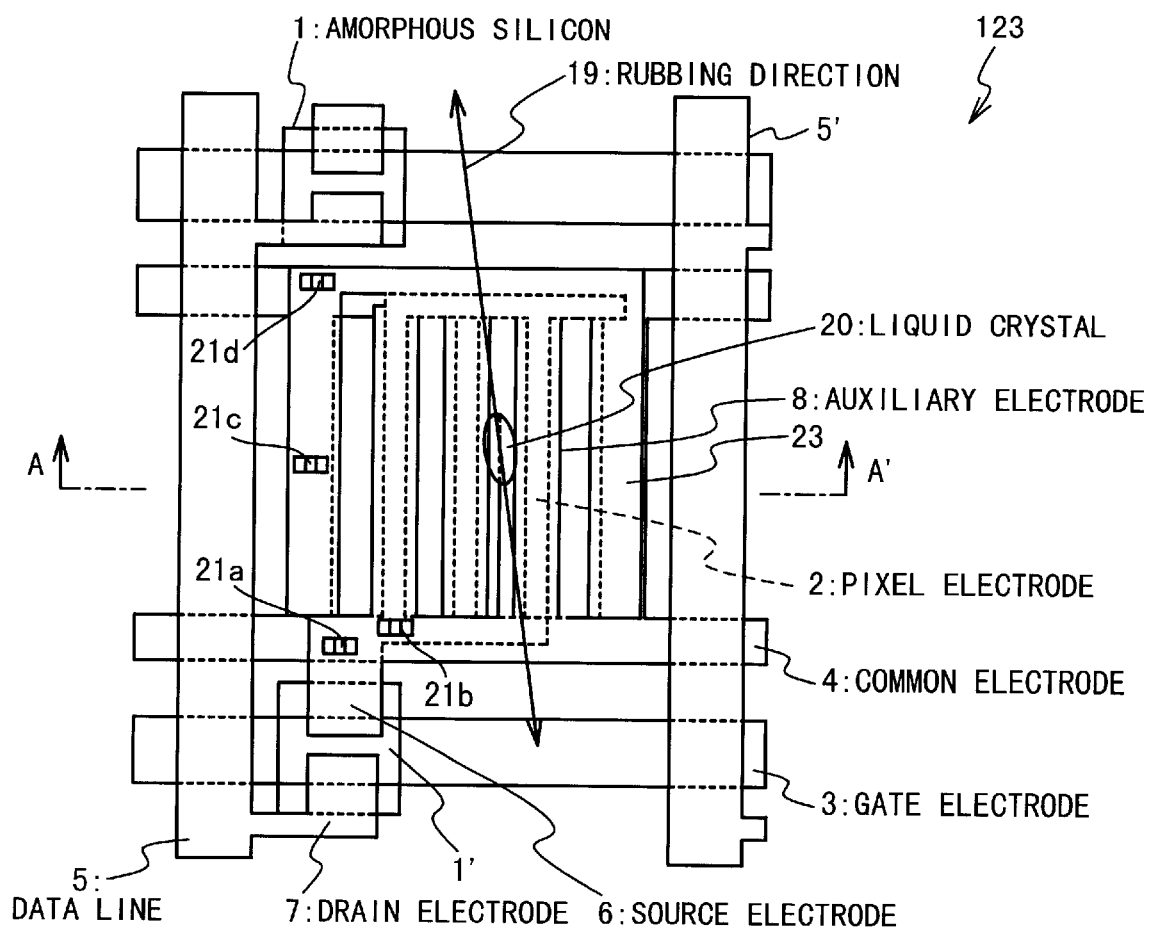
FIG. 52 is a 23-th plan view according to the display cell of the present invention.

Next, a 23-th embodiment of the display cell according to the present invention will be described below with reference to FIGS. 52, 53. FIG. 52 shows a 23-th plane according to the display cell of the present invention. A display cell 123 shown in FIG. 52 has the amorphous silicon 1, the pixel electrode 2, the gate electrode 3, the common electrode 4, the data line 5, the source electrode 6, the drain electrode 7, the contact holes 21a, 21b, 21c and 21d, and the second auxiliary electrode 23. The auxiliary electrode 8 has the three-pole structure. The liquid crystals 20 of the display cell 123 shown in FIG. 52 are initially oriented in the rubbing direction 19 (at the angle deviated by 15 degrees with respect to the longitudinal direction of the pixel electrode 2).

Figure 53:
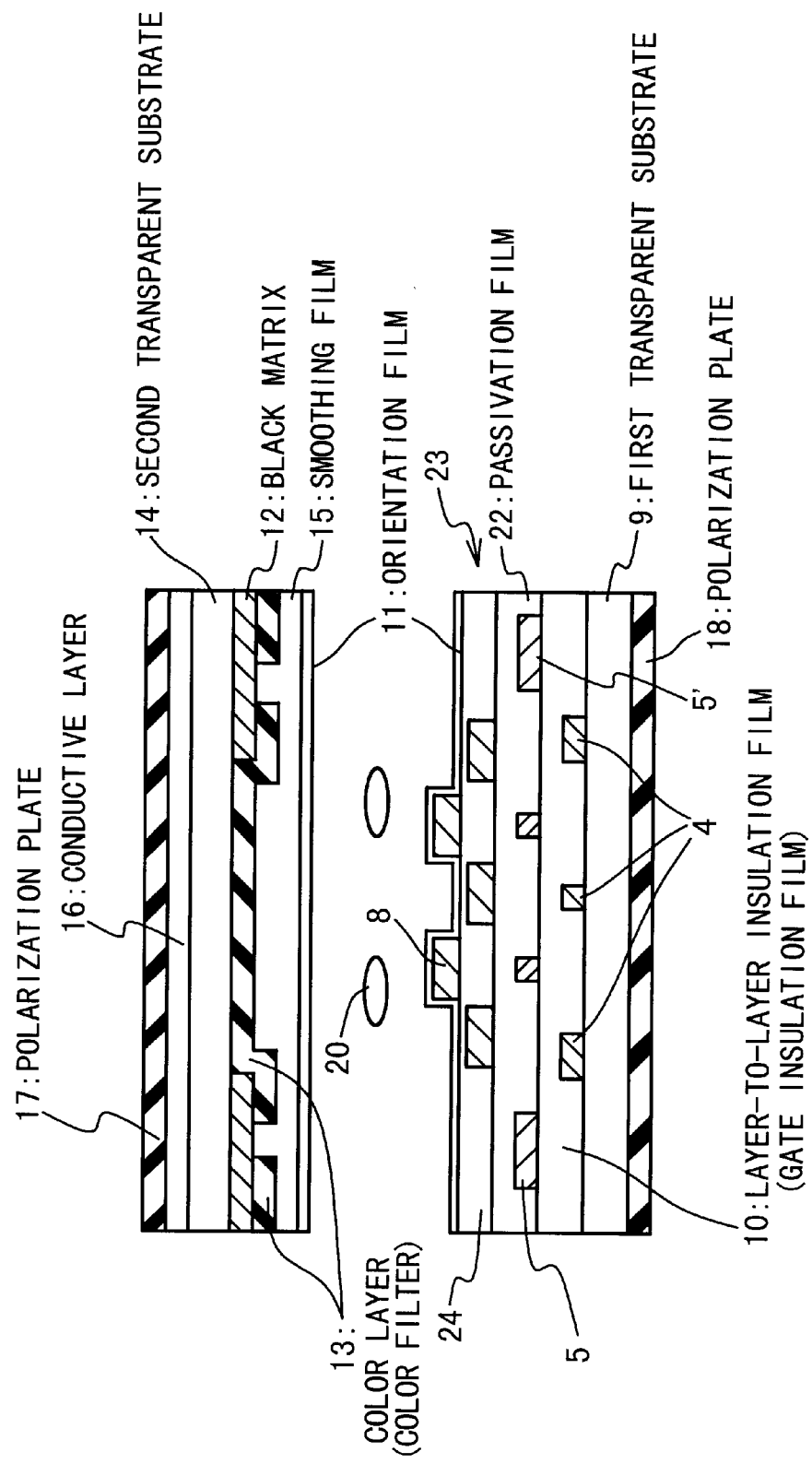
FIG. 53 is a 23-th section view according to the display cell of the present invention.

FIG. 53 shows a section taken on the line A–A' of the display cell 123 of the present invention. FIG. 53 is a 23-th section view according to the display cell of the present invention. In FIG. 53, the upper structure located on the upper portion of the liquid crystal layer composed of the liquid crystals 20 is provided with the polarization plate 17, the conductive layer 16, the second transparent substrate 14, the black matrix 12, the color layer 13, the smoothing film 15 and the orientation film 11. The lower structure located on the lower portion of the liquid crystal layer is provided with the orientation film 11, the auxiliary electrode 8, a passivation film 24, the second auxiliary electrode 23, the passivation film 22, the pixel electrode 2, the data line 5, the layer-to-layer insulation film (gate insulation film) 10, the common electrode 4, the first transparent substrate 9 and the polarization plate 18.

The placement of the second auxiliary electrode 23 in the display cell 123 differs from that of the display cell 122 shown in FIGS. 50, 51. However, the other points agree with those of the display cell 122.

In the display cell 123, the second auxiliary electrode 23 is configured such that the contact holes are formed on the part of the passivation film 22, and it is electrically connected to the common electrode 4. The auxiliary electrode 8 is configured so as to be electrically connected through the contact holes formed on the parts of the passivation film 22 and the second passivation film 24 to the pixel electrode 2. Such configuration can protect the display defect caused by the short-circuit between the auxiliary electrode 8 and the second auxiliary electrode 23.

Figure 54:
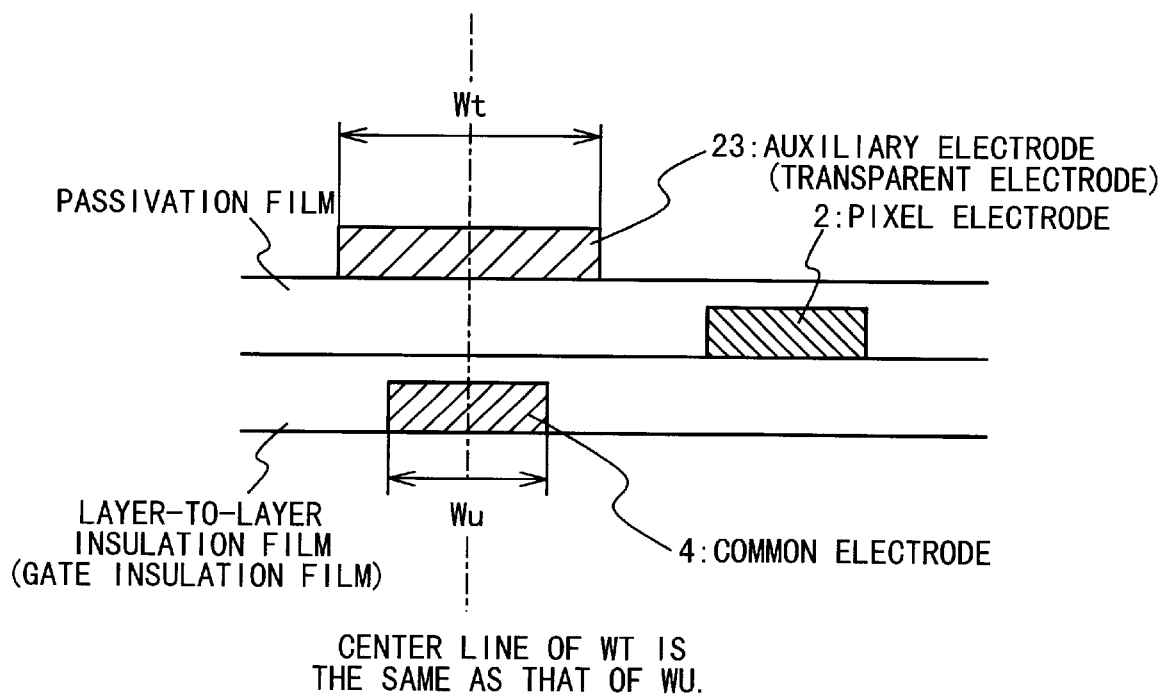
FIG. 54 is a view showing a placement of an electrode according to the present invention.

FIG. 54 shows the placement of the electrodes according to the present invention. FIG. 54 shows the part of the configurations shown in FIGS. 52, 53. FIG. 54 shows the pixel electrode 2, the common electrode 4 and the second auxiliary electrode 23. The common electrode 4 has a width Wu. The second auxiliary electrode 23 has a width Wt. The centers of the common electrode 4 and the second auxiliary electrode 23 are matched with each other. The condition with regard to this matching operation is also applied to the pixel electrode 2 and the auxiliary electrode 8. Also, in order to increase the strength of the electric field applied to the liquid crystal, it is much effective to make the auxiliary electrode 8 wider than the pixel electrode 2 and also make the second auxiliary electrode 23 wider than the common electrode 4 (Wt>Wu, especially Wt≧Wu+2($\mu$m)). The condition with regard to this matching operation and the condition with regard to the width of the auxiliary electrode are also applied to the other embodiments besides this embodiment.

Figure 55A:
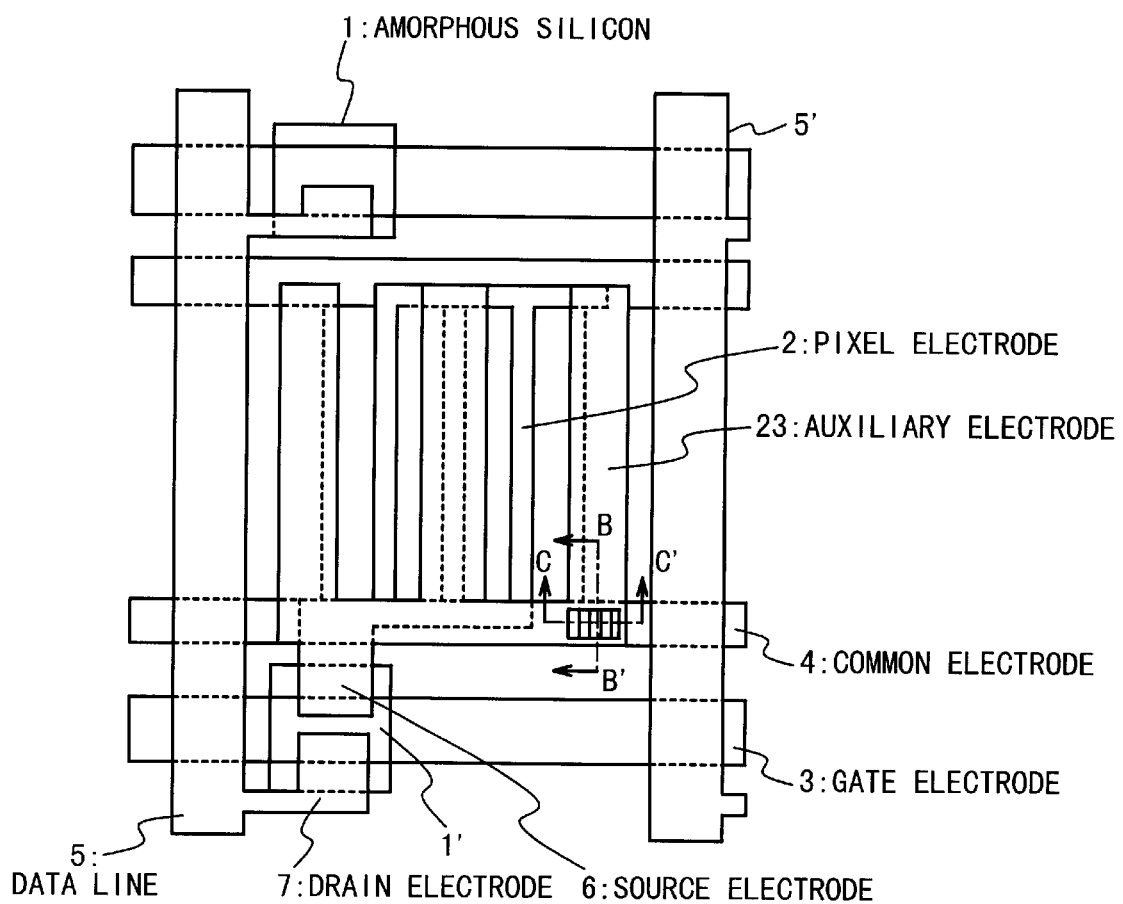
FIG. 55A is a view showing a configuration of a contact hole according to the present invention.
Figure 55B:
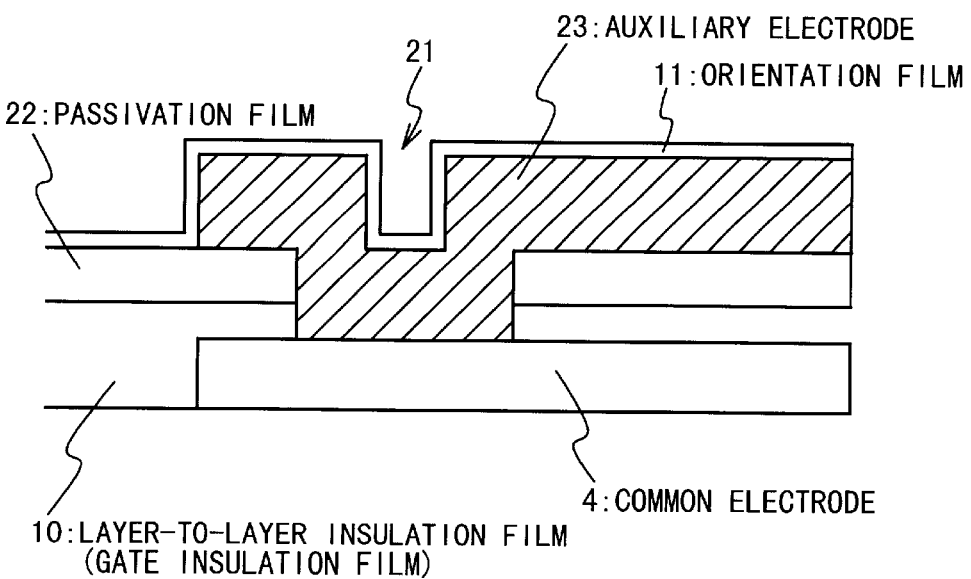
FIG. 55B is a view showing a section taken on the line B–B' of the contact hole shown in FIG. 55A according to the present invention.

FIGS. 55A, 55B show the configurations of the contact holes according to the present invention. FIG. 55B shows a section taken on the line B–B' of the contact hole 21 in the display cell. The contact hole 21 is constituted by the partially concave shape of the second auxiliary electrode 23. The concave shape of the auxiliary electrode 23 penetrates the passivation film 22 and the layer-to-layer insulation film (gate insulation film) 10, and it is connected to the common electrode 4. Such shape of the contact hole 21 is common to the other contact holes. In the case of the auxiliary electrode 8, the concave shape is connected to the pixel electrode 2.

FIGS. 56A to 56L show the configuration of the processes according to the contact holes of the present invention. They show the changes in the B–B' section shown in FIG. 55B. As shown in FIG. 56A, the gate electrode layer made of chrome layer (Cr) is formed on the first transparent substrate 9. A washing step, a chrome sputtering step, a washing step, a resist-re-coating step, an exposing step, a developing step, a chrome etching step and a resist stripping step are carried out in this process.

The shape of the gate electrode is set as shown in FIG. 56B. The layer-to-layer insulation film (gate insulation film) 10 (SiO2/SiNx) is formed on the gate electrode, in FIG. 56C. The lower layer (SiNx) of the passivation film 22 and an amorphous silicon layer (a-Si, n⁺a-Si) are formed on the layer-to-layer insulation film (gate insulation film) 10, as shown in FIG. 56D. The amorphous silicon layer (a-Si, n⁺a-Si) is removed from above the gate electrode 3, as shown in FIG. 56E. A washing step, a SiO2 film forming step, a washing step, a three-layer continuous P-CVD step, a washing step, a resist coating step, an exposing step, a developing step, an island-dry etching step and a resist-re-stripping step are carried out in the processes shown in FIGS. 56B to 56E.

The chrome layer is formed above the gate electrode 3 as shown in FIG. 56F. The chrome layer is removed from above the gate electrode 3 as shown in FIG. 56G. A channel dry etching step is carried out in the process shown in FIG. 56H. A washing step, a chrome sputtering step, a washing step, a resist coating step, an exposing step, a developing step, a chrome etching step, a chrome dry etching step, a resist stripping step and a channel dry etching step are carried out in the processes shown in FIGS. 56F to 56H.

The upper layer (SiNx) of the passivation layer 22 is formed above the gate electrode 3, as shown in FIG. 56I. The parts of the upper and lower layers of the passivation film 22 and the layer-to-layer insulation film (gate insulation film) 10 are removed, as shown in FIG. 56J, and the concave section is formed. A washing step, a passivation CVD step, a washing step, a resist coating step, an exposing step, a developing step, a contact etching step, a contact dry etching step and a resist stripping step are carried out in the processes shown in FIGS. 56I, 56J.

The ITO layer is formed by an ITO sputtering process, in the process shown in FIG. 56K. A process for removing the ITO is carried out in the process shown in FIG. 56I. Then, a washing step, an ITO sputtering step, a washing step, a resist coating step, an exposing step, a developing step, an ITO etching step, a resist stripping step, a washing step, an annealing step and an inspection step are carried out in the processes shown in FIGS. 56K, 56I. In particular, if the auxiliary electrode made of ITO is formed in this process, it is possible to form in the same process as the ITO film forming operation for ensuring the conductivity, in a gate pad and a drain pad, Thus, this is advantageous from the viewpoint of a cost.

As mentioned above, the auxiliary electrode 8 made of the transparent electrode and/or the second auxiliary electrode 23 are set at the same potential as the pixel electrode 2 and/or the common electrode 4. Then, the interval between the electrodes is made narrower to thereby increase the strength of the electric field. So, it is possible to smoothly improve the responsibility resulting from the narrower cell gap while avoiding the drop in the aperture ratio.

The liquid crystal display apparatus according to the present invention can attain both the preservation of the desirable aperture ratio and the improvement of the responsive speed, namely, the increase in the strength of the electric field applied to the liquid crystal. So, it is possible to smoothly improve the responsibility resulting from the narrower cell gap. Moreover, it is possible to protect the coloration from the oblique field, depending on the configuration of the electrode, and thereby possible to attain the wider field angle.

What is claimed is:

1. An active matrix type of a liquid crystal display apparatus, comprising:

a pair of substrates;

a liquid crystal layer provided between said pair of substrates;

a pixel electrode and a common electrode provided on at least one side of said pair of substrates, wherein said pixel electrode and said common electrode are provided at established intervals to be shaped like teeth of a comb to generate an electric field substantially parallel to said pair of substrates in said liquid crystal layer; and a transparent auxiliary electrode provided through an insulating film above said common electrode, wherein a same voltage as that of said common electrode is applied to said transparent auxiliary electrode such that said electric field applied to said liquid crystal layer is strengthened.

2. An active matrix type of a liquid crystal display apparatus, comprising:

a pair of substrates;

a liquid crystal layer provided between said pair of substrates;

a pixel electrode and a common electrode provided on at least one side of said pair of substrates, wherein said pixel electrode and said common electrode are provided at established intervals to be shaped like teeth of a comb to generate an electric field substantially parallel to said pair of substrates in said liquid crystal layer;

a first transparent auxiliary electrode provided above said pixel electrode; and a second transparent auxiliary electrode provided above said common electrode through a contact hole electrically connected to said first transparent auxiliary electrode, and wherein said first transparent auxiliary electrode is formed on a same layer as that on which said second transparent auxiliary electrode is formed.

3. An active matrix type of a liquid crystal display apparatus, comprising:

a pair of substrates;

a liquid crystal layer provided between said pair of substrates;

a pixel electrode and a common electrode provided on at least one side of said pair of substrates, wherein said pixel electrode and said common electrode are provided at established intervals to be shaped like teeth of a comb to generate an electric field substantially parallel to said pair of substrates in said liquid crystal layer;

a first transparent auxiliary electrode provided above said pixel electrode; and a second transparent auxiliary electrode provided above said common electrode through a contact hole electrically connected to said first transparent auxiliary electrode, and wherein said first transparent auxiliary electrode is formed on a first layer and said second transparent auxiliary electrode is formed through an insulating film on a second layer different from said first layer.

4. An active matrix type of a liquid crystal display apparatus, comprising:

a pair of substrates;

a liquid crystal layer provided between said pair of substrates;

a pixel electrode and a common electrode provided on at least one side of said pair of substrates, wherein said pixel electrode and said common electrode are provided at established intervals to be shaped like teeth of a comb to generate an electric field substantially parallel to said pair of substrates in said liquid crystal layer; and a transparent auxiliary electrode provided through an insulating film above a single one of said pixel electrode and said common electrode, wherein said transparent auxiliary electrode is electrically connected to said single one through a contact hole.

5. The active matrix type of the liquid crystal display apparatus according to claim 2, wherein said liquid crystal display apparatus includes a plurality of said contact holes per a display pixel of said liquid crystal display apparatus.

6. The active matrix type of the liquid crystal display apparatus according to claim 3, wherein said liquid crystal display apparatus includes a plurality of said contact holes per a display pixel of said liquid crystal display apparatus.

7. The active matrix type of the liquid crystal display apparatus according to claim 4, wherein said liquid crystal display apparatus includes a plurality of said contact holes per a display pixel of said liquid crystal display apparatus.

8. The active matrix type of the liquid crystal display apparatus according to claim 1, wherein said pixel electrode and said common electrode and said transparent auxiliary electrode are shaped like teeth of said comb to generate said electric field, and wherein each of said pixel electrode and said common electrode and said transparent auxiliary electrode is shaped like a straight line.

9. The active matrix type of the liquid crystal display apparatus according to claim 1, wherein said pixel electrode and said common electrode and said transparent auxiliary electrode are shaped like teeth of said comb to generate said electric field, and wherein at least one of said pixel electrode and said common electrode and said transparent auxiliary electrode is shaped like bent.

10. The active matrix type of the liquid crystal display apparatus according to claim 9, wherein said at least one of said pixel electrode and said common electrode and said transparent auxiliary electrode is created in a form of a triangular notch.

11. The active matrix type of the liquid crystal display apparatus according to claim 1, wherein said pixel electrode and said common electrode and said transparent auxiliary electrode are shaped like teeth of said comb to generate said electric field, and wherein a width of said transparent auxiliary electrode is wider than those of said pixel electrode and said common electrode such that a space between said teeth of said comb is lessened.

12. The active matrix type of the liquid crystal display apparatus according to claim 8, wherein said pixel electrode and said common electrode and said transparent auxiliary electrode are shaped like teeth of said comb to generate said electric field, and wherein a width of said transparent auxiliary electrode is wider than those of said pixel electrode and said common electrode such that a space between said teeth of said comb is lessened.

13. The active matrix type of the liquid crystal display apparatus according to claim 9, wherein said pixel electrode and said common electrode and said transparent auxiliary electrode are shaped like teeth of said comb to generate said electric field, and wherein a width of said transparent auxiliary electrode is wider than those of said pixel electrode and said common electrode such that a space between said teeth of said comb is lessened.

14. The active matrix type of the liquid crystal display apparatus according to claim 10, wherein said pixel electrode and said common electrode and said transparent auxiliary electrode are shaped like teeth of said comb to generate said electric field, and wherein a width of said transparent auxiliary electrode is wider than those of said pixel electrode and said common electrode such that a space between said teeth of said comb is lessened.

15. The active matrix type of the liquid crystal display apparatus according to claim 11, wherein a center line of a width of said transparent auxiliary electrode is a same as that of one of said pixel electrode and said common electrode.

16. The active matrix type of the liquid crystal display apparatus according to claim 12, wherein a center line of a width of said transparent auxiliary electrode is a same as that of one of said pixel electrode and said common electrode.

17. The active matrix type of the liquid crystal display apparatus according to claim 13, wherein a center line of a width of said transparent auxiliary electrode is a same as that of one of said pixel electrode and said common electrode.

18. The active matrix type of the liquid crystal display apparatus according to claim 14, wherein a center line of a width of said transparent auxiliary electrode is a same as that of one of said pixel electrode and said common electrode.

19. The active matrix type of the liquid crystal display apparatus according to claim 1, wherein a material of said transparent auxiliary electrode is an ITO.

20. The active matrix type of the liquid crystal display apparatus according to claim 8, wherein a material of said transparent auxiliary electrode is an ITO.

* * * * *